(12) United States Patent
Tanahashi et al.

(10) Patent No.: US 8,790,581 B2
(45) Date of Patent: *Jul. 29, 2014

(54) ALUMINA-SILICA-BASED FIBER, CERAMIC FIBER, CERAMIC FIBER COMPLEX, RETAINING SEAL MATERIAL, PRODUCTION METHOD THEREOF, AND ALUMINA FIBER COMPLEX PRODUCTION METHOD

(75) Inventors: Kazutomo Tanahashi, Ogaki (JP); Masakage Doushita, Ogaki (JP); Hidetomo Takahashi, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 252 days.

This patent is subject to a terminal disclaimer.

(21) Appl. No.: 12/274,109

(22) Filed: Nov. 19, 2008

(65) Prior Publication Data
US 2009/0075812 A1    Mar. 19, 2009

Related U.S. Application Data

(62) Division of application No. 12/269,949, filed on Nov. 13, 2008, now Pat. No. 7,790,121, which is a division of application No. 10/332,511, filed as application No. PCT/JP02/05124 on May 27, 2002, now abandoned.

(30) Foreign Application Priority Data

| May 25, 2001 | (JP) | 2001-157701 |
|---|---|---|
| May 25, 2001 | (JP) | 2001-157702 |
| May 25, 2001 | (JP) | 2001-157703 |
| May 25, 2001 | (JP) | 2001-157704 |
| May 25, 2001 | (JP) | 2001-157705 |
| May 31, 2001 | (JP) | 2001-164915 |

(51) Int. Cl.
*B01D 50/00* (2006.01)

(52) U.S. Cl.
USPC .......................................................... 422/179

(58) Field of Classification Search
USPC ................ 422/177, 179, 180; 428/292.1, 324
See application file for complete search history.

(56) References Cited

U.S. PATENT DOCUMENTS

| 3,540,844 A | 11/1970 | Takashi |
| 3,865,599 A | 2/1975 | Mansmann et al. |

(Continued)

FOREIGN PATENT DOCUMENTS

| CN | 1037937 A | 12/1989 |
| CN | 2319577 Y | 5/1999 |

(Continued)

OTHER PUBLICATIONS

U.S. Appl. No. 12/273/895, filed Nov. 19, 2008, Tanahashi, et al.

(Continued)

*Primary Examiner* — Tom Duong
(74) *Attorney, Agent, or Firm* — Oblon, Spivak, McClelland, Maier & Neustadt, L.L.P.

(57) ABSTRACT

A manufacturing method by which alumina-silica based fibers excellent in mechanical strength can be readily and securely obtained. The method obtains precursor fibers as a material by using an alumina-silica based fiber spinning stock solution for use in an inorganic salt method. Next, the precursor fibers are heated under an environment which makes it difficult to carry out an oxidizing reaction on the carbon component contained in the precursor fibers. Thus, the precursor fibers are sintered to obtain alumina-silica based fibers.

14 Claims, 14 Drawing Sheets

(56) References Cited

U.S. PATENT DOCUMENTS

| | | |
|---|---|---|
| 3,982,955 A | 9/1976 | Mansmann et al. |
| 4,101,615 A | 7/1978 | Horikiri et al. |
| 4,251,377 A | 2/1981 | Schleinitz |
| 4,732,878 A | 3/1988 | Everitt et al. |
| 4,798,814 A | 1/1989 | Everitt et al. |
| 5,014,396 A | 5/1991 | Nieminen |
| 5,028,397 A | 7/1991 | Merry |
| 5,286,182 A | 2/1994 | Maeda et al. |
| 5,320,791 A | 6/1994 | Saitou et al. |
| 5,400,830 A | 3/1995 | Stiles et al. |
| 5,523,059 A * | 6/1996 | Langer .................. 422/179 |
| 5,866,079 A | 2/1999 | Machida et al. |
| 6,746,979 B2 | 6/2004 | Shoji et al. |
| 6,960,386 B2 | 11/2005 | Agata |
| 2002/0025904 A1* | 2/2002 | Goto et al. .................. 502/150 |
| 2003/0049180 A1 | 3/2003 | Fukushima |
| 2004/0022699 A1 | 2/2004 | Fukushima |
| 2004/0052694 A1 | 3/2004 | Nishikawa et al. |
| 2004/0234428 A1 | 11/2004 | Tanahashi et al. |
| 2006/0278323 A1 | 12/2006 | Eguchi |
| 2007/0207069 A1 | 9/2007 | Kariya et al. |
| 2007/0231222 A1 | 10/2007 | Okabe |
| 2007/0292318 A1 | 12/2007 | Andoh et al. |
| 2008/0044317 A1 | 2/2008 | Kariya et al. |
| 2008/0047638 A1 | 2/2008 | Sugino |
| 2008/0178566 A1 | 7/2008 | Okabe |
| 2008/0181831 A1 | 7/2008 | Okabe |
| 2008/0312071 A1 | 12/2008 | Nishikawa |
| 2009/0049690 A1 | 2/2009 | Eguchi |
| 2009/0081455 A1 | 3/2009 | Mitani |
| 2009/0084268 A1 | 4/2009 | Saiki |
| 2009/0087352 A1 | 4/2009 | Okabe |
| 2009/0087353 A1 | 4/2009 | Saiki |
| 2009/0114097 A1 | 5/2009 | Saiki |

FOREIGN PATENT DOCUMENTS

| | | |
|---|---|---|
| CN | 1292721 A | 4/2001 |
| DE | 198 58 025 A1 | 6/2000 |
| EP | 0 390 383 A1 | 10/1990 |
| EP | 0 495 466 A2 | 7/1992 |
| EP | 0 971 057 A1 | 1/2000 |
| EP | 971057 A1 * | 1/2000 |
| EP | 1 182 333 A1 | 2/2002 |
| EP | 1 296 030 A1 | 3/2003 |
| EP | 1 329 601 A1 | 7/2003 |
| GB | 1 400 229 | 7/1975 |
| GB | 1 568 303 | 5/1980 |
| JP | 48-75823 | 10/1973 |
| JP | 48-95409 | 12/1973 |
| JP | 53-110712 | 9/1978 |
| JP | 64-56362 | 3/1989 |
| JP | 1-270543 A | 10/1989 |
| JP | 2-64066 | 3/1990 |
| JP | 2-234963 A | 9/1990 |
| JP | 2-289143 | 11/1990 |
| JP | 3-10019 U | 1/1991 |
| JP | 3-107518 A | 5/1991 |
| JP | 4-209861 | 7/1992 |
| JP | 4-333619 | 11/1992 |
| JP | 7-286514 | 10/1995 |
| JP | 7-301113 | 11/1995 |
| JP | 8-334015 | 12/1996 |
| JP | 9-208930 | 8/1997 |
| JP | 9-239710 A | 9/1997 |
| JP | 10-101445 | 4/1998 |
| JP | 10-101445 A | 4/1998 |
| JP | 10-131744 | 5/1998 |
| JP | 10-131744 A | 5/1998 |
| JP | 10-288032 | 10/1998 |
| JP | 11-82006 | 3/1999 |
| JP | 2000-352311 | 12/2000 |
| JP | 2001-20734 A | 1/2001 |
| JP | 2001-27117 A | 1/2001 |
| WO | WO 99/46028 | 9/1999 |
| WO | WO 00/62907 A1 | 10/2000 |
| WO | WO 00/75496 A1 | 12/2000 |
| WO | WO 01/98640 A1 | 12/2001 |

OTHER PUBLICATIONS

U.S. Appl. No. 12/273,947, filed Nov. 19, 2008, Tanahashi, et al.
Chart of Neutral Grays, http://www.goldenpaints.com/technicaldata/neutgray.php, no date. 3 pages.
U.S. Appl. No. 12/256,630, Unknown, Goshima, et al.
U.S. Appl. No. 12/240,797, Unknown, Saiki.
U.S. Appl. No. 12/327,454, Unknown, Okabe.
U.S. Appl. No. 12/413,044, Unknown, Sugino, et al.
"An Overview of Ceramic Fibers." *China Academic Journal Electronic Publishing House* (Jun. 31, 1994) (With English Translation).
"Preparation, Properties and Applications of Continuous Alumina Fibers." *China Academic Journal Electronic Publishing House* (Dec. 31, 1999) (With English Translation).
Office Action mailed Dec. 27, 2010, in co-pending U.S. Appl. No. 12/273,895.
Office Action mailed Dec. 27, 2010, in co-pending U.S. Appl. No. 12/273,947.
"Handbook of Ceramics, 2nd Edition, Basic Data", The Ceramic Society of Japan, Oct. 1, 2002, 3 pages.
Office Action issued in Japanese Patent Application No. 2001-164915 mailed on Jun. 21, 2011.

\* cited by examiner (a)

(b)

CROSS-SECTIONAL VIEW TAKEN ALONG LINE A-A

ALUMINA-SILICA-BASED FIBER, CERAMIC FIBER, CERAMIC FIBER COMPLEX, RETAINING SEAL MATERIAL, PRODUCTION METHOD THEREOF, AND ALUMINA FIBER COMPLEX PRODUCTION METHOD

TECHNICAL FIELD

The present invention relates to an alumina-silica based fiber, a ceramic fiber, a ceramic fiber aggregation, a holding seal material and manufacturing methods thereof, as well as a manufacturing method of alumina fiber aggregation.

BACKGROUND ART

Recently, there has been a problem that particulates contained in exhausted gas discharged from combustion engines of vehicles such as buses, trucks, construction machines and the like affect the environment and the human body.

There have been various ceramic filters which allow the exhausted gas to pass through porous ceramic, thereby capturing the particulates in the exhausted gas and purifying the exhausted gas.

As one example of such ceramic filters, there is used a honeycomb filter 30 in which a plurality of porous ceramic members 40 shown in FIG. 16 are bound by means of an adhesive layer 34 to constitute a column-shaped ceramic block 35, and a seal material layer 33 is formed around the column-shaped ceramic block 35. Moreover, as shown in FIG. 17, this porous ceramic member 40 is provided with a number of through holes 42 aligned in the longitudinal direction so that each partition wall 43 separating the through holes 42 from each other functions as a filter.

In other words, as shown in FIG. 17(b), with respect to each of the through holes 42 formed in the porous ceramic member 40, either of the ends on the inlet side or outlet side of the exhaust gas is sealed by a filling material 41 so that the exhaust gas, flown into a through hole 42, is always allowed to flow out through another through hole 42 after having passed through this partition wall 43 that separates through holes 42; thus, when the exhaust gas passes through the partition wall 43, particulates thereof are captured by the partition wall 43 so that the exhaust gas is purified.

Moreover, a seal material layer 33 is formed on the outer circumferential portion so that one portion thereof is formed to prevent the exhaust gas from leaking from the through holes 42 exposed to the outside of the porous ceramic member 40.

With respect to a non-oxide-based ceramic material constituting the porous ceramic member 40 of this type, silicon carbide, which is excellent in heat resistance, and easily subjected to a recovering process and the like, is used in various vehicles such as large-size vehicles and vehicles having diesel engines.

Further, in addition to the above-mentioned particulates, the above-mentioned exhaust gas contains CO, NOx, HC, etc., and in order to remove these substances from the exhaust gas, an exhaust gas purifying catalyst converter, which has virtually the same shape as the above-mentioned honey comb filter 30 with a catalyst such as platinum deposited therein, has been proposed.

Moreover, in recent years, studies have been conducted on the next generation clean power sources which do not use petroleum as the power source, and among these, for example, fuel cells have been considered to be a very prospective power source.

The fuel cells, which utilize electricity that is obtained when hydrogen and oxygen react with each other to form water as a power source, have an arrangement in which oxygen is directly taken from the air while methanol, gasoline and the like are modified and utilized to provide hydrogen, and upon modifying these methanol, gasoline and the like, an exhaust gas purifying catalyst converter, which has virtually the same shape as the above-mentioned honey comb filter 30 with a copper-based catalyst deposited therein, has been utilized.

Generally, these honeycomb filter 30, an exhaust gas purifying catalyst converter, a catalyst converter for a fuel cell and the like are placed inside a cylinder-shaped metal shell, and used, and in this case, there is a gap between the honeycomb filter 30, the exhaust gas purifying catalyst converter or the catalyst converter for a fuel cell and the above-mentioned metal shell, and in order to fill the gap, a holding seal materials 50 shown in FIG. 18 is interpolated therein.

As shown in FIG. 18, the holding seal material 50 is provided with a convex fitting section 52 placed on one of the shorter sides of a base material portion 51 having a virtually rectangular shape, and a concave fitting section 53 placed on the other shorter side.

The convex fitting section 52 and the concave fitting section 53 are just fitted to each other when the holding seal material 50 is wound around the outer circumference of the honeycomb filter 30; thus, it is possible to prevent the holding seal material 50 from deviation.

Conventionally, the holding seal material of this type has been formed through the following first through fourth methods.

In other words, in the first method for manufacturing the above-mentioned holding seal material, first, a starting material containing an alumina source and a silica source is heated to approximately 2000° C., and subjected to a spinning process in a fused state, and then quickly cooled down to obtain ceramic fibers that has virtually the same alumina content and silica content. Then, a material is produced by aggregating the above-mentioned ceramic fibers into a mat shape. This material is stamped out by using a metal mold to manufacture holding seal materials.

In the second method for manufacturing the above-mentioned holding seal material, first, a spinning stock solution containing an alumina source and a silica source is prepared, and by discharging this solution through a nozzle, a precursor fiber having a true round shape in its cross-section is continuously obtained. Next, the long fiber of the precursor fiber obtained through the above-mentioned spinning process is sintered, and the resulting alumina-silica based fiber is then chopped into short fibers having a predetermined length. Next, the short fibers thus obtained are put into a mold to form a fiber aggregation having a mat shape. This fiber aggregation is stamped out by using a metal mold to manufacture holding seal materials.

Moreover, in the third method for manufacturing the above-mentioned holding seal material, a spinning stock solution, preliminarily prepared for use in an inorganic salt method, is supplied to a centrifugal nozzle, and the spinning stock solution is blown out of the nozzle by a centrifugal force exerted on the centrifugal nozzle to form precursor fibers. Next, the resulting precursor fibers are aggregated into a mat shape, and this mat-shaped aggregation is stamped out by using a metal mold to manufacture holding seal materials.

In the fourth method for manufacturing the above-mentioned holding seal material, first, an alumina fiber stock solution (alumina-silica fiber stock solution) is subjected to a spinning process to form a continuous long-fiber precursor, and an alumina long fiber is manufactured by sintering this continuous long-fiber precursor.

Next, after this alumina long fiber has been cut into alumina short fibers, these alumina short fibers are collected, untied, and laminated, and this is then pressed to form an alumina fiber aggregation having a mat shape.

Then, this mat-shaped aggregation is stamped out into a predetermined shape to manufacture holding seal materials.

The holding seal material, thus manufactured, is wound on the outer circumferential face of the above-mentioned honeycomb filter, the exhaust gas purifying catalyst converter or the catalyst converter for a fuel cell, and this is then housed in a metal shell; and in such a housed state, since the holding seal material is compressed in the thickness direction so that a repulsive force (face pressure) resisting against the compressing force is exerted in the holding seal material. The repulsive force thus exerted makes it possible to hold elements, such as the honeycomb filter, the exhaust gas purifying catalyst converter and the catalyst converter for a fuel cell, inside the above-mentioned metal shell.

In the case where the honeycomb filter, the exhaust gas purifying catalyst converter, the catalyst converter for a fuel cell, etc. are housed inside the above-mentioned metal shell through a press-fitting method, a metal cylinder member having an O-letter shape in its cross-section is used, and when these are housed inside thereof by using a canning method, a clam shell, which is formed by dividing a metal cylinder member having an O-letter shape in its cross-section into a plurality of pieces along the axis-line direction thereof, is used. Moreover, in addition to this method, a metal shell, which uses a tightening method in which welding, bonding and bolt-fastening processes are carried out by using a metal cylinder-shaped member having a C-letter shape or a U-letter shape in its cross-section, is also utilized.

However, with respect to the holding seal material manufactured through the first method, since this member is subjected to vibration and high temperatures of such as exhaust gas, when it is used, the face pressure is gradually lowered as time elapses, resulting in degradation in the holding property and sealing property of the catalyst carrier in a comparatively early period of time.

Moreover, with respect to the holding seal material manufactured by the first method, properties for securely holding the honeycomb filter, the exhaust gas purifying catalyst converter, the catalyst converter for a fuel cell, etc. for a long period of time are required; however, the conventional ceramic fibers, manufactured through the above-mentioned fusing method, has a very low level of crystallization rate (mullite rate), that is, less than 1% by weight, in addition to its high level of amorphous components. For this reason, when the resulting fibers are subjected to high temperatures for a long time, thermal shrinkage occurs as crystallization advances, resulting in brittleness in the fibers. Therefore, the holding seal material, manufactured by using these fibers, fails to provide a sufficiently high initial face pressure, and causes high degradation with time in the face pressure during the application.

In order to solve these problems, a method for increasing the crystallization rate of the ceramic fibers to approximately 10% by weight has been proposed; however, in this case, hardening of the fibers causes degradation in the elasticity and flexibility of the holding seal material and the subsequent degradation in the sealing property.

Moreover, with respect to the holding seal material manufactured by the second method, properties for securely holding the honeycomb filter, the exhaust gas purifying catalyst converter, the catalyst converter for a fuel cell, etc. for a long period of time are required; however, the alumina-silica based fiber having a round shape in its cross-section, manufactured in the second method, tends to lose its flexibility to become brittle, and is easily broken, when exposed to high temperatures for a long time. Therefore, the holding seal material manufactured by these fibers is susceptible to degradation with time in the face pressure.

Furthermore, with respect to the holding seal material manufactured by the third method, when the formation of ceramic fibers is carried out by using the blowing method, the basis weight (weight per unit area) of the mat-shaped aggregation comes to have a higher positional dependence.

In other words, the degree of aggregation in fibers is not constant with the result that when the position at which the mat-shaped aggregation is stamped out differs, the face pressure value of the resulting holding seal material tends to differ. Consequently, it has not been possible to obtain a holding seal material having excellent stability in quality.

Here, in the alumina fiber aggregation formed by the above-mentioned fourth method, alumina short fibers, used for the alumina fiber aggregation, fail to have sufficiently high mechanical strength, and have comparatively great dispersions, with the result that the initial face pressure of the alumina fiber aggregation becomes insufficient, and the degradation with time in the face pressure of the above-mentioned alumina fiber aggregation is comparatively large; therefore, there have been demands for improvements.

Here, "the initial face pressure" refers to a face pressure of an alumina fiber aggregation in a state where neither load nor heat is applied thereto.

The present invention has been devised to solve the above-mentioned problems, and an object of a first group of the present invention is to provide a holding seal material which has a high initial face pressure, and is less susceptible to degradation with time in the face pressure, to provide an alumina-silica based fiber excellent in mechanical strength and suitable for obtaining the above-mentioned holding seal material and a manufacturing method thereof, and also to provide a manufacturing method of alumina-silica based fibers capable of securely obtaining the above-mentioned alumina-silica based fiber excellent in mechanical strength easily.

Moreover, an object of a second group of the present invention is to provide a holding seal material which has a high initial face pressure, and is less susceptible to degradation with time in the face pressure, with excellent sealing properties, and a catalyst converter, and also to provide a manufacturing method of a holding seal material which is suitable for obtaining the above-mentioned holding seal material.

Furthermore, an object of a third group of the present invention is to provide a holding seal material which is less susceptible to degradation with time in the face pressure, and also to provide a manufacturing method of alumina-silica based fibers that are used for the above-mentioned holding seal material.

Furthermore, an object of a fourth group of the present invention is to provide a holding seal material excellent in quality stability, and also to provide a manufacturing method of a holding seal material which is suitable for obtaining the above-mentioned holding seal material.

Furthermore, an object of a fifth group of the present invention is to provide a holding seal material which is less susceptible to degradation with time in face pressure, and also to provide a manufacturing method of a holding seal material which is suitable for the above-mentioned holding seal material, a ceramic fiber aggregation and ceramic fibers thereof.

Furthermore, an object of a sixth group of the present invention is to provide a manufacturing method of an alumina fiber aggregation which has alumina short fibers having high strength with small dispersions so that it provides a sufficiently high initial face pressure, and is less susceptible to degradation with time.

SUMMARY OF THE INVENTION

The present inventors studied hard so as to solve the problems for the above-mentioned first group of the present invention, and after a number of processes of trial and error, fortunately, made it possible to produce alumina-silica based fibers excellent in mechanical strength. The alumina-silica based fibers thus produced generally have a blackish color, and have characteristics that are clearly different from those of white, transparent alumina-silica based fibers that have been generally known. The present inventors further studied hard so as to find the cause of generation of the color which is different from the color of the generally-known fibers. As a result, they found that as the residual carbon content in the fibers increased, the fibers came to have a blackish color, and that the presence of the residual carbon content improved the mechanical strength. Thus, based upon these findings, the present inventors further studied hard, and finally arrived at the following first group of the present invention.

That is, the invention according to the first group of the present invention summarizes an alumina-silica based fiber which presents a blackish color.

The invention according to the first group of the present invention summarizes an alumina-silica based fiber which presents a blackish color derived from a carbon component.

The invention according to the first group of the present invention summarizes an alumina-silica based fiber which has a residual carbon content of 1% by weight or more, presents a blackish color derived from its residual carbon component, and has a fiber tensile strength of 1.2 GPa or more, a fiber bending strength of 1.0 GPa or more and a fracture toughness of 0.8 $MN/m^{3/2}$ or more.

The invention according to the first group of the present invention summarizes a manufacturing method of alumina-silica based fibers, including: a spinning step of obtaining precursor fibers by using a spinning stock solution of the alumina-silica based fibers for an inorganic salt method as a material; and a firing step of heating the above-mentioned precursor fibers under an environment which makes it difficult to carry out an oxidizing reaction on the carbon component contained in the above-mentioned precursor fibers, thereby sintering the above-mentioned precursor fibers.

The invention according to the first group of the present invention summarizes the invention, wherein the above-mentioned precursor fiber is heated at a temperature of 1000 to 1300° C. under a nitrogen atmosphere.

The invention according to the first group of the present invention summarizes the invention, wherein the carbon component contained in the above-mentioned precursor fiber is derived from an organic polymer added to the above-mentioned spinning stock solution of the alumina-silica based fiber as a fiber-drawing property applying agent.

The invention according to the first group of the present invention summarizes a holding seal material which has alumina-silica based fibers, aggregated into a mat shape as a constituent element, and is placed in a gap between a ceramic body capable of allowing a fluid to flow through the inside thereof and a metal shell covering the outer circumference of the ceramic body.

The invention according to the first group of the present invention summarizes the invention, wherein the above-mentioned ceramic body includes a catalyst carrier, and the above-mentioned holding seal material is used as a holding seal material for a catalyst converter.

In order to solve the problem for the second group of the present invention, the invention according to the second group of the present invention summarizes a holding seal material which has a fiber aggregation of alumina-silica based fibers aggregated into a mat shape as a constituent element, and is placed in a gap between a ceramic body capable of allowing a fluid to flow through the inside thereof and a metal shell covering the outer circumference of the ceramic body, wherein a crystallization rate in a portion on a first face side is different from that in a portion on a second face side.

The invention according to the second group of the present invention summarizes a holding seal material which has a fiber aggregation of alumina-silica based fibers aggregated into a mat shape as a constituent element, and is placed in a gap between a ceramic body capable of allowing a fluid to flow through the inside thereof and a metal shell covering the outer circumference of the ceramic body, wherein a crystallization rate is gradually increased from a first face side toward a second face side.

The invention according to the second group of the present invention summarizes the invention, including a sheet of fiber aggregation, wherein the crystallization rate of the fiber aggregation is gradually increased from the first face side toward the second face side.

The invention according to the second group of the present invention summarizes the invention, wherein the difference between the crystallization rates in the portion on the first face side and that in the portion on the second face side is 3% by weight or more.

The invention according to the second group of the present invention summarizes the invention, wherein the crystallization rate in the portion on the first face side is 0 to 1% by weight, and the crystallization rate in the portion on the second face side is 1 to 10% by weight.

The invention according to the second group of the present invention summarizes the invention, wherein the above-mentioned ceramic body includes a catalyst carrier, and the above-mentioned holding seal material is used as a holding seal material for a catalyst converter.

The invention according to the second group of the present invention summarizes a holding seal material which has alumina-silica based fibers aggregated into a mat shape as a constituent element, and is placed in a gap between a ceramic body capable of allowing a fluid to flow through the inside thereof and a metal shell covering the outer circumference of the ceramic body, wherein a crystallization rate is made different depending on portions.

The invention according to the second group of the present invention summarizes the invention, wherein the above-mentioned ceramic body includes a catalyst carrier, and the above-mentioned holding seal material is used as a holding seal material for a catalyst converter.

The invention according to the second group of the present invention summarizes a manufacturing method of a holding seal material, including: a spinning step of obtaining precursor fibers by using a spinning stock solution of ceramic fibers as material; a laminating step of laminating the above-mentioned precursor fibers to form a mat-shaped fiber aggregation; and a firing step of sintering the above-mentioned fiber aggregation so as to provide a difference between a firing temperature on a first face side and that on a second face side.

The invention according to the second group of the present invention summarizes the invention, wherein the difference between the above-mentioned firing temperatures is set to 100° C. or more.

The invention according to the second group of the present invention summarizes the invention, wherein the firing temperature on the first face side is set to 800 to 1100° C., and the firing temperature on the second face side is set to 1100 to 1400° C.

The invention according to the second group of the present invention summarizes a catalyst converter comprising: a catalyst carrier; a cylinder-shaped metal shell covering the outer circumference of the catalyst carrier; and a holding seal material placed in a gap between these elements, and having alumina-silica based fibers aggregated into a mat shape as a constituent element, wherein the above-mentioned holding seal material is placed in the above-mentioned gap in such a state that a first face side having a relatively small crystallization rate is made in contact with the above-mentioned metal shell, and a second face side having a relatively large crystallization rate is made in contact with the above-mentioned catalyst carrier.

In order to solve the problem for the third group of the present invention, the invention according to the third group of the present invention summarizes a holding seal material which has alumina-silica based fibers aggregated into a mat shape as a constituent element, and is placed in a gap between a ceramic body capable of allowing a fluid to flow through the inside thereof and a metal shell covering the outer circumference of the ceramic body, wherein the above-mentioned alumina-silica based fiber has a non-circular shape in its cross-section.

The invention according to the third group of the present invention summarizes a holding seal material which has alumina-silica based fibers aggregated into a mat shape as a constituent element, and is placed in a gap between a ceramic body capable of allowing a fluid to flow through the inside thereof and a metal shell covering the outer circumference of the ceramic body, wherein the above-mentioned alumina-silica based fiber has a deformed shape in its cross-section.

The invention according to the third group of the present invention summarizes a holding seal material which has alumina-silica based fibers aggregated into a mat shape as a constituent element, and is placed in a gap between a ceramic body capable of allowing a fluid to flow through the inside thereof and a metal shell covering the outer circumference of the ceramic body, wherein the above-mentioned alumina-silica based fiber has a flat shape in its cross-section.

The invention according to the third group of the present invention summarizes the invention, wherein the above-mentioned alumina-silica based fiber has a substantially elliptical or cocoon shape in its cross-section.

The invention according to the third group of the present invention, summarizes the invention, wherein the above-mentioned alumina-silica based fiber is a hollow fiber.

The invention according to the third group of the present invention, summarizes the invention, wherein the above-mentioned ceramic body includes a catalyst carrier, and the above-mentioned holding seal material is used as a holding seal material for a catalyst converter.

The invention according to the third group of the present invention summarizes a manufacturing method of alumina-silica based fibers used in a holding seal material, including: a spinning step of obtaining precursor fibers by discharging a spinning stock solution containing a solution of aluminum salt water, silica sol and an organic polymer through a nozzle; and a firing step of heating and sintering the above-mentioned precursor fibers, wherein dried hot air is blown to the above-mentioned precursor fibers immediately after having been discharged from the discharging section of the above-mentioned nozzle having a non-circular shape in its cross-section.

The invention according to the third group of the present invention summarizes the invention, wherein the above-mentioned dried hot air is blown in a forward direction with respect to the discharging direction of the above-mentioned precursor fiber.

The invention according to the third group of the present invention summarizes the invention, wherein a water-soluble plasticizer is preliminarily added to the above-mentioned spinning stock solution.

Moreover, in order to solve the problem for the fourth group of the present invention, the invention according to the fourth group of the present invention summarizes a holding seal material which has alumina-silica based fibers aggregated into a mat shape as a constituent element, and is placed in a gap between a ceramic body capable of allowing a fluid to flow through the inside thereof and a metal shell covering the outer circumference of the ceramic body, wherein the dispersion of fiber diameter in the above-mentioned alumina-silica based fiber is within ±3 µm.

The invention according to the fourth group of the present invention summarizes a holding seal material which has alumina-silica based fibers aggregated into a mat shape as a constituent element, and is placed in a gap between a ceramic body capable of allowing a fluid to flow through the inside thereof and a metal shell covering the outer circumference of the ceramic body, wherein the dispersion of fiber length in the above-mentioned alumina-silica based fiber is within ±4 mm.

The invention according to the fourth group of the present invention summarizes a holding seal material which has alumina-silica based fibers aggregated into a mat shape as a constituent element, and is placed in a gap between a ceramic body capable of allowing a fluid to flow through the inside thereof and a metal shell covering the outer circumference of the ceramic body, wherein the dispersion of fiber diameter in the above-mentioned alumina-silica based fiber is within ±3 µm, and the dispersion of fiber length in the above-mentioned alumina-silica based fiber is within ±4 mm.

The invention according to the fourth group of the present invention summarizes the invention, wherein the content of shots is 3% by weight or less.

The invention according to the fourth group of the present invention summarizes a holding seal material which has alumina-silica based fibers aggregated into a mat shape as a constituent element, and is placed in a gap between a ceramic body capable of allowing a fluid to flow through the inside thereof and a metal shell covering the outer circumference of the ceramic body, wherein the average fiber diameter of the above-mentioned alumina-silica based fiber is 5 to 15 µm, the dispersion of fiber diameter therein is within ±3 µm, the average fiber length thereof is 5 to 20 mm, the dispersion of fiber length therein is within ±4 mm, and no shots are contained therein.

The invention according to the fourth group of the present invention summarizes the invention, wherein the above-mentioned ceramic body includes a catalyst carrier, and the above-mentioned holding seal material is used as a holding seal material for a catalyst converter.

The invention according to the fourth group of the present invention summarizes a manufacturing method of a holding seal material, including: a spinning step of obtaining long precursor fibers by continuously discharging a spinning stock solution containing a solution of aluminum salt water, silica sol and an organic polymer through a nozzle; a cutting step of chopping the above-mentioned long fibers into a predetermined length to obtain short fibers; a molding step of allowing the above-mentioned short fibers to aggregate three-dimensionally, thereby forming into a mat-shaped fiber aggregation; and a firing step of heating and sintering the above-mentioned mat-shaped fiber aggregation.

Moreover, the inventors of the present invention studied hard to solve problems for the fifth group of the present invention.

As a result, it has been found that when an external load is applied for a long time in a manner so as to compress the fiber aggregation, the ceramic fibers constituting the fiber aggregation tend to slide on one another to cause dispersions, resulting in degradation in the face pressure of the fiber aggregation. Therefore, the inventors of the present application have attempted to solve the problems of sliding and dispersions among the fibers by applying any means to obtain better results, and take portions at which fibers are adjacent to each other with overlapped parts into consideration. Thus, they have further studied energetically to improve such portions, and finally have reached the following fifth group of the present invention.

The invention according to the fifth group of the present invention summarizes a holding seal material which has ceramic fibers aggregated into a mat shape as a constituent element, and is placed in a gap between a ceramic body capable of allowing a fluid to flow through the inside thereof and a metal shell covering the outer circumference of the ceramic body, wherein the ceramic fibers are partially bonded to each other by a ceramic adhesive.

The invention according to the fifth group of the present invention summarizes the invention, wherein the above-mentioned ceramic comprises a substance which constitutes the above-mentioned ceramic fiber.

The invention according to the fifth group of the present invention summarizes to the invention, wherein the above-mentioned ceramic fibers are alumina-silica based fibers, and the above-mentioned ceramic adhesive has alumina as a main component.

The invention according to the fifth group of the present invention summarizes to the invention, wherein 1 to 8% by weight of the above-mentioned ceramic adhesive is contained therein.

The invention according to the fifth group of the present invention summarizes to the invention, wherein the above-mentioned ceramic body includes a catalyst carrier, and the above-mentioned holding seal material is used as a holding seal material for a catalyst converter.

The invention according to the fifth group of the present invention summarizes a manufacturing method of a holding seal material, including: a spinning step of obtaining precursor fibers by using a spinning stock solution of ceramic fibers as a material; a firing step of heating and sintering the above-mentioned precursor fibers; a molding step of allowing thus obtained ceramic fibers to aggregate three-dimensionally, thereby forming into a mat-shaped aggregation; and bonding step of bonding the ceramic fibers forming the above-mentioned aggregation by using a ceramic adhesive.

The invention according to the fifth group of the present invention summarizes the invention, wherein in the above-mentioned bonding step, after the material solution of the above-mentioned ceramic adhesive has been supplied between the ceramic fibers forming the above-mentioned aggregation, the above-mentioned aggregation is heated to sinter specific components in the above-mentioned material solution so as to be formed into ceramics.

The invention according to the fifth group of the present invention summarizes the invention, wherein in the above-mentioned bonding step, after the above-mentioned aggregation has been impregnated with a water-soluble metal solution, which is the above-mentioned material solution, having a low viscosity, the above-mentioned aggregation is dried and heated so that the metal component in the above-mentioned solution is sintered to be formed into ceramics.

The invention according to the fifth group of the present invention summarizes the invention, wherein the above-mentioned water-soluble metal solution is supplied by an amount of 1 to 10% by weight of the above-mentioned aggregation.

The invention according to the fifth group of the present invention summarizes the invention, wherein the above-mentioned spinning stock solution of the ceramic fibers is a spinning stock solution of alumina-silica based fibers prepared by using an inorganic salt method, and the above-mentioned water-soluble metal solution is a water solution containing aluminum ions.

The invention according to the fifth group of the present invention summarizes a manufacturing method of a holding seal material, including: a spinning step of obtaining precursor fibers by using a spinning stock solution of ceramic fibers as a material; a molding step of allowing the above-mentioned precursor fibers to aggregate three-dimensionally, thereby forming into a mat-shaped aggregation; a liquid substance supplying step of allowing a liquid substance capable of being a ceramic adhesive later to adhere to portions at which the above-mentioned precursor fibers forming the above-mentioned aggregation are overlapped adjacent to each other; and a firing step of heating the above-mentioned aggregation to sinter the above-mentioned precursor fibers and the above-mentioned liquid substance.

The invention according to the fifth group of the present invention summarizes the invention, wherein in the above-mentioned liquid substance supplying step, the aggregation including the above-mentioned precursor fibers of alumina-silica based fibers is put in a highly moistened environment with high moisture.

The invention according to the fifth group of the present invention summarizes the invention, wherein in the above-mentioned liquid substance supplying step, a non-aqueous liquid substance containing an inorganic element contained in the above-mentioned alumina-silica based fiber is atomized and supplied to the aggregation including the precursor fibers of the alumina-silica based fibers.

The invention according to the fifth group of the present invention summarizes the invention, wherein a cutting step of chopping the long fibers of the above-mentioned precursor fibers into a predetermined length to obtain short fibers is carried out between the above-mentioned spinning step and the above-mentioned molding step.

The invention according to the fifth group of the present invention summarizes a ceramic fiber aggregation wherein three-dimensionally aggregated ceramic fibers are partially bonded to each other by a ceramic adhesive.

The invention according to the fifth group of the present invention summarizes a ceramic fiber aggregation comprising ceramic fibers having a branched structure.

The invention according to the fifth group of the present invention summarizes a ceramic fiber having a branched structure.

Moreover, in order to solve the problem for the sixth group of the present invention, the invention according to the sixth group of the present invention summarizes a manufacturing method of an alumina fiber aggregation, including: a spinning step of obtaining a continuous long-fiber precursor by using an alumina fiber stock solution used in an inorganic salt method as a material; a chopping step of cutting the above-mentioned continuous long-fiber precursor into short-fiber precursors; a mat preparing step of preparing a mat-shaped short fiber precursor by using thus obtained short-fiber precursor; and a firing step of firing the above-mentioned mat-shaped short fiber precursor to manufacture an alumina fiber aggregation.

The following description will be given of "operations" of the first group of the present invention.

In accordance with the inventions of the first group of the present invention, since black colored alumina-silica based fibers are generally excellent in the mechanical strength, the application of these fibers makes it possible to achieve a holding seal material that has a high initial face pressure, and is less susceptible to degradation with time in the face pressure.

Here, when the fiber tensile strength, fiber bending strength and fracture toughness are the above-mentioned values or more, it is possible to achieve alumina-silica based fibers that have very high resistance against tension and bending, and are flexible and unbreakable. Therefore, it becomes possible to improve the initial face pressure, and also to securely prevent degradation with time in the face pressure. Moreover, the alumina-silica based fibers that are black colored, contain carbon components in the fibers thereof, and since the crystallization is allowed to progress in the entire alumina-silica based fibers, it becomes possible to achieve the excellent mechanical strength such as tensile strength.

In accordance with the invention of the first group of the present invention, it is possible to sinter the precursor fibers without causing oxidation in the carbon components in the precursor fibers. For this reason, it is possible to allow much carbon components to remain in the fibers, and consequently to securely obtain fibers that are excellent in the mechanical strength easily.

Here, since most of the carbon components in the precursor fibers are normally burnt to disappear before the firing temperature has been attained, the carbon components seldom remain in the alumina-silica based fibers obtained through the firing step. However, in the case where the precursor fibers are heated under an environment that hardly allows oxidizing reaction of the carbon components to progress, it is considered that carbon is allowed to remain in the fibers to be assembled into the ceramic skeleton to a certain degree.

In accordance with the invention in the first group of the present invention, an inexpensive nitrogen atmosphere is utilized as an inert atmosphere in which the firing step is carried out; therefore, it becomes possible to cut manufacturing costs. Moreover, since the firing temperature is set in the above-mentioned preferable range, it is possible to obtain alumina-silica based fibers having high strength stably.

When the heating temperature of the precursor fibers is less than 1000° C., the sintering step of the precursor fibers tends to become insufficient, and in such a case, even when the residual carbon content is sufficient, it becomes difficult to stably obtain alumina-silica based fibers having high strength. In contrast, even when the heating temperature of the precursor fibers is set so as to exceed 1300° C., this fails to especially increase the strength of the alumina-silica based fibers, resulting in deterioration in economical efficiency instead of improvements.

In accordance with the invention according to the first group of the present invention, the above-mentioned organic polymer not only serves as a string-drawing-property applying agent, but also functions as carbon sources that add carbon to the precursor fibers so as to allow the alumina-silica based fibers to have appropriate strength. Therefore, it is not necessary to especially add carbon sources to the spinning stock solution in a separated manner, thereby making it possible to eliminate the necessity of greatly modifying the composition of the spinning stock solution. Thus, it is possible to preliminarily avoid imbalance in the stock solution composition, and consequently to prevent degradation in the basic physical properties in the alumina-silica based fibers. Moreover, since no carbon source needs to be added, it becomes possible to reduce the manufacturing costs. Furthermore, since the above-mentioned organic polymer is easily dispersed in the spinning stock solution evenly, the carbon sources are evenly dispersed in the precursor fibers. Consequently, the resulting alumina-silica based fibers are allowed to have an even residual carbon content, and tend to have less irregularity in the mechanical strength.

In this case, since the organic polymer of this type is burned to disappear normally at a temperature of approximately 500 to 600° C., nothing is left in the alumina-silica based fibers obtained through the firing step. However, it is considered that, when the precursor fibers are heated under an environment that hardly allows the oxidizing reaction of carbon contents to progress, carbon constituting the organic polymer is allowed to remain in the fibers, and assembled into the ceramic skeleton to a certain degree.

In accordance with the invention according to the first group of the present invention, since the alumina-silica based fibers having excellent mechanical strength are used as the constituent elements, it becomes possible to provide a holding seal material that has a high initial face pressure, tends to have less degradation with time in the face pressure.

In accordance with the invention according to the first group of the present invention, since the alumina-silica based fibers having excellent mechanical strength are used as the constituent elements with the ceramic body being composed of a catalyst carrier, and since the holding seal material is used as a catalyst converter-use holding seal material, it becomes possible to provide a catalyst-converter-use holding seal material that has a high initial face pressure, and is less susceptible to degradation with time in the face pressure.

In other words, in accordance with the invention of the first group of the present invention, the holding seal material of claim 7 is provided as a catalyst-converter-use holding seal material that includes alumina-silica based fibers as its constituent elements, and is placed in a gap between the catalyst carrier and the metal shell that covers the outer circumference of the catalyst carrier.

The following description will be given of "operations" of the second group of the present invention.

In accordance with the invention according to the second group of the present invention, the crystallization rate on the portion on the first face side is made different from the crystallization rate on the portion on the second face side. With this arrangement, the portion on the face side that has a relatively high crystallization rate, and is excellent in the heat resistance is placed on a high-temperature side, and the portion on the face side that has a relatively low crystallization rate, and is excellent in the elasticity and flexibility is placed on a low-temperature side. Therefore, the fibers are made less susceptible to brittleness on the high-temperature side, and on the low-temperature side, it becomes possible to avoid the occurrence of a gap to the other members. Thus, it becomes possible to achieve a holding seal material that is excellent in the sealing property, in addition to the advantages that it has high initial face pressure, and is less susceptible to degradation with time in the face pressure.

In accordance with the invention according to the second group of the present invention, since the crystallization rate is gradually increased from the first face side toward the second face side, the portion on the second face side that is excellent in the heat resistance can be placed on a high-temperature side, and the portion on the first face side that is excellent in the elasticity and flexibility can be placed on a low-temperature side. Therefore, the fibers are made less susceptible to brittleness on the high-temperature side, and on the low-temperature side, it becomes possible to avoid the occurrence of a gap to the other members. Thus, it becomes possible to achieve a holding seal material that is excellent in the sealing property, in addition to the advantages that it has high initial face pressure, and is less susceptible to degradation with time in the face pressure.

In accordance with the invention according to the second group of the present invention, different from a structure constituted by a plurality of sheets of fiber aggregations that have mutually different crystallization rates, it is possible to eliminate the necessity of the jobs for mutually superposing the fiber aggregations so as to be bonded to one another, and consequently to reduce the number of processes upon manufacturing the device. Moreover, since it is possible to provide a thinner structure in comparison with the laminated structure of a plurality of sheets, the resulting structure is comparatively easily placed in a narrow gap. Moreover, in comparison with the laminated structure of a plurality of sheets in which fluids might pass through the interface between the fiber aggregations, since no interface exists in such a single sheet structure of the third invention of the second group of the present invention, it is not necessary to take the passage of fluid into consideration. Thus, it is possible to provide a structure that is excellent in the sealing property.

In accordance with the invention according to the second group of the present invention, since the difference between the crystallization rate of the portion on the first face side and the crystallization rate of the portion on the second face side is set to 3% by weight or more so that it becomes possible to securely improve the face pressure characteristics and the sealing property.

When the difference between the crystallization rate of the portion on the first face side and the crystallization rate of the portion on the second face side is less than 3% by weight, the difference between the crystallization rates of the two sides becomes too small, it may not be able to provide the target characteristics.

In accordance with the invention according to the second group of the present invention, the crystallization rate of the portion on the first face side and the crystallization rate of the portion on the second face side are respectively set in the above-mentioned desired ranges so that it becomes possible to securely improve the face pressure characteristics and the sealing property. In the case where the crystallization rate of the portion on the first face side exceeds 1% by weight or in the case where the crystallization rate of the portion on the second face side becomes less than 1% by weight, the difference between the crystallization rates of the two sides becomes too small, failing to provide the target characteristics. In contrast, when the crystallization rate on the second face side exceeds 10% by weight, the heat resistance on the corresponding portion may be degradated.

In accordance with the invention according to the second group of the present invention, since the ceramic body is composed of a catalyst carrier, and since the holding seal material is used as a catalyst converter-use holding seal material, it becomes possible to provide a catalyst-converter-use holding seal material that is also excellent in the sealing property in addition to the advantages that it has high initial face pressure, and is less susceptible to degradation with time in the face pressure.

In other words, in accordance with the invention according to the second group of the present invention, the holding seal material is provided as a catalyst converter-use holding seal material that uses alumina-silica based fibers as its constituent elements, and is placed in a gap between the catalyst carrier and the metal shell covering the outer circumference of the catalyst carrier.

In accordance with the invention according to the second group of the present invention, the crystallization rate is not even, and set to be different depending on portions. With this arrangement, the portion that has a relatively high crystallization rate, and is excellent in the heat resistance is placed on a high-temperature side, and the portion that has a relatively low crystallization rate, and is excellent in the elasticity and flexibility is placed on a low-temperature side. Therefore, the fibers are made less susceptible to brittleness on the high-temperature side, and on the low-temperature side, it becomes possible to avoid the occurrence of a gap to the other members. Thus, it becomes possible to achieve a holding seal material that has an excellent sealing property, in addition to the advantages that it has high initial face pressure, and is less susceptible to degradation with time in the face pressure.

In accordance with the invention according to the second group of the present invention, since the ceramic body comprises a catalyst carrier, and since the holding seal material is used as a catalyst converter-use holding seal material, it becomes possible to obtain a catalyst-converter-use holding seal material that has an excellent sealing property in addition to the advantages that it has high initial face pressure, and is less susceptible to degradation with time in the face pressure.

In other words, in accordance with the invention of the second group of the present invention, the holding seal material is provided as a catalyst-converter-use holding seal material that includes alumina-silica based fibers as its constituent elements, and is placed in a gap between the catalyst carrier and the metal shell that covers the outer circumference of the catalyst carrier.

In accordance with the invention according to the second group of the present invention, a mat-shaped fiber aggregation is sintered in a manner in which a gap is provided between the firing temperature on the first face side and the firing temperature on the second face side so that it is possible to securely form a holding seal material having different crystallization rates on the respective sides comparatively easily. Moreover, this manufacturing method is also suitable for the manufacturing process of the holding seal material in which the crystallization rate is gradually increased from the first face side toward the second face side in a sheet of fiber aggregation. Moreover, a conventional firing device is commonly applied to this manufacturing method without the necessity of utilizing a special firing device. Thus, it becomes possible to avoid an increase in the facility costs.

In accordance with the invention according to the second group of the present invention, the difference between the firing temperatures is set to 100° C. or more so that the first face side and the second face side are made different from each other in the easiness in firing with a difference in the crystallization rates being formed between the both faces. Thus, it becomes possible to more securely form a holding seal material having different crystallization rates on the respective sides.

In accordance with the invention according to the second group of the present invention, the firing temperature on the first face side is set to a temperature lower than that on the second face side; therefore, upon firing, it is possible to provide a holding seal material in which the crystallization rate gradually increases from the first face side toward the second face side.

When the firing temperature on the first face side is less than 800° C., the firing reaction does not progress sufficiently, failing to provide mechanical strength that is required. When the firing temperature on the first face side exceeds 1100° C. or when the firing temperature on the second face side is less than 1100° C., the difference between the crystallization rates of the two sides becomes too small, failing to obtain the target characteristics. When the firing temperature on the second face side exceeds 1400° C., the crystallization progresses excessively, may cause degradation in the mechanical strength and heat resistance.

The operations of the invention according to the second group of the present invention are described as follows. Normally, when a catalyst converter is used, the catalyst carrier, which is directly exposed to a high-temperature fluid, comes to have a higher temperature, while the metal shell does not have a temperature as high as the catalyst carrier. Therefore, the high-temperature resistance is especially required on the face side that is made in contact with the catalyst carrier. By taking this fact into consideration, the above-mentioned invention allows the second face side that has a comparatively greater crystallization rate, that is, the face side that is excellent in the heat resistance, to contact the catalyst carrier. Further, the first face side that has a comparatively smaller crystallization rate, that is, the face side that is excellent in the elasticity and flexibility although it is inferior in the heat resistance, is made in contact with the metal shell. Consequently, the fibers on the portion that is made in contact with the catalyst carrier are less susceptible to brittleness, and make it possible to form a holding seal material that has a high initial face pressure, and is less susceptible to degradation with time in the face pressure. Moreover, since an elastic force is exerted on the portion in contact with the metal shell, this structure makes it possible to reduce the occurrence of a gap to the metal shell, and consequently to provide a holding seal material that is excellent in the sealing property.

As described above, it is possible to achieve a catalyst converter that is excellent in the holding property in the catalyst carrier, and less susceptible to leakage of fluid with high process efficiency.

The following description will be given of "operations" of the third group of the present invention.

In accordance with the invention according to the third group of the present invention, the fiber having a non-circular shape in its cross-section becomes more flexible than the fiber having a circular shape in its cross-section. In other words, the non-circular shape of the above-mentioned fiber provides a characteristic in which it is bent in a specific direction comparatively easily.

Further, this characteristic makes the fiber less susceptible to breaking, and also makes it possible to maintain the repulsive force for a long time. Here, in the present specification, "the cross-section of a fiber" refers to a cross-section formed when a fiber is cut perpendicularly to the extending direction of the fiber.

In accordance with the invention according to the third group of the present invention, the fiber having a deformed shape in its cross-section becomes more flexible than the fiber having a circular shape in its cross-section. In other words, the deformed shape of the above-mentioned fiber provides a characteristic in which it is bent in a specific direction comparatively easily. Consequently, this characteristic makes the fiber less susceptible to breaking, and also makes it possible to maintain the repulsive force for a long time.

In accordance with the invention according to the third group of the present invention, the fiber having a flat shape in its cross-section becomes more flexible than the fiber having a circular shape in its cross-section. In other words, the flat shape of the above-mentioned fiber provides a characteristic in which it is bent in a specific direction comparatively easily. Consequently, this characteristic makes the fiber less susceptible to breaking, and also makes it possible to maintain the repulsive force for a long time.

In accordance with the invention according to the third group of the present invention, when the holding seal material is formed by using fibers, each having a virtually elliptical or cocoon shape in its cross-section, the fibers are easily engaged with each other, making the fibers less susceptible to sliding and deviation with each other. Therefore, it becomes possible to reduce degradation in the face pressure.

In accordance with the invention according to the third group of the present invention, the hollow fiber having a space inside thereof is excellent in its heat-insulating property in comparison with a fiber without a space inside thereof. Therefore, when the fibers of this type are used in a holding seal material, it is possible to reduce the quantity of heat that is released from the ceramic body to the metal shell, and consequently to carry out a catalyst reaction effectively. Moreover, in the hollow fiber, sound and vibration are absorbed and damped by the space inside the fiber. Therefore, when the fibers of this type are used in a holding seal material, it is possible to provide excellent noise-insulation and vibration-insulation properties.

In accordance with the invention according to the third group of the present invention, since the ceramic body comprises a catalyst carrier, and since the holding seal material is used as a catalyst converter-use holding seal material, it is possible to obtain a catalyst-converter-use holding seal material that is able to maintain the repulsive force for a long time.

In other words, in accordance with the invention according to the third group of the present invention, the holding seal material of the present invention of the third group is provided as a catalyst-converter-use holding seal material that has alumina-silica based fibers as its constituent elements and is placed in a gap between the catalyst carrier and the metal shell covering the outer circumference of the catalyst carrier.

In accordance with the invention according to the third group of the present invention, a spinning stock solution is discharged through a nozzle having a non-circular shape in its cross-section. Immediately after discharged from the discharging section of the nozzle, the precursor fiber has a cross-sectional shape to which the cross-sectional shape of the discharging section is reflected in a certain degree. However, as time has elapsed since the discharge, the cross-sectional shape thereof tends to have a roundness (in other words, is subjected to the Barus' effect) due to the influence of a surface tension exerted on the precursor fiber so that the cross-section of the precursor fiber has a circular shape. Therefore, dry hot air is blown thereto in a state immediately after the discharge so that the precursor fiber is dried and solidified by being removed its moisture in the precursor fiber. Consequently, it is possible to maintain a desired cross-sectional shape given by the discharging section of the nozzle, and consequently to obtain a fiber having a section of a non-circular shape comparatively easily.

In accordance with the invention according to the third group of the present invention, the dry hot air is blown to the precursor fiber in a forward direction with respect to the discharging direction thereof so that the fiber is dried and solidified, and also extended simultaneously. Moreover, by carrying out the extending process in this manner, it becomes possible to control the fiber diameter and shape comparatively easily.

In accordance with the invention according to the third group of the present invention, a water-soluble plasticizer is preliminarily added to the spinning stock solution so that the elastic modulus of the spinning stock solution becomes smaller with the Barus' effect being reduced. Therefore, the discharge behavior of the spinning stock solution at the time of the spinning process is stabilized. Consequently, the fiber becomes less susceptible to thread breakage even when it is extended with a strong tension, and the fiber cross-sectional shape becomes less susceptible to have roundness due to elastic deformation. Moreover, the above-mentioned plasticizer has a water-soluble property so that it is dispersed in the spinning stock solution evenly. Thus, it becomes possible to reduce the Barus' ratio to a virtually fixed value, and consequently to obtain a fiber having the target fiber diameter and cross-sectional shape comparatively easily.

The following description will be given of "operations" of the fourth group of the present invention.

In accordance with the invention according to the fourth group of the present invention, in the case where a holding seal material constituted by alumina-silica based fibers each having a fiber diameter with the dispersions thereof being set within ±3 µm, it becomes possible to accumulate the fibers evenly, and consequently to reduce the positional dependence of the basis weight. Therefore, it becomes possible to reduce dispersions in the face pressure value, and consequently to provide stable quality.

In accordance with the invention according to the fourth group of the present invention, in the case where a holding seal material constituted by alumina-silica based fibers each having a fiber length with the dispersions thereof being set within ±4 mm, it becomes possible to accumulate the fibers evenly, and consequently to reduce the positional dependence of the basis weight. Therefore, it becomes possible to reduce dispersions in the face pressure value, and consequently to provide stable quality.

In accordance with the invention according to the fourth group of the present invention, the synergistic effect obtained by reducing both of the fiber-diameter dispersion and the fiber-length dispersion makes it possible to further reduce the positional dependence of the basis weight, and consequently to further reduce the dispersions in the face pressure value.

In accordance with the invention according to the fourth group of the present invention, the content of shot (non-fiber material) in the holding seal material is set to 3% by weight or less so that it becomes possible to further reduce the positional dependence of the basis weight, and consequently to further reduce the dispersions in the face pressure value.

In accordance with the invention according to the fourth group of the present invention, it becomes possible to extremely reduce the positional dependence of the basis weight, and consequently to further reduce the dispersions in the face pressure value, and it also becomes possible to improve the face pressure and sealing property.

The average fiber diameter of less than 5 µm makes it difficult to provide a sufficient face pressure due to a reduction in the strength of the fiber, and also causes a problem in which the fibers tend to be inhaled by the respiratory organs. In the case of the average fiber diameter exceeding 15 µm, when the fibers are formed into a mat-shaped fiber aggregation, its aeration resistance is reduced, resulting in degradation in the sealing property. In addition to this adverse effect, there might be degradation in the breaking strength. This adverse effect is considered to be caused by an increase in small scratches generated by an increase in the fiber surface area.

The case where the average fiber length being less than 5 mm causes a problem in which the fibers tend to be inhaled by the respiratory organs. Moreover, this fiber no longer substantially exhibits characteristics as the fiber, and when the fibers are formed into a mat-shaped fiber aggregation, the fibers are not allowed to entangle with one another preferably, making it difficult to obtain a sufficient face pressure. The average fiber length exceeding 20 mm makes the fibers entangled with one another too strongly, with the result that the fibers tend to be accumulated unevenly when the fibers are formed into a mat-shaped aggregation. In other words, the positional dependence of the basis weight becomes higher, causing an adverse effect to the reduction in the dispersions in the face pressure value.

When the content of the shot is high, the positional dependence of the basis weight becomes higher, causing an adverse effect to the reduction in the dispersions in the face pressure value.

In accordance with the invention of claim 35 according to the fourth group of the present invention, since the ceramic body is composed of a catalyst carrier, and since the holding seal material is used as a catalyst converter-use holding seal material, it becomes possible to reduce the dispersions in the face pressure value, and also to provide a catalyst-converter-use holding seal material with stable quality.

In other words, in accordance with the invention according to the fourth group of the present invention, the holding seal material of the fourth group of the present invention forms a catalyst-converter-use holding seal material that includes alumina-silica based fibers as its constituent elements, and is placed in a gap between the catalyst carrier and the metal shell that covers the outer circumference of the catalyst carrier.

In accordance with the invention according to the fourth group of the present invention, since the spinning process is carried out by using an inorganic salt method, it is possible to control the fiber diameter in a narrow range by properly setting the shape and size of the discharging section. Thus, it becomes possible to reduce dispersions in the fiber diameter. Moreover, this method chops long fibers to obtain short fibers; therefore, different from a method in which fibers are obtained through a blowing process, it is possible to control the fiber length in a narrow range. Thus, it becomes possible to reduce dispersions in the fiber length. In addition to these effects, it is also possible to avoid the generation of shot. Consequently, this manufacturing method makes it possible to obtain the above-mentioned holding seal material securely with ease.

The following description will be given of "operations" of the fifth group of the present invention.

In accordance with the invention according to the fifth group of the present invention, it is possible to provide a structure wherein, so to speak, a cross-linking bridge is placed between portions at which ceramic fibers are adjacent to each other with overlapped parts, and consequently to make the respective fibers less susceptible to sliding and deviation. Therefore, even when an external compressing load has been imposed on the holding seal material for a long time, the member is less susceptible to reduction in the face pressure. Moreover, in the holding seal material of the present invention, the fibers are partially bonded to each other so that the voids inside the holding seal material are not entirely filled, thereby making it possible to maintain physical characteristics (elasticity, heat insulating property and the like) originally required for the holding seal material. Moreover, since a ceramic adhesive that is excellent in heat resistance is used, the bonded portions are less susceptible to reduction in the strength even if the holding seal material is subjected to a high temperature when it is used.

In accordance with the invention according to the fifth group of the present invention, since the ceramic adhesive is made of a substance constituting the ceramic fibers, it has a high affinity for the fibers, and allows the bonded portions to have high strength.

Therefore, it becomes possible to securely prevent degradation with time in the face pressure.

In accordance with the invention according to the fifth group of the present invention, since alumina-silica based fibers containing a minute amount of amorphous component are used, it is possible to improve the heat resistance of the fibers itself, and consequently to reduce the degradation with time in the face pressure at high temperatures. Since the ceramic adhesive mainly composed of alumina has a very high affinity for alumina-silica based fibers, it is possible to further provide higher strength to the bonded portions.

In accordance with the invention according to the fifth group of the present invention, by setting the content of the ceramic adhesive in the above-mentioned desired range, it is possible to provide high strength to the bonded portions while maintaining desired physical properties in the holding seal material.

When the above-mentioned content is less than 1% by weight, the fibers might not be bonded to one another with high strength. In contrast, in the case where the above-mentioned content exceeds 8% by weight, although the problem with the bonding strength is solved, the voids inside the holding seal material tend to be filled, failing to provide desired physical properties as the holding seal material.

In accordance with the invention according to the fifth group of the present invention, since the ceramic body is composed of a catalyst carrier, and since the holding seal material is used as a catalyst converter-use holding seal material, it is possible to provide a catalyst converter-use holding seal material which is less susceptible to degradation with time in the face pressure even when an external load is imposed thereon for a long time, and is also less susceptible to reduction in the strength of the bonded portions even when it is subjected to a high temperature.

In other words, in accordance with the invention according to the fifth group of the present invention, the holding seal material of the fifth group of the present invention forms a catalyst-converter-use holding seal material that includes alumina-silica based fibers as its constituent elements, and is placed in a gap between the catalyst carrier and the metal shell that covers the outer circumference of the catalyst carrier.

In accordance with the invention according to the fifth group of the present invention, since the firing step and the bonding process of the precursor fibers are carried out separately, it becomes possible to securely obtain ceramic fibers having a desired shape in comparison with a case in which both of the processes are carried out simultaneously, and it is also possible to securely bond the fibers having the above-mentioned desired shape. Therefore, it becomes possible to securely produce a holding seal material that is less susceptible to degradation with time in the face pressure with ease.

In accordance with the invention according to the fifth group of the present invention, since a surface tension is exerted on a material solution of the liquid-state ceramic adhesive, the material solution is allowed to securely adhere to portions at which the fibers are adjacent to each other with overlapped parts, when this is supplied to the aggregation. By heating this in this state, the specific component in the material solution adhered to the corresponding portions is formed into ceramics, thereby providing a cross-linking structure between the fibers.

In accordance with the invention according to the fifth group of the present invention, a surface tension is exerted on a water-soluble metal solution with low viscosity; therefore, when the aggregation is impregnated with this solution, the solution is allowed to securely adhere to portions at which the fibers are adjacent to each other with overlapped parts. Here, the impregnation method makes it possible to securely inject the solution to the inside of the aggregation evenly. In this state, the aggregation is first dried to remove moisture to a certain degree, and then heated so that the metal component in the solution adhered to the corresponding portions is oxidized to form ceramics, thereby providing a cross-linking structure between the fibers.

In accordance with the invention in accordance with the fifth group of the present invention, the quantity of supply of the water-soluble metal solution is set in the aforementioned preferable range so that it becomes possible to increase the strength of the bonded portions while maintaining desired physical properties of the holding seal material.

The quantity of supply of less than 1% by weight causes an insufficient quantity of the solution to adhere to the portions at which the fibers are adjacent to each other with overlapped parts, sometimes failing to mutually bond the fibers strongly.

In contrast, the quantity of supply exceeding 10% by weight causes the voids inside the holding seal material to be easily filled with the excessive solution, sometimes impairing desired physical properties in the holding seal material.

In accordance with the invention according to the fifth group of the present invention, it is possible to form a cross-linking structure made from alumina having a high affinity for the fibers between the alumina-silica based fibers. Therefore, it is possible to increase the strength of the bonded portions, and consequently to securely prevent degradation with time in the face pressure. Moreover, the fibers obtained through the inorganic salt method have a crystal structure so that the resulting advantage is to provide higher strength at high temperatures, in comparison with amorphous fibers obtained through a fusing method.

Consequently, it is possible to obtain a holding seal material that is less susceptible to degradation in the face pressure at high temperatures.

In accordance with the invention according to the fifth group of the present invention, the precursor fibers are formed into ceramics through a firing step to provide alumina-silica based fibers. In this case, portions at which the fibers are adjacent to each other with overlapped parts are bonded through a liquid-state substance (that is, ceramic adhesive) that has been formed into ceramics. In this manner, in the eleventh invention of the fifth group of the present invention, since the firing step and bonding process of the precursor fibers are carried out simultaneously, it is possible to reduce the number of heating steps in comparison with a case in which these processes are carried out separately. Thus, it is possible to reduce the manufacturing costs. Consequently, it becomes possible to manufacture a holding seal material that is less susceptible to degradation with time in the face pressure effectively at low costs.

In accordance with the invention according to the fifth group of the present invention, when the aggregation is put under a high humidity environment with high moisture, water vapor, which has entered the inside of the aggregation, is condensed to moisture. The moisture is allowed to selectively adhere to adjacent overlapped portions of the fibers through a surface tension exerted thereon. Since the precursor fibers of the alumina-silica based fibers are water-soluble so that the adjacent overlapped portions are dissolved to a certain degree due to the adhesion of the moisture. Then, since a liquid-state substance, generated by such dissolution, has virtually the same composition as the alumina-silica based fibers, this is actually allowed to form a ceramic adhesive later. In other words, in accordance with the above-mentioned present invention, the liquid-state substance, which will form a ceramic adhesive later, is securely allowed to adhere to the adjacent overlapped parts. Moreover, since the liquid-state substance basically has virtually the same composition as the alumina-silica based fibers, it has a high affinity for the above-mentioned precursor fibers, and makes it possible to securely bond the fibers mutually with high strength. Consequently, it becomes possible to securely prevent degradation with time in the face pressure.

In accordance with the invention according to the fifth group of the present invention, a non-aqueous liquid-state substance is atomized and supplied so that the liquid-state substance is securely injected to the inside of the aggregation, and allowed to selectively adhere to the adjacent overlapped portions between the fibers through a function of surface tension. In other words, in accordance with the above-mentioned present invention, it is possible to allow the liquid-state substance which will form a ceramic adhesive later to securely adhere to the adjacent overlapped parts. Moreover, the above-mentioned liquid-state substance is a non-aqueous substance; therefore, even when this adheres to the precursor fibers of the alumina-silica based fibers having a water-soluble property, this does not dissolve the fibers. Therefore, it is possible to avoid a possibility that the precursor fibers are dissolved too much with the result that the strength of the fibers is lowered, and it is not necessary to precisely set conditions for preventing the over-dissolving. Consequently, it is possible to manufacture a holding seal material comparatively easily. Moreover, since the above-mentioned liquid-state substance contains inorganic elements contained in the alumina-silica based fibers so that it exerts a high affinity for the precursor fibers, and makes it possible to securely bond the fibers mutually with high strength. Therefore, it becomes possible to securely prevent degradation with time in the face pressure.

In accordance with the invention according to the fifth group of the present invention, the following operations are obtained. Since the precursor fibers are un-sintered and comparatively soft, these are not susceptible to cracks and the like in a cutting portion even when an impact is exerted thereon during a cutting process. Therefore, the alumina-silica based fibers, obtained by sintering these, are excellent in mechanical strength with stable end shapes. Thus, it becomes possible to improve the initial face pressure. In contrast, in the case where the precursor fibers are subjected to a cutting process after having been sintered, the impact at the time of the cutting process tends to cause cracks in the cutting portion of the alumina-silica based fibers. This is because, in general, when precursor fibers are sintered to form ceramics, the fibers become brittle although they become hard. Consequently, not only the alumina-silica based fibers come to have unstable end shapes, but also the mechanical strength of the fibers is lowered.

In accordance with the invention according to the fifth group of the present invention, the ceramic fibers, which are aggregated three-dimensionally, are partially bonded to one another by a ceramic adhesive so that this structure is less susceptible to sliding and deviation among the mutual fibers, and also less susceptible to reduction in the face pressure. Moreover, since the fibers are partially bonded to one another in the above-mentioned ceramic fiber aggregation, the voids inside thereof are not entirely filled, with sufficient elasticity and heat-insulating property being maintained. Moreover, since the ceramic adhesive that is excellent in heat resistance is used, this structure is less susceptible to reduction in the strength in the bonded portions even when it is subjected to a high temperature.

In accordance with the invention according to the fifth group of the present invention, since this arrangement contains ceramic fibers having a branching structure, it makes the fibers less susceptible to sliding and deviation with each other in comparison with an arrangement having no branching structure.

In accordance with the invention according to the fifth group of the present invention, when comparison is made between an arrangement which contains the ceramic fibers having a branching structure and an arrangement which contain the ceramic fibers having no branching structure, the former is less susceptible to sliding and deviation among the fibers in comparison with the latter, when these are aggregated three-dimensionally. Thus, the former arrangement makes it possible to provide a fiber aggregation that is less susceptible to degradation in the face pressure.

The following description will be given of "operations" of the sixth group of the present invention.

The sixth group of the present invention has an arrangement in which a firing step is carried out after a spinning process, a chopping process and a mat-forming process have been executed; therefore, the cut face of the short fiber precursor is free from the generation of chips, burs and microcracks, and this is then subjected to the firing step so that it is possible to manufacture alumina short fibers that are excellent in the mechanical strength, and consequently to provide an alumina fiber aggregation that has a sufficiently high initial face pressure, and is less susceptible to degradation with time in the face pressure.

Figure 1:
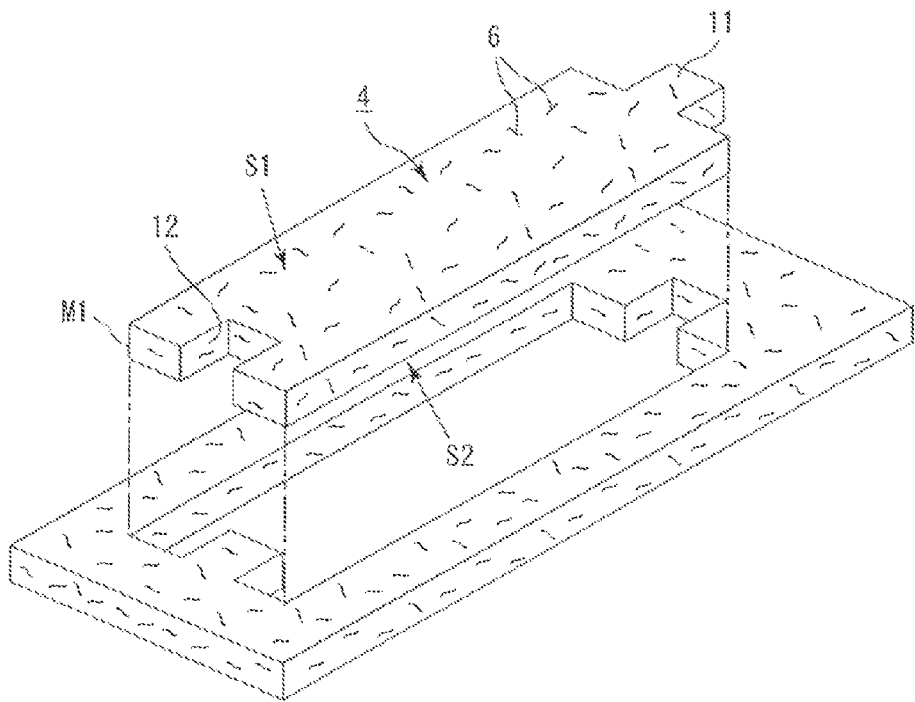
FIG. 1 is a perspective view showing a holding seal material in an embodiment of the present invention.

EXPLANATION OF SYMBOLS 1 catalyst converter
2 catalyst carrier
3 metal shell
4 holding seal material
6 alumina-silica based fiber
6A precursor fiber
7 ceramic adhesive
17 flow path
18 spinning stock solution
19 nozzle
19a metal mouth serving as nozzle discharging section
20 catalyst carrier
30 honeycomb filter
33 seal material layer
34 bonding layer
35 ceramic block
40 porous ceramic member
41 filler
42 through hole
43 partition wall
50 holding seal material
51 base material portion
52 convex fitting section
53 concave fitting section
A1 extending direction
M1 fiber aggregation
S1 first face side
S2 second face side

DETAILED DISCLOSURE OF THE INVENTION

First, the following description will be given of embodiments according to a first group of the present invention.

Figure 2:
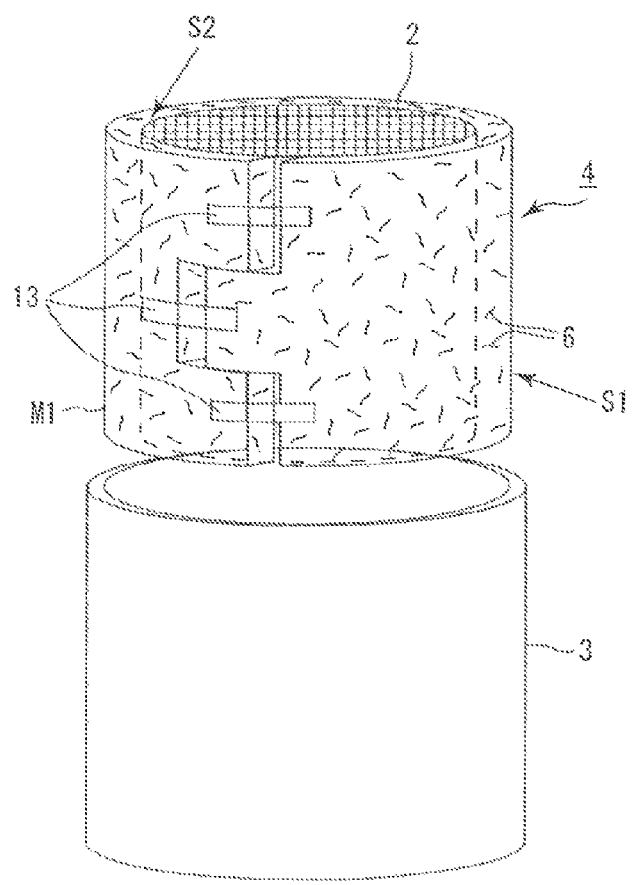
FIG. 2 is a perspective view for describing manufacturing processes of a catalyst converter in the above-mentioned embodiment.
Figure 3:
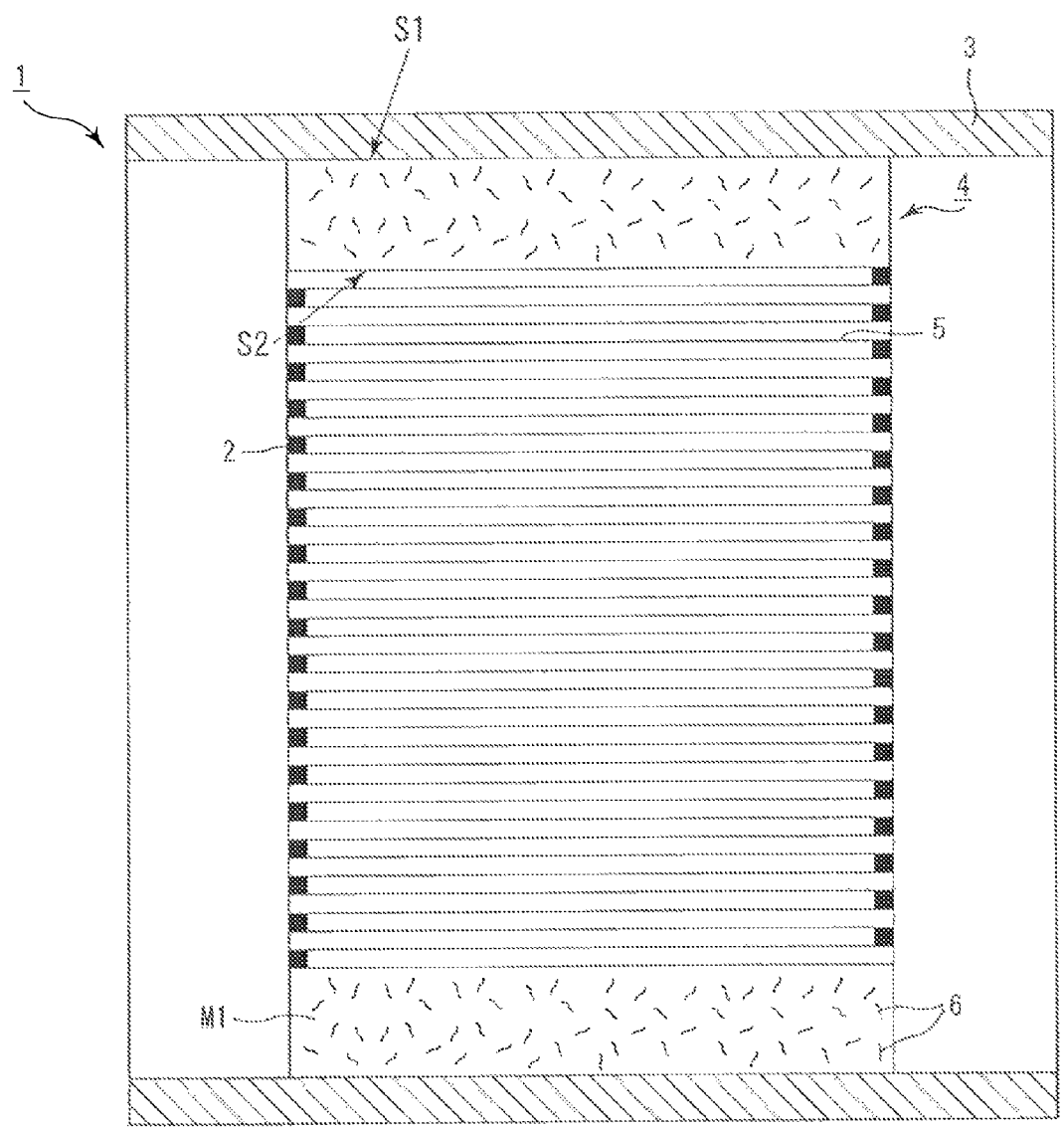
FIG. 3 is a cross-sectional view showing the catalyst converter of the above-mentioned embodiment.

Referring to FIGS. 1 to 3, the following description will be given of a catalyst converter used for an automobile exhaust gas purifying device according to one embodiment of the first group of the present invention in detail.

This catalyst converter 1 according to the embodiment of the first group of the present invention, shown in FIG. 3, is placed in the middle of an exhaust pipe of an engine in a chassis of an automobile. Since the distance from the engine to the catalyst converter 1 is relatively short, exhaust gas having a high temperature of approximately 700 to 900° C. is supplied to the catalyst converter 1. In the case where the engine is a lean-burn engine, exhaust gas having a higher temperature of approximately 900 to 1000° C. is supplied to the catalyst converter 1.

As shown in FIG. 3, the catalyst converter 1 of the embodiment according to the first group of the present invention is basically constituted by a catalyst carrier 2, a metal shell 3 covering the outer circumference of the catalyst carrier 2, and a holding seal material 4 which is placed in a gap between the two members 2 and 3.

The catalyst carrier 2 is made from a ceramic material which is typically represented by cordierite and the like. The catalyst carrier 2 is a column-shaped member having a circular shape in its cross-section.

Moreover, the cross-sectional shape of the catalyst carrier 2 is not limited to a complete round shape, and may have, for example, an elliptical shape or an elongated circular shape. In this case, the cross-sectional shape of the metal shell 3 may be changed to an elliptical shape or an elongated circular shape correspondingly.

Moreover, the catalyst carrier 2 is preferably a honeycomb structural body having a number of cells 5 that extend in the axis direction. A noble metal based catalyst such as platinum and rhodium, which can purify exhaust gas components, is carried on the cell walls. Here, with respect to the catalyst carrier 2, in addition to the above-mentioned cordierite carrier, for example, a honeycomb porous sintered body and the like made of, for example, silicon carbide, silicon nitride and the like, may be used.

Moreover, with respect to the catalyst carrier 2, in addition to the cordierite carrier molded into a honeycomb shape shown in the embodiment, a honeycomb porous sintered body made of, for example, silicon carbide, silicon nitride and the like, may be used.

Figure 4:
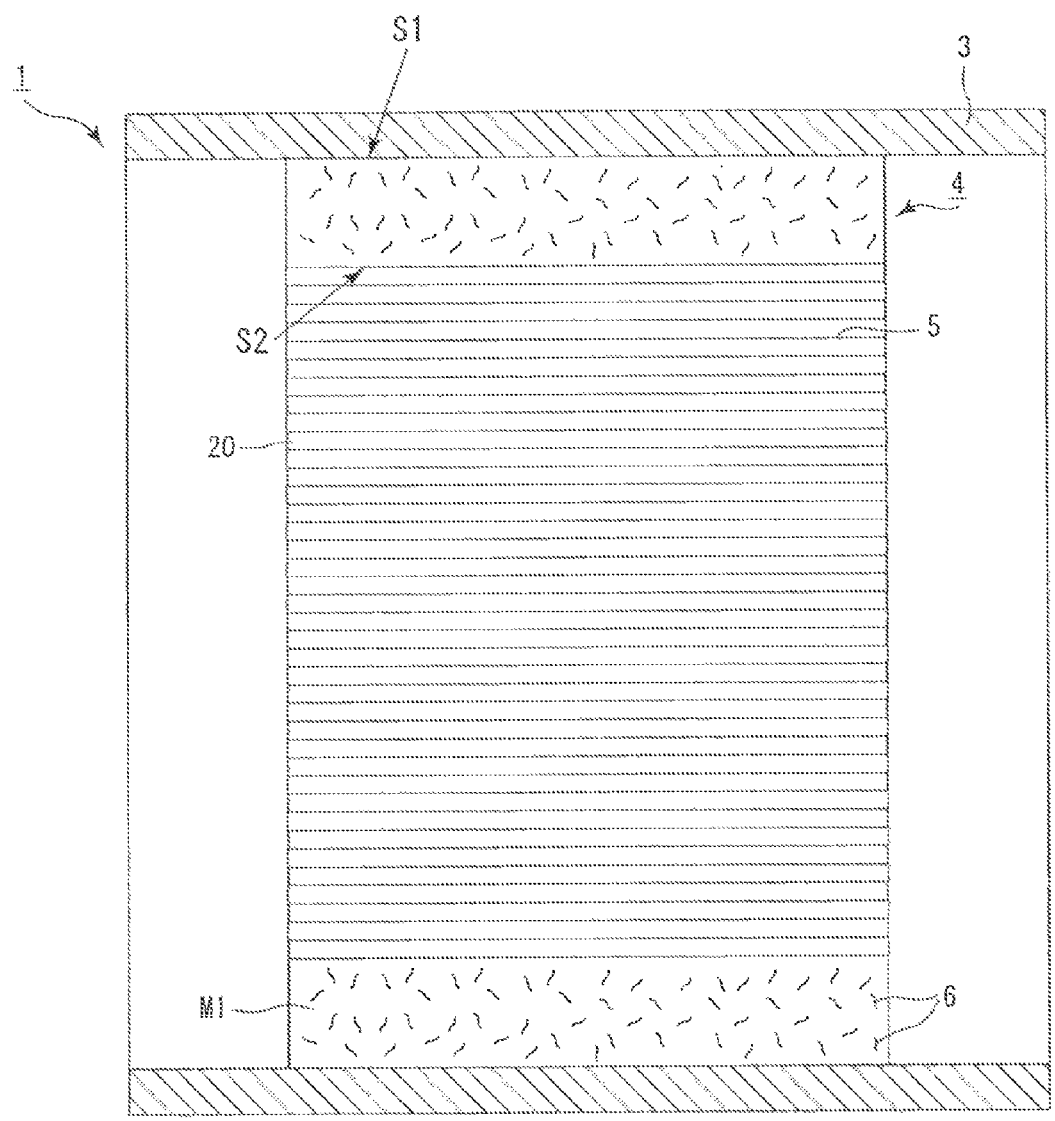
FIG. 4 is a cross-sectional view showing a catalyst converter of another embodiment.

In FIG. 3, the catalyst carrier 2 has a structure in which either the inlet side or the outlet side of each cell 5 is sealed with a sealing member; however, as shown in FIG. 4, a catalyst carrier 20 having a structure in which neither the inlet side nor the outlet side of each cell 5 is sealed with a sealing member may be used.

Here, in the following, description will be given of the catalyst converter 1 shown in FIG. 3.

With respect to the metal shell 3, in the case where, for example, a press-fitting scheme is adopted upon assembling, a metal cylinder member having an O-letter shape in its cross-section is used. Here, with respect to a metal material forming the cylinder member, metal, which is excellent in heat resistance and impact resistance, (for example, steel products and the like, such as stainless steel), is preferably selected. In the case where a so-called canning scheme is adopted instead of the press-fitting scheme, members formed by dividing the above-mentioned metal cylinder member having the O-letter shape in its cross-section into a plurality of pieces along the axis direction (that is, clam shells) are used.

In addition to this arrangement, in the case where a wrap-tightening scheme is adopted upon assembling, for example, a metal cylinder member having a C-letter shape or a U-letter shape in its cross-section, that is, a metal cylinder member having a slit (opening section) extending along the so-called axis direction at only one portion, is used. In this case, upon assembling the catalyst carrier 2, a structure in which the holding seal material 4 is secured to the catalyst carrier 2 is housed inside the metal shell 3, and in this state, the metal shell 3 is wrapped and tightened, and the opening ends thereof is then joined (by welding, bonding, bolt-fastening and the like). Joining works such as welding, bonding and bolt-fastening are carried out in the same manner, also in the case where the canning scheme is adopted.

As shown in FIG. 1, the holding seal material 4 is a mat-shaped member having an elongated shape, and a convex fitting section 11 is placed on its one end, and a concave fitting section 12 is placed on the other end. As shown in FIG. 2, upon wrapping onto the catalyst carrier 2, the convex fitting section 11 is just engaged with the concave fitting section 12.

Moreover, the shape of the holding seal material 4 may be desirably modified. For example, by omitting the concave and convex fitting sections 11, 12, a simpler shape may be used.

The holding seal material 4 of the embodiment according to the first group of the present invention is constituted by ceramic fibers aggregated into a mat shape (that is, a fiber aggregation) serving as a main element. With respect to the above-mentioned ceramic fibers, in the embodiment according to the first group of the present invention, alumina-silica based fibers 6 are used. In this case, alumina-silica based fibers 6 in which the mullite crystal content is set in a range of 0% by weight or more to 10% by weight or less are preferably used. Such a chemical composition makes it possible to reduce the amorphous component, and consequently to provide excellent heat resistance; thus, it becomes possible to provide a high repulsive force upon application of a compressive load. Therefore, even when these fibers are subjected to a high temperature while being placed in the gap, it is possible to make them less susceptible to reduction in the face pressure.

The quantity of alumina in the alumina-silica based fibers 6 is preferably set in a range of 40 to 100% by weight, and the quantity of silica is preferably set in a range of 0 to 60% by weight.

Moreover, the lower limit of the average fiber diameter of the alumina-silica based fibers 6 is set to approximately 3 μm, and the upper limit thereof is set to approximately 25 μm, more preferably, the lower limit of the average fiber diameter thereof is set to approximately 5 μm, and the upper limit thereof is set to approximately 15 μm. This is because, when the average fiber diameter is too small, the fibers tend to cause a problem in which the fibers are inhaled by the respiratory organs. The lower limit of the average fiber length of the alumina-silica based fibers 6 is set to approximately 0.1 mm, and the upper limit thereof is set to approximately 100 mm, and more preferably, the lower limit of the average fiber length thereof is set to approximately 2 mm, and the upper limit thereof is set to approximately 50 mm.

Different from normal alumina-silica based fibers that have a transparent whitish color, the alumina-silica based fibers 6 of the embodiment according to the first group of the present invention are characterized by a blackish color.

The alumina-silica based fibers 6 having "the blackish color" include those having not only a black color (pitch-black), but also a grayish black color.

Here, the alumina-silica based fibers 6 are preferably set to have a brightness of N8 or less which is specified in JIS Z 8721.

In this case, N of the brightness refers to a symbol determined as follows. By setting an optimal brightness of black to 0 while setting an optimal brightness of white to 10, the respective colors between the brightness of black and the brightness of white are divided into 10 in brightness, and indicated by symbols of N0 to N10, so as to allow the sense of brightness of colors in the same symbol to be represented by the same rate.

In the actual measurements, each color is compared with color notes corresponding to N0 to N10. In this case, the first digit below the decimal point is set to 0 or 5.

The blackish color in which the alumina-silica based fibers 6 are colored is derived from carbon components contained in a spinning stock solution.

The lower limit of the quantity of residual carbon components in the alumina-silica based fibers 6 is set to 1% by weight or more, preferably, the lower limit thereof is set to 1% by weight with the upper limit being set to 20% by weight, and more preferably, the lower limit thereof is set to 5% by weight with the upper limit being set to 10% by weight. The quantity of residual carbon components of less than 1% by weight tends to fail to improve the mechanical strength sufficiently. In contrast, an excessive quantity of residual carbon components tends to cause degradation in the basic physical properties (for example, heat resistance and the like) of the alumina-silica based fibers 6.

The quantity of carbon components can be calculated with respect to the reference sample during the manufacturing process, or by using a laser Raman spectrometer or based upon the intensity ratio, etc. of X-rays, the quantity of carbon components can be calculated.

The fiber tensile strength of the alumina-silica based fibers 6 is preferably set to 1.2 GPa or more, more preferably 1.5 GPa or more. The fiber bending strength thereof is preferably set to 1.0 GPa or more, more preferably 1.5 GPa or more. The breaking strength is set to 0.8 $MN/m^{3/2}$ or more, more preferably 1.3 $MN/m^{3/2}$ or more. This is because increasing the values of the fiber tensile strength, fiber bending strength and breaking strength makes it possible to provide alumina-silica based fibers 6 that can resist tension and bending sufficiently, and are flexible and less susceptible to fracturing.

Additionally, the alumina-silica based fibers 6 of the embodiment according to the first group of the present invention contain carbon components in the fibers so that it is considered that crystallization is allowed to progress in the entire alumina-silica based fibers 6, thereby increasing the tensile strength.

In addition to a complete round shape, the cross-sectional shape of the alumina-silica based fibers 6 may be set to a deformed cross-sectional shape (such as an elliptical shape, an elongated circular shape and a generally-triangular shape).

The lower limit of the thickness of the holding seal material 4 in the state prior to the assembling process is preferably set to approximately 1.1 times greater than a gap between the catalyst carrier 2 and the metal shell 3, more preferably approximately 1.5 times greater than the gap. Moreover, the upper limit of the thickness of the holding seal material 4 is preferably set to approximately 4.0 times greater than a gap between the catalyst carrier 2 and the metal shell 3, more preferably approximately 3.0 times greater than the gap. The above-mentioned thickness of less than 1.1 times fails to provide a high carrier holding property, resulting in the possibility of deviation and backlash of the catalyst carrier 2 with respect to the metal shell 3. Since this case of course fails to provide a high sealing property, leakage of exhaust gas tends to occur from the gap portion, failing to achieve a high pollution-preventive property. Moreover, the thickness exceeding 4.0 times makes it difficult to install the catalyst carrier 2 in the metal shell 3 especially when the fitting-in scheme is adopted. Therefore, this case tends to fail to improve the assembling property.

The lower limit of GBD (bulk density) of the holding seal material 4 after the assembling process is preferably set to 0.10 g/cm$^3$, and the upper limit thereof is preferably set to 0.30 g/cm$^3$; moreover, the lower limit of the above-mentioned GBD is more preferably set to 0.10 g/cm$^3$, and the upper limit thereof is more preferably set to 0.25 g/cm$^3$. When the value of GBD is extremely small, it sometimes becomes difficult to achieve a sufficiently high initial face pressure. In contrast, when the value of GBD is extremely great, the quantity of alumina-silica based fibers 6 to be used as a material increases, and tends to cause high costs.

The initial face pressure of the holding seal material 4 in the assembled state is set to 50 kPa or more, more preferably 70 kPa or more. This is because, when the value of the initial face pressure is high, it is possible to maintain a preferable holding property of the catalyst carrier 2, even in the event of degradation with time in the face pressure.

Here, the holding seal material 4 may be subjected to a needle punching process, a resin impregnation process and the like, if necessary. The application of these processes makes it possible to compress the holding seal material 4 in the thickness direction and consequently to make it thinner.

Next, description will be given of the sequence of processes for manufacturing a catalyst converter 1 according to the first group of the present invention.

First, an aluminum salt solution, silica sol and an organic polymer are mixed to form a spinning stock solution. In other words, the spinning stock solution is prepared through an inorganic salt method. The aluminum salt solution, which forms a source of alumina, also serves as a component for applying viscosity to the spinning stock solution.

Here, with respect to such an aqueous solution, an aqueous solution of basic aluminum salt is preferably selected. The silica sol, which serves as a silica source, also serves as a component for giving high strength to the fibers. The organic polymer, which is a component serving as a fiber-drawing property applying agent to the spinning stock solution, is also a component that serves as a carbon source for giving preferable mechanical strength to the alumina-silica based fibers 6 in the embodiment according to the first group of the present invention. With respect to the organic polymer, a straight chain polymer containing carbon, such as PVA (polyvinyl alcohol), may be used. Here, with respect to the component serving as a carbon source, not limited to the straight chain polymer, any component having a comparatively low molecular weight without a chain structure (which is not a polymer) may be selected as long as it contains carbon.

Next, by condensing under vacuum the resulting spinning stock solution, the spinning stock solution is prepared so as to have a concentration, temperature and viscosity suitable for the spinning process. In this case, the spinning stock solution, which had a concentration of approximately 20% by weight, is preferably condensed to approximately 30 to 40% by weight. Moreover, the viscosity thereof is preferably set to 10 to 2000 Poise.

Further, when the spinning stock solution thus prepared is discharged into air through a nozzle of a spinning device, a precursor fiber, which has a cross-sectional shape that is analogous to the nozzle metal mouth shape, is continuously obtained. The precursor fiber, thus subjected to the spinning process, is successively wound up while being extended. In this case, for example, a dry-type pressurizing spinning method is preferably adopted.

Moreover, carbon components contained in the precursor fibers thus obtained need not be derived from the organic polymer added thereto as the fiber-drawing property applying agent, and may be derived from a carbon source applied thereto separately. In this case, not limited to only the organic substance such as an organic polymer, for example, an inorganic substance such as carbon may be used.

Next, the precursor fiber is sintered through a firing step to be formed into ceramics (crystallized) so that the precursor fiber is hardened to obtain an alumina-silica based fiber 6.

In the firing step, it is necessary to heat the precursor fiber under an environment which makes it difficult to carry out an oxidizing reaction on the carbon component (that is, the above-mentioned organic polymer) contained in the precursor fiber. More specifically, in the embodiment according to the first group of the present invention, the heating step is carried out in a nitrogen atmosphere that is a typical inert atmosphere.

Here, the environment that makes it difficult to carry out an oxidizing reaction on the carbon component is not necessarily limited to an inert atmosphere, and includes, for example, an atmosphere having a reduced pressure. When the firing step is carried out in a reduced-pressure atmosphere, it is possible to suppress the progress of the oxidizing reaction in comparison with a case in which the firing step is carried out in a normal-pressure atmosphere.

Moreover, the firing step may be carried out in an inert atmosphere other than nitrogen, such as argon, or may be carried out in a reduced-pressure inert atmosphere.

Upon carrying out a heating step in a nitrogen atmosphere, the lower limit of the temperature is set to 1000° C., more preferably 1050° C., and the upper limit of the temperature is set to 1300° C., more preferably 1250° C.

The heating temperature of less than 1000° C. tends to cause an insufficient sintering step of the precursor fiber, resulting in difficulty in stably providing an alumina-silica based fiber 6 having high strength. In contrast, even when the heating temperature is set so as to exceed 1300° C., the alumina-silica based fiber 6 is not allowed to have high strength especially, and causes degradation in economical efficiency.

In other words, in the manufacturing method of alumina-silica based fibers according to the first group of the present invention, the heating step may be carried out on the precursor fibers in an inert atmosphere and/or under a reduced-pressure, in a firing step. In accordance with the manufacturing method of alumina-silica based fibers according to the first group of the present invention, it is possible to stably provide alumina-silica based fibers having excellent mechanical strength.

Successively, the long fibers of the alumina-silica based fibers 6 obtained from the above-mentioned respective steps are chopped into a predetermined length to form shorter fibers in a certain extent. Thereafter, the short fibers are collected, untied and laminated, or a fiber-dispersed solution, obtained by dispersing the short fibers in water, is poured into a mold, and pressed and dried so that a mat-shaped fiber aggregation is obtained. Further, this fiber aggregation is punched out into a predetermined shape to form a holding seal material 4 having a blackish color.

Then, the holding seal material 4 is impregnated with an organic binder, if necessary, and the resulting holding seal material 4 may then be compressed and molded in the thickness direction. With respect to the organic binder used in this case, polyvinyl alcohol, acrylic resin and the like may be used, in addition to latex and the like such as acrylic rubber and nitrile rubber and the like.

Moreover, the holding seal material 4 is wrapped around the outer circumferential face of the catalyst carrier 2 and secured by the organic tape 13. Thereafter, this is subjected to a press-fitting, canning or wrap-tightening step to complete a desired catalyst converter 1.

Consequently, in accordance with the embodiment according to the first group of the present invention, the following effects can be obtained.

The alumina-silica based fibers 6, used in the holding seal material 4, have a blackish color derived from carbon components, and is excellent in mechanical strength such as the fiber tensile strength, fiber bending strength and fracture toughness. Therefore, the application of these fibers makes it possible to achieve a holding seal material 4 which has a high initial face pressure, and is less susceptible to degradation with time in the face pressure. Consequently, it becomes possible to obtain a catalyst converter 1 which is excellent in the holding property of the catalyst carrier 2 and sealing property.

In the case where the catalyst converter 1 is constituted by using the blackish alumina-silica based fibers 6, even if a substance having a blackish color such as soot has adhered to the holding seal material 4, a change in the external appearance of the holding seal material 4 is hardly noticeable. In other words, since the holding seal material 4 originally has a blackish color, no major change occurs in color before and after the application. This point is advantageous in that any impression of "deteriorated" or "stained" is not given to the user.

In accordance with the manufacturing method of the embodiment according to the first group of the present invention, the firing step for sintering the precursor fibers is executed by carrying out a heating step under an environment which makes it difficult to carry out an oxidizing reaction on the carbon component contained in the precursor fibers. Therefore, it is possible to allow much carbon components to remain in the alumina-silica based fibers 6, and consequently to securely provide alumina-silica based fibers 6 that are excellent in mechanical strength with ease.

In accordance with the manufacturing method of the embodiment according to the first group of the present invention, an inexpensive nitrogen atmosphere is used as the inert atmosphere in which the firing step is carried out. For this reason, it is possible to reduce manufacturing costs of the holding seal material 4. Moreover, since the heating step is carried out by setting the firing temperature within the above-mentioned preferable range, it becomes possible to stably obtain alumina-silica based fibers 6 with high strength.

In accordance with the manufacturing method of the embodiment according to the first group of the present invention, the carbon component contained in the precursor fibers is derived from the organic polymer that has been added to the spinning stock solution as a fiber-drawing property applying agent. Therefore, it is not necessary to especially add carbon sources to the spinning stock solution in a separated manner, thereby making it possible to eliminate the necessity of greatly modifying the composition of the spinning stock solution. Thus, it is possible to preliminarily avoid imbalance in the stock solution composition, and consequently to prevent degradation in the basic physical properties in the alumina-silica based fibers 6. Moreover, since no carbon source needs to be added, it becomes possible to reduce the manufacturing costs. Furthermore, since the above-mentioned organic polymer is easily dispersed in the spinning stock solution evenly, the carbon sources are evenly dispersed in the precursor fibers. Consequently, the resulting alumina-silica based fibers 6 are allowed to have an even residual carbon content, and less susceptible to irregularity in the mechanical strength.

Moreover, the embodiment according to the first group of the present invention has exemplified a case where the holding seal material 4 according to the first group of the present invention is applied to a catalyst converter 1 used for an exhaust gas purifying device; however, the holding seal material 4 according to the first group of the present invention may of course be applied to devices other than the catalyst converter 1 used for an exhaust gas purifying device, such as a diesel particulate filter (DPF), a catalyst converter used for a fuel cell modifier and the like.

The following description will be given of an embodiment according to a second group of the present invention.

Referring to FIGS. 1 to 6, the following description will be given of a catalyst converter used for an automobile exhaust gas purifying device in accordance with one embodiment of the second group of the present invention in detail.

This catalyst converter 1 according to the embodiment of the second group of the present invention, shown in FIG. 3, is substantially the same as the catalyst converter according to the first group of the present invention, and formed from a catalyst carrier 2, a metal shell 3 covering the outer circumference of the catalyst carrier 2, and a holding seal material 4 which is placed in a gap between the two members 2 and 3.

Figure 7:
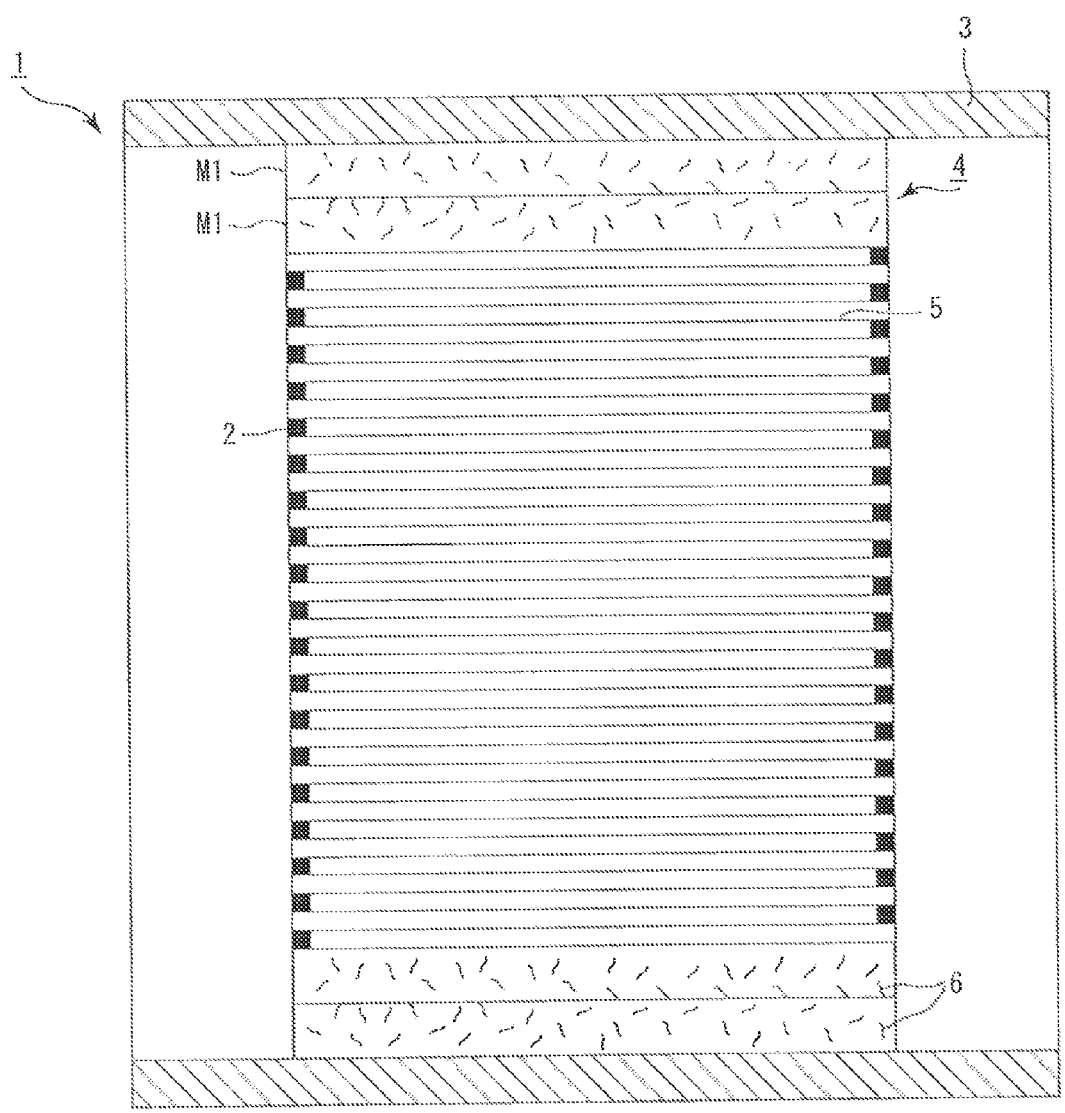
FIG. 7 is a cross-sectional view showing a catalyst converter of another example according to the second group of the present invention.

Moreover, in the same manner as a catalyst converter 1 of another example shown in FIG. 7, this converter may have a structure in which: the holding seal material 4 is constituted by a plurality of sheets (two in this case) of fiber aggregations M1 having mutually different crystallization rates, and these fiber aggregations M1 may be superposed and bonded to each other. In this case, the fiber aggregation M1 having a smaller crystallization rate needs to be made in contact with the metal shell 3, and the fiber aggregation M1 having a greater crystallization rate needs to be made in contact with the catalyst carrier 2.

Here, with respect to the catalyst carrier 2 and the metal shell 3, the same members that have been explained in the catalyst converter according to the first group of the present invention may be used; therefore, the description thereof is omitted.

Moreover, not limited to a complete round shape, the cross-sectional shape of the catalyst carrier 2 may be set to, for example, an elliptical shape or an elongated circular shape. In such a case, the cross-sectional shape of the metal shell 3 may be modified to an elliptical shape or an elongated circular shape in a corresponding manner.

Moreover, with respect to the catalyst carrier 2, in addition to a cordierite carrier molded into a honeycomb shape shown in the embodiment, for example, a honeycomb porous sintered body of, for example, silicon carbide or silicon nitride and the like, may be used.

Furthermore, as shown in the catalyst carrier 20 shown in FIG. 4, those having no sealing member may be used.

As shown in FIG. 1, the holding seal material 4 is a mat-shaped member having an elongated shape, and a convex fitting section 11 is placed on its one end, and a concave fitting section 12 is placed on the other end. As shown in FIG. 2, upon wrapping onto the catalyst carrier 2, the convex fitting section 11 is just engaged by the concave fitting section 12.

Moreover, the shape of the holding seal material 4 may be desirably modified. For example, by omitting the recessed and convex fitting sections 11, 12, a simpler shape may be used.

The holding seal material 4 in accordance with the embodiment according to the second group of the present invention is constituted by ceramic fibers aggregated into a mat shape (that is, a fiber aggregation M1) serving as a main element. With respect to the above-mentioned ceramic fibers, in the embodiment according to the second group of the present invention, alumina-silica based fibers 6 are used.

In the holding seal material 4 of the embodiment according to the second group of the present invention, the mullite crystallization rate is not even, but different depending on portions thereof. In other words, in one sheet of fiber aggregation M1, the crystallization rate on the first face side S1 portion and the crystallization rate on the second face side S2 portion are different from each other, and more specifically, the crystallization rate is allowed to gradually increase from the first face side S1 toward the second face side S2.

Here, the first face side S1 in the holding seal material 4 is a face side that is subjected to a firing step at a comparatively low temperature, and is placed in a manner so as to contact the metal shell 3 side on which heat resistance is not required so much. Therefore, the first face side S1 may be regarded as a low-temperature firing face or a shell-side contact face. The second face side S2 is a face side that is subjected to a firing step at a comparatively high temperature, and is placed in a manner so as to contact the catalyst carrier 2 side on which heat resistance is required. Therefore, the second face side S2 may be regarded as a high-temperature firing face or a bearing-member side contact face.

In this case, the difference between the crystallization rate of the surface layer portion of the first face side S1 and the crystallization rate of the surface layer portion of the second face side S2 is preferably set to 3% by weight or more. More specifically, the crystallization rate of the surface layer portion of the first face side S1 is preferably set to 0 to 1% by weight, and the crystallization rate of the surface layer portion of the second face side S2 is preferably set to 1 to 10% by weight.

In the case where the crystallization rate of the surface layer portion on the first face side S1 exceeds 1% by weight and in the case where the crystallization rate of the surface layer portion on the second face side S2 is less than 1% by weight, the difference between the crystallization rates of the two sides becomes too small, failing to obtain target characteristics. In the case where the crystallization rate of the surface layer portion on the second face side S2 exceeds 10% by weight, the heat resistance of the corresponding portion might be lowered. Additionally, it is preferable to set the crystallization rate of the surface layer portion on the first face side S1 to 0% by weight, that is, it is preferable to form the corresponding portion by using an amorphous material.

Here, the above-mentioned crystallization rate is measured based upon peaks of mullite by using X-ray diffraction; and supposing that the material having no peak is set to 0% by weight in crystallization rate, a peak measured by 100% mullite is set to 100% by weight in crystallization rate, and the corresponding crystallization rate can be measured from a ratio between the value at 100% by weight and a sampled value.

Moreover, the above-mentioned crystallization rate may be obtained by calculating the weight ratio from the difference between dissolving rates of mullite and silica in an HF solution.

With respect to the quantity of alumina, the quantity of silica in the alumina-silica based fibers 6, the average fiber diameter of the alumina-silica based fibers 6 and the average fiber length, these factors are preferably set in the same manner as those explained in the catalyst converter according to the first group of the present invention; therefore, the description thereof is omitted.

With respect to the alumina-silica based fibers 6 located on the second face side S2, it is preferable to set the fiber tensile strength to 1.0 GPa or more, the fiber bending strength to 0.8 GPa or more, and the elastic modulus to $9.5 \times 10^{10}$ N/m² or more, respectively. With respect to the alumina-silica based fibers 6 located on the first face side S1, it is preferable to set the fiber tensile strength to 2.0 GPa or more, the fiber bending strength to 1.5 GPa or more, and the elastic modulus to $11.0 \times 10^{10}$ N/m² or more, respectively. The reason for this is because, as the fiber tensile strength, the fiber bending strength and the like are increased, the alumina-silica based fibers 6 come to have very strong resistance to tensile and bending.

The cross-sectional shape of the alumina-silica based fibers 6, the thickness of the holding seal material 4 prior to the assembling process, the GBD (bulk density) of the holding seal material 4 after the assembling process and the initial face pressure of the holding seal material 4 in the assembled state of the embodiment according to the second group of the present invention are preferably set in the same manner as those described in the catalyst converter according to the first group of the present invention; therefore, the description thereof is omitted.

Here, such a holding seal material 4 may be subjected to a needle punching process, a resin impregnation process, etc., if necessary. By applying these processes, it becomes possible to compress the holding seal material 4 in the thickness direction, and consequently to make it thinner in the thickness direction.

The following description will be given of a sequence of processes for manufacturing a catalyst converter 1 according to the second group of the present invention.

First, a spinning stock solution is prepared in the same manner as the method explained in the manufacturing method of the catalyst converter according to the first group of the present invention so that long fibers of the precursor fibers are produced.

Successively, the long fibers of the precursor fibers are chopped into a predetermined length to form shorter fibers in a certain extent. Thereafter, the short fibers are collected, untied and laminated, or a fiber-dispersed solution, obtained by dispersing the short fibers in water, is poured into a mold, and pressed and dried so that a mat-shaped fiber aggregation M1 is obtained.

Figure 5:
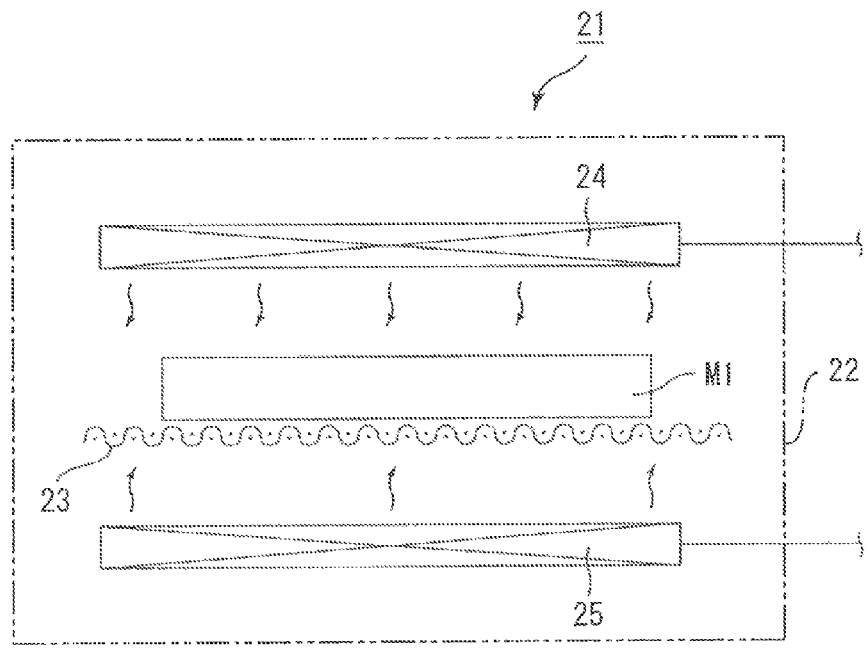
FIG. 5 is a schematic view for describing a firing step of a mat-shaped fiber aggregation in embodiments according to a second group of the present invention.
Figure 6:
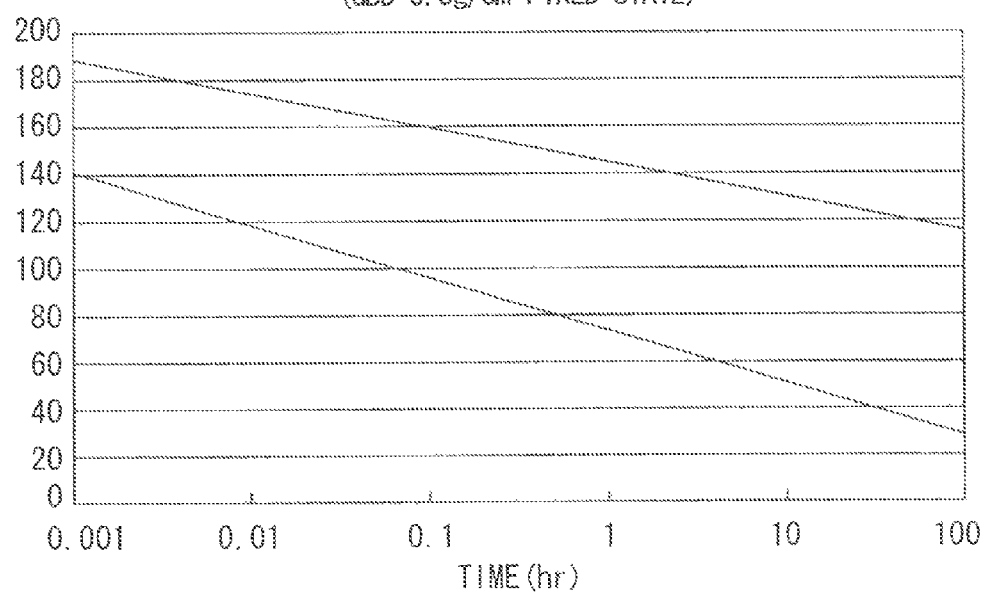
FIG. 6 is a graph showing degradation with time of face pressure in examples and comparative examples according to the second group of the present invention.

Following the above-mentioned laminating process, the fiber aggregation M1 is subjected to a firing step so that the precursor fibers are sintered, and formed into ceramics (crystallized). Thus, the precursor fibers are hardened to form alumina-silica based fibers 6. FIG. 5 shows an electric furnace 21 that is used as a firing device in the embodiment according to the second group of the present invention.

Here, the firing step may be carried out by using a firing device other than the exemplified electric furnace 21.

The above-mentioned electric furnace 21 is a device for continuously heating and sintering an object to be fired while it is being transported in the horizontal direction. A net conveyor belt 23 serving as a transporting means is housed in a main body 22 constituting the electric furnace 21. A mat-shaped fiber aggregation M1 that is an object to be fired is placed on the net conveyor belt 23. An upper-side electric heater 24 serving as a first heating means is placed above the net conveyor belt 23 with a gap therefrom, and a lower-side electric heater 25 serving as a second heating means is placed below the net conveyer belt 23 with a gap therefrom. These electric heaters 24, 25 are connected to a power supply through a temperature-control means, which is not shown. In this device, these two kinds of electric heaters 24 and 25 are individually temperature-controlled.

In the firing step, after a preliminary heating step (preliminary process) has been carried out on the above-mentioned fiber aggregation M1 in the electric furnace 21 that is maintained in an atmospheric pressure that is a normal pressure, a main heating step (firing step) is carried out in the electric furnace 21 that is maintained also in an atmospheric pressure that is a normal pressure.

In this case, the temperature settings of these two kinds of electric heaters 24, 25 are changed so as to provide a temperature difference to a certain degree. In other words, the fiber aggregation M1 is sintered with a difference being set between the firing temperature on the first face side S1 and the firing temperature on the second face side S2. Here, in the embodiment according to the second group of the present invention, the set temperature of the electric heater 24 on the upper side is higher than the set temperature of the electric heater 25 on the lower side.

In this case, the difference between the set temperatures at the time of the firing step is preferably set to 100° C. or more, especially 200° C. or more. The above-mentioned temperature difference of less than 100° C. fails to provide a sufficient difference in the easiness of sintering between the first face side S1 and the second face side S2, making it difficult to provide a difference in the crystallization rates.

Moreover, the firing temperature of the first face side S1 is preferably set in a range of 800 to 1100° C., and the firing temperature of the second face side S2 is preferably set in a range of 1100 to 1400° C.

The firing temperature on the first face side S1 of less than 800° C. fails to allow the sintering reaction to progress sufficiently, failing to obtain the required mechanical strength. When the firing temperature on the first face side S1 exceeds 1100° C., or when the firing temperature on the second face side S2 is less than 1100° C., the difference in the crystallization rate between the two sides becomes too small, failing to provide target characteristics.

The firing temperature exceeding 1400° C. on the second face side S2 makes the crystallization to progress too quickly, resulting in degradation in the mechanical strength and heat resistance.

Moreover, the firing time (more specifically, the time during which the maximum heating temperature is maintained) is preferably set in a range of 10 to 60 minutes. If the firing time is too short, the sintering reaction might not progress sufficiently even when the temperature is set to be sufficiently high. Consequently, it becomes impossible to obtain mechanical strength required. If the firing time is too long, the production efficiency is lowered, and the crystallization might progress too quickly, resulting in degradation in the mechanical strength and heat resistance.

In the succeeding punch-out process, the mat-shaped fiber aggregation M1 that has been subjected to the firing step is punched out into a predetermined shape to form a holding seal material 4.

Then, after the holding seal material 4 has been impregnated with an organic binder, if necessary, the holding seal material 4 may be further compressed, and molded in the thickness direction. With respect to the organic binder used in this case, polyvinyl alcohol, acrylic resin and the like may be used, in addition to latex and the like such as acrylic rubber and nitrile rubber and the like.

Further, the holding seal material 4 is wrapped around the outer circumferential face of the catalyst carrier 2 and secured by the organic tape 13. Thereafter, this is subjected to a press-fitting, canning or wrap-tightening process to complete a desired catalyst converter 1.

Here, the exemplified holding seal material 4 has a structure, that is to say, in which its crystallization rate differs along the thickness direction. In contrast, the holding seal material in which its crystallization rate differs in the length direction, or the holding seal material in which its crystallization rate differs in the width direction, may be provided. For example, when the latter holding seal material is wrapped around the catalyst carrier 2, the catalyst carrier 2 is allowed to have different crystallization rates between its one end and the other end. In other words, the one end is allowed to have excellent heat resistance, while the other end is allowed to have excellent elasticity and flexibility. Therefore, when the end portion on the side having a greater crystallization rate and excellent heat resistance is placed so as to face the exhaust gas flow-in side, it becomes possible to achieve a catalyst converter 1 having excellent resistance and wind erosion resistance.

Consequently, in accordance with the embodiment according to the second group of the present invention, the following effects can be obtained.

Normally, when the catalyst converter 1 is used, the catalyst carrier 2, which is directly exposed to high-temperature exhaust gas, comes to have a high temperature, while the temperature of the metal shell 3 does not become so high as the temperature of the catalyst carrier 2. Therefore, the face side that is made in contact with the catalyst carrier 2 requires especially high temperature resistance. By taking these facts into consideration, the embodiment according to the second group of the present invention has an arrangement in which the second face side S2 having a relatively higher crystallization rate, that is, the face side having excellent heat resistance, is made in contact with the catalyst carrier 2. In contrast, the first face side S1 having a relatively lower crystallization rate, that is, the face side that is excellent in elasticity and flexibility although it is inferior in heat resistance, is allowed to contact the metal shell 3. Therefore, the fibers at the portion contacting the catalyst carrier 2 are less susceptible to brittleness, making it possible to provide a holding seal material 4 which has a high initial face pressure, and is less susceptible to degradation with time in the face pressure. Moreover, since an elastic force is exerted at the portion contacting the metal shell 3, it is possible to reduce the occurrence of a gap with the metal shell 3, and consequently to provide a holding seal material 4 that is excellent in the sealing property.

As described above, it is possible to achieve a catalyst converter 1 that is excellent in the holding property of the catalyst carrier 2, and less susceptible to exhaust gas leakage, and has good process efficiency.

The holding seal material 4 according to the second group of the present invention comprises a sheet of fiber aggregation M1, and the crystallization rate is gradually increased from the first face side S1 toward the second face side S2 of the fiber aggregation M1. Therefore, different from a structure constituted by a plurality of fiber aggregations M1 having different crystallization rates, it becomes possible to eliminate the necessity of jobs for mutually superposing the fiber aggregations M1 and for bonding these to each other, and consequently to reduce the number of manufacturing processes. Thus, it becomes possible to provide a holding seal material 4 that is easily manufactured.

Moreover, since it is possible to make the structure thinner in comparison with a superposed structure having a plurality of sheets, it becomes possible to place the structure in a narrow gap comparatively with ease. Thus, it is possible to easily carry out not only a wrap-tightening process, but also a fitting-in process at the time of the canning operation.

Furthermore, in the superposed structure having a plurality of sheets, exhaust gas might pass through the interface between the fiber aggregations M1. In contrast, since this holding seal material 4 has a single-sheet structure that is free from the interface, it is not necessary to take the passage of exhaust gas into consideration. Thus, it becomes possible to provide a device having an excellent sealing property.

In this holding seal material 4, the crystallization rate of the portion on the first face side S1 and the crystallization rate of the portion on the second face side S2 are set in the above-mentioned desirable range. Therefore, it is possible to securely improve the face pressure characteristic and sealing property, and to achieve a catalyst converter 1 having high performances.

In a manufacturing method of the embodiment according to the second group of the present invention, the firing step is carried out with a gap being provided between the firing temperature of the first face side S1 and the firing temperature of the second face side S2 of the mat-shaped fiber aggregation M1. Therefore, it is possible to securely manufacture a holding seal material 4 having different crystallization rates on its surface and rear surface comparatively with ease. Moreover, such a manufacturing method is extremely suited for providing a holding seal material 4 having an arrangement in which the crystallization rate is gradually increased from the first face side S1 toward the second face side S2 in a single sheet of fiber aggregation M1. Furthermore, a conventional firing device is commonly applied to this manufacturing method without the necessity of applying a special firing device. Thus, it becomes possible to avoid an increase in the facility costs.

In the embodiment according to the second group of the present invention, the firing step is carried out with the firing temperatures on the first face side S1 and the second face side S2 being set within the above-mentioned preferable range. Therefore, it becomes possible to securely manufacture the holding seal material 4 of the embodiment according to the second group of the present invention in which the crystallization rate gradually increases from the first face side S1 toward the second face side S2.

Furthermore, the holding seal material according to the second group of the present invention is provided as a holding seal material that includes alumina-silica based fibers aggregated into a mat shape as its constituent elements, and is placed in a gap between the catalyst carrier and the metal shell that covers the outer circumference of the catalyst carrier, and this holding seal material may be provided as a catalyst-converter-use holding seal material that is characterized by a structure in which the first-face-side portion is made from an amorphous material and the second-face-side portion is made from a crystal material.

With this arrangement, it becomes possible to achieve a holding seal material for catalyst-converter-use that has an excellent sealing property in addition to the advantages that it has high initial face pressure, and is less susceptible to degradation with time in the face pressure.

Here, the embodiment according to the second group of the present invention has exemplified a case in which the holding seal material 4 is applied to a catalyst converter 1 used for an exhaust-gas-purifying device. However, the holding seal material 4 according to the second group of the present invention may of course be applied to devices other than the catalyst converter 1 used for an exhaust-gas-purifying device, such as a diesel particulate filter (DPF) and a catalyst converter used for a fuel cell modifier.

The following description will be given of an embodiment according to a third group of the present invention.

Referring to FIGS. 1 to 3, as well as FIGS. 8 and 9, the following description will be given of a catalyst converter used for an automobile exhaust gas purifying device in accordance with one embodiment according to the third group of the present invention in detail.

This catalyst converter 1 in accordance with the embodiment of the third group of the present invention, shown in FIG. 3, is virtually the same as the catalyst converter according to the first group of the present invention, and constituted by a catalyst carrier 2, a metal shell 3 covering the outer circumference of the catalyst carrier 2, and a holding seal material 4 that is placed in a gap between the two members 2 and 3.

Here, with respect to the catalyst carrier 2 and the metal shell 3, the same members that have been explained in the catalyst converter according to the first group of the present invention may be used; therefore, the description thereof is omitted.

Moreover, not limited to a complete round shape, the cross-sectional shape of the catalyst carrier 2 may be set to, for example, an elliptical shape or an elongated circular shape.

Moreover, with respect to the catalyst carrier 2, in addition to a cordierite carrier molded into a honeycomb shape shown in the embodiment, for example, a honeycomb porous sintered body of, for example, silicon carbide or silicon nitride and the like, may be used.

Furthermore, as shown in the catalyst carrier 20 shown in FIG. 4, those having no sealing member may be used.

As shown in FIG. 1, the holding seal material 4 is a mat-shaped member having an elongated shape, and a convex fitting section 11 is placed on its one end, and a concave fitting section 12 is placed on the other end. As shown in FIG. 2, upon wrapping onto the catalyst carrier 2, the convex fitting section 11 is just engaged by the concave fitting section 12.

The holding seal material 4 in accordance with the embodiment according to the third group of the present invention is constituted by ceramic fibers aggregated into a mat shape (that is, a fiber aggregation) serving as a main element. With respect to the above-mentioned ceramic fibers, in the embodiment according to the third group of the present invention, alumina-silica based fibers 6 are used. In this case, the alumina-silica based fibers 6, which have a mullite crystal content in a range of 0% by weight or more to 10% by weight or less, are preferably used. The fibers having such a chemical composition make it possible to provide excellent heat resistance and a high repulsive force upon application of a compressing load, because the amorphous component thereof becomes smaller. Therefore, even when it is subjected to a high temperature while being placed in the gap, the possibility of reduction in the face pressure to be generated is comparatively lowered.

The chemical composition of the alumina-silica based fibers 6 is preferably set so that alumina is in a range of 68 to 83% by weight and silica is in a range of 32 to 17% by weight, and specifically, $Al_2O_3:SiO_2=72:28$ is more preferred.

If alumina is less than 68% by weight, or if silica exceeds 32% by weight, it might be difficult to improve the heat resistance and the repulsive force upon application of a compressing load sufficiently. In the case where alumina exceeds 83% by weight, or in the case where silica is less than 17% by weight also, it might be difficult to improve the heat resistance and the repulsive force upon application of a compressing load sufficiently.

With respect to the average fiber diameter and the average fiber length of the alumina-silica based fibers 6, these are preferably set in the same manner as explained in the catalyst converter according to the first group of the present invention; therefore, the description thereof is omitted.

Moreover, the tensile strength of each of the alumina-silica based fibers 6 is preferably set to 0.1 GPa or more, more preferably 0.5 GPa or more.

Here, the alumina-silica based fibers 6 of the embodiment according to the third group of the present invention needs to have a non-circular shape in the cross-section thereof, that is, a deformed shape in the cross-section thereof. Some examples of the fibers having a deformed cross-sectional shape are shown on the right-side column of a table in FIG. 9. A fiber having a virtually elliptical cross-section (fiber having an elliptical cross-section) is shown on the first row in the right-side column as one example of the fiber having a flat cross-sectional shape. A fiber having a cross-section with a virtually cocoon-shape (fiber having a cocoon-shaped cross-section) is shown on the second row in the right-side column as one example of the fiber having a flat cross-sectional shape. Moreover, a hollow fiber having an empty space inside thereof is shown on the third row in the right-side column.

Moreover, not limited to the exemplified elliptical shape and cocoon shape, the cross-sectional shape of the alumina-silica based fibers 6 may be set to, for example, an elongated circular shape, a triangular shape or a rectangular shape.

Furthermore, not limited to the exemplified hollow shape, the cross-sectional shape of the alumina-silica based fibers 6 may be set to, for example, a shape having two or more spaces inside thereof and the like.

In the catalyst converter according to the third group of the present invention, the thickness of the holding seal material 4 prior to the assembling process, the GBD (bulk density) of the holding seal material 4 after the assembling process and the initial face pressure of the holding seal material 4 in the assembled state are preferably set in the same manner as those described in the catalyst converter according to the first group of the present invention; therefore, the description thereof is omitted.

Here, the holding seal material 4 may be subjected to a needle punching process, a resin impregnation process, etc., if necessary. By applying these processes, it becomes possible to compress the holding seal material 4 in the thickness direction, and consequently to make it thinner in the thickness direction.

The following description will be given of a sequence of processes for manufacturing a catalyst converter 1 according to the third group of the present invention.

First, a spinning stock solution 18 is prepared by mixing an aluminum salt aqueous solution, silica sol and an organic polymer. In other words, the spinning stock solution 18 is prepared by using an inorganic salt method. The aluminum salt aqueous solution, which serves as an alumina source, also serves as a component giving viscosity to the spinning stock solution 18. With respect to such an aqueous solution, an aqueous solution of basic aluminum salt is preferably selected. The silica sol, which serves as a silica source, also serves as a component for giving high strength to the fibers. The organic polymer is a component for giving a fiber-drawing property to the spinning stock solution 18.

In the embodiment according to the third group of the present invention, a water-soluble plasticizer is preferably further added to the spinning stock solution 18 as a Barus'-ratio reducing agent at the time of nozzle-discharging. The lower limit of the amount of addition of the above-mentioned plasticizer is preferably set to 0.1% by weight with the upper limit thereof being preferably set to 10% by weight, and particularly, the lower limit thereof is more preferably set to 0.1% by weight with the upper limit being set to 3% by weight.

When the above-mentioned amount of addition is less than 0.1% by weight, the elastic modulus is not lowered sufficiently with the result that the expected Barus' ratio reducing effect by the addition of the plasticizer might not be obtained. In contrast, the amount of addition exceeding 10% by weight tends to cause adverse effects on the physical properties of the alumina-silica based fibers 6 as the ratio of non-ceramic components in the spinning stock solution 18 increases.

Moreover, the Barus' ratio may be reduced by using a method other than the method of adding a water-soluble substance to the spinning stock solution 18.

With respect to the above-mentioned plasticizer, a water-soluble organic substance is preferably selected, and more specifically, glycol ethers with high viscosity may be preferably selected. The organic substances of this type make it possible to securely reduce the elastic modulus of the spinning stock solution 18 even by a small amount of addition. Moreover, glycol ethers are completely burned to disappear by heat that is applied up to the end of the sintering step carried out after the spinning process.

Here, examples of glycol ethers that can be used as the plasticizer include: tetraethylene glycol monobutyl ether (3,6,9,12-tetraoxahexa decanol), triethylene glycol monobutyl ether (3,6,9-trioxamidecanol), diethylene glycol monobutyl ether (2-(2-butoxyethoxy)ethanol), propylene glycol monobutyl ether, ethylene glycol monobutyl ether, propylene glycol monomethyl ether (1-methoxy-2-propanol), a mixture of propylene glycol monomethyl ether acetate and acetic acid and the like. Besides the above-mentioned glycol ethers, for example, a viscous organic substance such as polyethylene glycol and glycerin and the like may be used as the plasticizer. Moreover, only one kind of these organic substances listed here may be added to the spinning stock solution 18; however, two kinds or more of these may be combined and added thereto.

Next, the resulting spinning stock solution 18 is condensed under vacuum so as to provide a spinning stock solution 18 that has been adjusted to have a density, temperature and viscosity suited for the spinning process. Here, the spinning stock solution 18, which has been set to a concentration of approximately 20% by weight, is condensed and preferably set to approximately 30 to 40% by weight. Moreover, the viscosity is preferably set to 10 to 1500 Poise.

Figure 8:
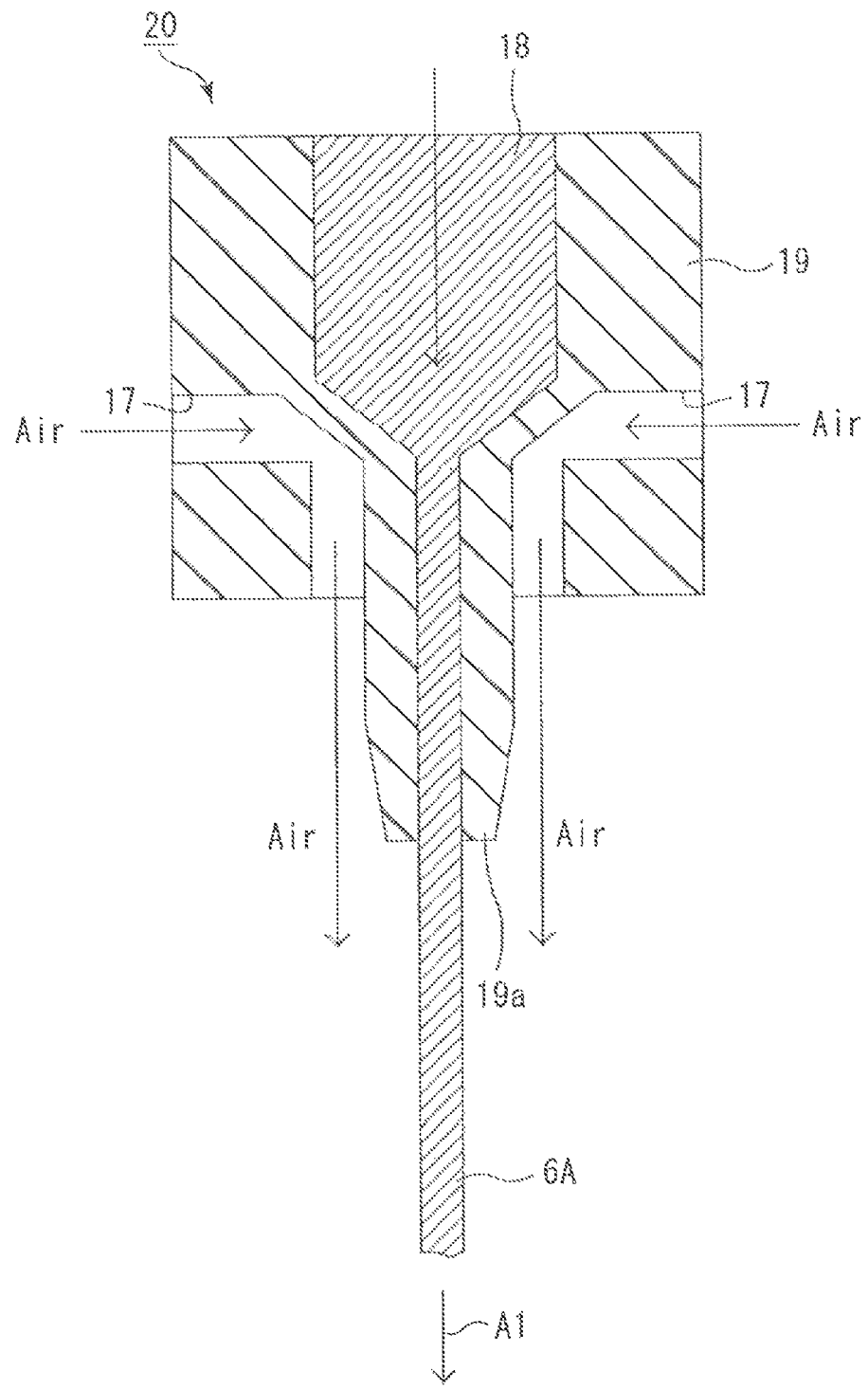
FIG. 8 is a schematic view showing a spinning device of an embodiment according to a third group of the present invention.

Moreover, the spinning stock solution 18 thus prepared is discharged into the air through a nozzle 19 of a spinning device 20 shown in FIG. 8 so that a precursor fiber 6A, which has a cross-sectional shape that is approximated to the cross-sectional shape of a metal mouth 19a serving as a nozzle discharging section, is continuously obtained. More specifically, the precursor fiber 6A, which has a fiber with an elliptical cross-section as shown on the first row in the right-side column, is produced by using a metal mouth 19a having a rectangular cross-section shown on the first row in the right-side column. The precursor fiber 6A having a cocoon cross-sectional shape shown on the second row in the right-side column is produced by using a metal mouth 19a having a virtually dumbbell shaped cross-section shown on the second row in the left-side column of the table in FIG. 9. The precursor fiber 6A having a hollow cross-sectional shape shown on the third row in the right-side column is produced by using a metal mouth 19a having a virtually C-letter shape shown on the third row on the left-side column of the table in FIG. 9.

Figure 9:
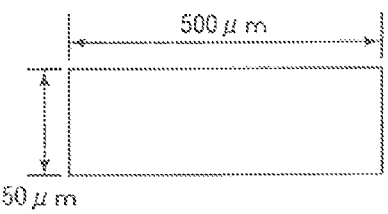
FIG. 9 is a schematic view showing a nozzle metal mouth shape and the cross-section of a fiber obtained through the nozzle in the examples and comparative examples according to the third group of the present invention.

Here, in the case of the fiber having an elliptical cross-sectional shape as shown on the first row on the right side of the table in FIG. 9, the degree of oblateness (ratio of a minor axis and a major axis) is preferably set in a range of 1:1.1 to 1:3. The fiber having a degree of oblateness exceeding 1:3 might cause a reduction in the initial face thickness.

Then, the precursor fiber 6A, thus spun out through the metal mouth 19a, is successively taken up while being extended. In this case, for example, a dry-type pressurizing spinning method may be preferably used.

Preferably, dry hot air is blown to the precursor fiber 6A immediately after it has been discharged from the metal mouth 19a. In this case, it is preferable to blow dry hot air, and more preferable to blow hot air having a temperature of normal temperature or more. With this arrangement, it becomes possible to dry the precursor fiber 6A quickly with high efficiency.

In the case of the spinning device 20 shown in FIG. 8, a flow path 17 through which dried hot air is allowed to flow is formed in the nozzle 19. A dry air discharge port, which opens downward (in the same direction as the nozzle 19) at a position just next to the metal mouth 19a of the nozzle 19, is formed on one end of the flow path 17. The other end of the flow path 17 is connected to an air source through a pipe which is not shown, not shown. Therefore, when pressurized air, which has been heated and dried, is supplied, dried hot air is discharged in a forward direction with respect to the discharging direction (in other words, extending direction A1: downward direction in FIG. 8) of the precursor fiber 6A. As a result, the precursor fiber 6A, immediately after discharged, is dried by hot air. The temperature of the dried hot air is preferably set to 30 to 100° C., and the wind speed is preferably set to 1 to 50 m/s.

Next, the precursor fiber 6A is sintered through a firing step to be formed into ceramics (crystallized) so that the precursor fiber 6A is hardened to obtain an alumina-silica based fiber 6. Here, the plasticizer is completely burned to disappear by heat at this time, and hardly remains in the alumina-silica based fibers 6.

In the above-mentioned firing step, it is preferable to set the firing condition so as to make the mullite crystal content in the resulting alumina-silica based fibers 6 having 10% by weight or less. For example, the firing temperature in the firing step is preferably set in a range of 1000 to 1300° C. The firing temperature of less than 1000° C. fails to completely dry and sinter the precursor fibers 6A, with the result that it becomes difficult to securely provide excellent heat resistance and a high repulsive force at the time of application of a compressing load to the holding seal material 4. In contrast, in the case of a firing temperature exceeding 1300° C., the mullite crystallization in the alumina-silica based fiber 6 is allowed to easily progress. For this reason, it becomes difficult to reduce the mullite crystal content to 10% by weight or less, and consequently, it may not be able to securely provide excellent heat resistance and a high repulsive force at the time of application of a compressing load to the holding seal material 4.

Successively, the long fibers of the alumina-silica based fiber 6 that have been obtained through the above-mentioned respective processes are chopped into a predetermined length to form shorter fibers in a certain extent. Thereafter, the short fibers are collected, untied and laminated, or a fiber-dispersed solution, obtained by dispersing the short fibers in water, is poured into a mold, and pressed and dried so that a mat-shaped fiber aggregation is obtained. Further, this fiber aggregation is punched out into a predetermined shape to form a holding seal material 4.

Thereafter, the holding seal material 4 is impregnated with an organic binder, if necessary, and the resulting holding seal material 4 may then be compressed and molded in the thickness direction. With respect to the organic binder used in this case, polyvinyl alcohol, acrylic resin and the like may be used, in addition to latex and the like such as acrylic rubber and nitrile rubber and the like.

Moreover, the holding seal material 4, obtained by punching out the above-mentioned fiber aggregation into a predetermined shape, is wrapped around the outer circumferential face of the catalyst carrier 2 and secured by the organic tape 13. Thereafter, this is subjected to a press-fitting, canning or wrap-tightening process to complete a desired catalyst converter 1.

Consequently, in accordance with the embodiment according to the third group of the present invention, the following effects can be obtained.

The holding seal material 4 of the embodiment according to the third group of the present invention is constituted by alumina-silica based fibers 6 having a cross-section that is not a circular shape, but a deformed shape. The fibers of this type become more flexible in comparison with fibers having a circular cross-sectional shape. In other words, since the alumina-silica based fiber 6 has a non-circular shape, it has such a characteristic that it is bent in a specific direction comparatively easily. This characteristic makes the alumina-silica based fibers 6 less susceptible to breaking, and allows them to maintain the repulsive force for a long time. Thus, in case of the holding seal material 4 manufactured by using such alumina-silica based fibers 6, it becomes possible to reduce the possibility of degradation with time in the face pressure. Therefore, it is possible to achieve a catalyst converter 1 which is excellent in the holding property of the catalyst carrier 2 and the sealing property against exhaust gas.

Moreover, in the case of the holding seal material 4 using fibers having an elliptical cross-sectional shape and fibers having a cocoon-shaped cross-section, the alumina-silica based fibers 6 are easily engaged with one another, so that the alumina-silica based fibers 6 are less susceptible to sliding and deviation.

Therefore, it becomes possible to reduce degradation in the face pressure.

Moreover, the hollow fibers are excellent in heat-insulating property in comparison with those having no space inside thereof. Therefore, the holding seal material 4 using such fibers makes it possible to reduce the quantity of heat that is released from the catalyst carrier 2 to the metal shell 3, and consequently to carry out a catalyst reaction with high efficiency. Furthermore, the hollow fibers make it possible to absorb and attenuate sound and vibration by the spaces inside the fibers. Therefore, the application of the holding seal material 4 using these makes it possible to achieve a catalyst converter 1 that is excellent in noise insulating and vibration insulating properties.

In accordance with the manufacturing method of the embodiment according to the third group of the present invention, a spinning stock solution 18 is discharged through the metal mouth 19a of a nozzle 19 having a non-circular shape in its cross-section. Immediately after discharged from the metal mouth 19a, the precursor fiber 6A has a cross-sectional shape to which the cross-sectional shape of the metal mouth 19a is reflected in a certain degree. However, as time has elapsed since the discharge, the cross-sectional shape thereof tends to have a roundness (in other words, is subjected to the Barus' effect) due to the influence of a surface tension exerted on the precursor fiber 6A so that the cross-section of the precursor fiber 6A comes to have a circle-wise shape. Therefore, in the embodiment according to the third group of the present invention, dry hot air is blown thereto in a state immediately after the discharge so that the precursor fiber 6A is dried and solidified by being removed its moisture in the precursor fiber 6A. Consequently, it becomes possible to maintain a desired cross-sectional shape given by the metal mouth 19a, and consequently to obtain an alumina-silica based fiber 6 having a non-circular sectional shape comparatively easily. In other words, this manufacturing method is a desirable method to obtain the above-mentioned holding seal material 4.

In accordance with the manufacturing method of the embodiment according to the third group of the present invention, the dry hot air is blown in a forward direction with respect to the discharging direction of the precursor fiber 6A so that the fiber 6A is dried and solidified, and also extended simultaneously. Moreover, by carrying out the extending process in this manner, it becomes possible to control the fiber diameter and shape comparatively easily. Therefore, it is possible to manufacture desired alumina-silica based fibers 6 easily as well as effectively.

In accordance with the manufacturing method of the embodiment according to the third group of the present invention, a water-soluble plasticizer is preliminarily added to the spinning stock solution 18 so that the elastic modulus of the spinning stock solution 18 becomes smaller with the Barus' effect being reduced. Therefore, the discharge behavior of the spinning stock solution 18 at the time of the spinning process is stabilized. Consequently, the precursor fiber 6A becomes less susceptible to thread breakage even when it is extended with a strong tension, and the fiber cross-sectional shape becomes less susceptible to roundness due to elastic deformation. Moreover, the above-mentioned plasticizer has a water-soluble property so that it is dispersed in the spinning stock solution 18 evenly. Thus, it becomes possible to reduce the Barus' ratio to a virtually fixed value, and consequently to obtain a fiber having the target fiber diameter and cross-sectional shape comparatively easily. Therefore, it becomes possible to manufacture desired alumina-silica based fibers 6 easily as well as effectively.

Moreover, the third group of the present invention may include a ceramic-fiber-use spinning device that is used for forming the ceramic fibers according to the holding seal material of the third group of the present invention, that is, a ceramic-fiber-use spinning device which includes a nozzle having a metal mouth having a non-circular cross-sectional shape, and a flow path through which dry hot air is supplied, with a hot-air discharging port being formed in the vicinity of the metal mouth, and which is arranged so as to blow dry hot air through the above-mentioned hot-air discharging port in a forward direction with respect to the discharging direction of the ceramic precursor fibers.

Here, the embodiment according to the third group of the present invention has exemplified a case in which the holding seal material 4 according to the third group of the present invention is applied to a catalyst converter 1 used for an exhaust-gas-purifying device. However, the holding seal material 4 according to the third group of the present invention may of course be applied to devices other than the catalyst converter 1 used for an exhaust-gas-purifying device, such as a diesel particulate filter (DPF) and a catalyst converter used for a fuel cell modifier.

The following description will be given of an embodiment according to a fourth group of the present invention.

Referring to FIGS. 1 to 3, the following description will be given of a catalyst converter used for an automobile exhaust gas purifying device in accordance with an embodiment according to the fourth group of the present invention in detail.

The catalyst converter 1 in accordance with the embodiment of the fourth group of the present invention, shown in FIG. 3, is virtually the same as the catalyst converter according to the first group of the present invention, and constituted by a catalyst carrier 2, a metal shell 3 covering the outer circumference of the catalyst carrier 2, and a holding seal material 4 that is placed in a gap between the two members 2 and 3.

Here, with respect to the catalyst carrier 2 and the metal shell 3, the same members that have been explained in the catalyst converter according to the first group of the present invention may be used; therefore, the description thereof is omitted.

Moreover, with respect to the catalyst carrier 2, in addition to a cordierite carrier molded into a honeycomb shape shown in the embodiment, for example, a honeycomb porous sintered body and the like of, for example, silicon carbide or silicon nitride and the like, may be used.

Furthermore, as shown in the catalyst carrier 20 shown in FIG. 4, those having no sealing member may be used.

As shown in FIG. 1, the holding seal material 4 is a mat-shaped member having an elongated shape, and a convex fitting section 11 is placed on its one end, and a concave fitting section 12 is placed on the other end. As shown in FIG. 2, upon wrapping onto the catalyst carrier 2, the convex fitting section 11 is just engaged by the concave fitting section 12.

The holding seal material 4 in accordance with the embodiment according to the fourth group of the present invention is constituted by ceramic fibers aggregated into a mat shape (that is, a fiber aggregation) serving as a main element. With respect to the above-mentioned ceramic fibers, in the embodiment according to the fourth group of the present invention, alumina-silica based fibers 6 are used. In this case, the alumina-silica based fibers 6, which have a mullite crystal content in a range of 0% by weight or more to 10% by weight or less, are preferably used. The fibers having such a chemical composition make it possible to provide excellent heat resistance and a high repulsive force upon application of a compressing load, because the amorphous component thereof becomes smaller. Therefore, even when it is subjected to a high temperature while being placed in the gap, the possibility of reduction in the face pressure to be generated is lowered.

The lower limit of a permissible range of alumina content in the alumina-silica based fibers 6 is set to 50% by weight with the upper limit being set to 100% by weight, and the lower limit of a permissible range of silica content is set to 0% by weight with the upper limit being set to 50% by weight. Here, with respect to the alumina content, the lower limit is preferably set to 68% by weight with the upper limit being preferably set to 83% by weight, and with respect to the silica content, the lower limit is preferably set to 32% by weight with the upper limit being preferably set to 17% by weight; more specifically, the contents are more preferably set as $Al_2O_3:SiO_2=72:28$.

If alumina is less than 68% by weight, or if silica exceeds 32% by weight, it might be difficult to improve the heat resistance and the repulsive force upon application of a compressing load sufficiently. If alumina exceeds 83% by weight, or if silica is less than 17% by weight also, it might be difficult to improve the heat resistance and the repulsive force upon application of a compressing load sufficiently.

The lower limit of the average fiber diameter of the alumina-silica based fibers 6 is preferably set to 5 µm, with the upper limit being set to 15 µm, and the dispersion in the fiber diameter is preferably limited to a range within ±3 µm. Further, the lower limit of the average fiber diameter is more preferably set to 7 µm, with the upper limit being set to 12 µm, and the dispersion in the fiber diameter is more preferably limited to a range within ±2 µm.

The average fiber diameter of less than 5 µm makes it difficult to provide a sufficient face pressure due to a reduction in the strength of the fiber itself, and also causes a problem in which the fibers tend to be inhaled by the respiratory organs. In the case of the average fiber diameter exceeding 15 µm, when the fibers are formed into a mat-shaped fiber aggregation, its aeration resistance is reduced, resulting in degradation in the sealing property. In addition to this adverse effect, there might be degradation in the breaking strength. This adverse effect is considered to be caused by an increase in small scratches generated by an increase in the fiber surface area. Additionally, in the case where the dispersion in the fiber diameter exceeds ±3 µm, the fibers tend to be accumulated unevenly, with the result that the positional dependence of the basis weight becomes higher.

The lower limit of the average fiber length of the alumina-silica based fibers 6 is preferably set to 5 mm, with the upper limit being set to 20 mm, and the dispersion in the fiber length is preferably limited to a range within ±4 mm. Further, the lower limit of the average fiber length is more preferably set to 8 mm, with the upper limit being set to 13 mm, and the dispersion in the fiber diameter is more preferably limited to a range within ±2 µm.

The average fiber length of less than 5 mm causes a problem in which the fibers tend to be inhaled by the respiratory organs. Moreover, this fiber no longer exhibits characteristics as the fiber, and when the fibers are formed into a mat-shaped fiber aggregation, the fibers are not allowed to entangle with one another preferably, making it difficult to obtain a sufficient face pressure. The average fiber length exceeding 20 mm makes the fibers entangled with one another too strongly, with the result that the fibers tend to be accumulated unevenly when the fibers are formed into a mat-shaped aggregation. In other words, the positional dependence of the basis weight becomes higher, causing an adverse effect to the reduction in the dispersions in the face pressure value. Moreover, in the case where the dispersion in the fiber length exceeds ±4 mm also, the fibers tend to be accumulated unevenly, causing the positional dependence of the basis weight to become higher.

The content of shot in the holding seal material 4 is preferably set to 3% by weight or less, more preferably 0% by weight, that is, no shot contained at all.

When shot is contained, the positional dependence of the basis weight becomes higher, causing an adverse effect to inhibit the reduction in the dispersions in the face pressure value.

Moreover, the tensile strength of each of the alumina-silica based fibers 6 is preferably set to 0.1 GPa or more, more preferably 0.5 GPa or more. In addition to a complete round shape, the cross-sectional shape of each the alumina-silica based fibers 6 may be set to a deformed cross-sectional shape (for example, an elliptical shape, an elongated circular shape, or a virtually triangular shape).

In the catalyst converter according to the fourth group of the present invention, the thickness of the holding seal material 4 prior to the assembling process, the GBD (bulk density) of the holding seal material 4 after the assembling process and the initial face pressure of the holding seal material 4 in the assembled state are preferably set in the same manner as those described in the catalyst converter according to the first group of the present invention; therefore, the description thereof is omitted.

Here, such a holding seal material 4 may be subjected to a needle punching process, a resin impregnation process, etc., if necessary. By applying these processes, it becomes possible to compress the holding seal material 4 in the thickness direction, and consequently to make it thinner.

The following description will be given of a sequence of processes for manufacturing a catalyst converter 1 according to the fourth group of the present invention.

First, a spinning stock solution is prepared by mixing an aluminum salt aqueous solution, silica sol and an organic polymer. In other words, the spinning stock solution is prepared by using an inorganic salt method. The aluminum salt aqueous solution, which serves as an alumina source, also serves as a component giving viscosity to the spinning stock solution.

With respect to such an aqueous solution, an aqueous solution of basic aluminum salt is preferably selected. The silica sol, which serves as a silica source, also serves as a component for giving high strength to the fibers. The organic polymer is a component for giving a fiber-drawing property to the spinning stock solution.

An antifoamer, etc. may be added to the spinning stock solution. Here, by altering the ratio of the aluminum salt and silica sol, it becomes possible to control the chemical composition of the alumina-silica based fibers 6 to a certain extent.

Moreover, not limited to those exemplified here, the composition of the spinning stock solution may be desirably changed as long as it does not cause great degradation in the spinning property and physical properties of the fibers.

Next, the resulting spinning stock solution is condensed under vacuum to prepare a spinning stock solution that has been prepared to have a density, temperature, viscosity and the like suitable for the spinning. In this case, the spinning stock solution, which has had approximately a concentration of 20% by weight, is preferably condensed to have 30 to 40% by weight. Moreover, the viscosity is preferably set to 10 to 2000 Poise.

Moreover, the spinning stock solution thus prepared is continuously discharged into the air through a nozzle of a spinning device, and taken up while the resulting precursor fiber being extended. In this case, for example, a dry-type pressurizing spinning method may be preferably used.

Incidentally, by properly setting the cross-sectional shape and size of the nozzle discharging port, with the discharging, extending and taken-up conditions being set to fixed states, it becomes possible to control the fiber diameter in a narrow range. This arrangement makes it possible to reduce dispersions in the fiber diameter.

Successively, the long fibers of the precursor fibers, obtained through the above-mentioned processes, are chopped to a length set to approximately 0.5 to 10 mm so as to form short fibers. The advantages of such a short-fiber-spinning method are to make the dispersion of the fiber length smaller by controlling the fiber length in a narrow range, and to preliminarily avoid the occurrence of shot. In other words, the length of the resulting short fibers is basically dependent on the mechanical precision of the cutting device with very small width of dispersions.

Further, with respect to the cutting device, for example, a guillotine cutter or other mechanical cutting devices may be used to cut the long fibers.

Thereafter, the short fibers are collected, untied and laminated, or a fiber-dispersed solution, obtained by dispersing the short fibers in water, is poured into a mold, and pressed and dried so that a mat-shaped fiber aggregation is obtained.

Next, the mat-shaped fiber aggregation is sintered through a firing step to be formed into ceramics (crystallized) so that the precursor fiber is hardened to obtain an alumina-silica based fiber 6.

In the above-mentioned firing step, it is preferable to set the firing condition so as to make the mullite crystal content in the resulting alumina-silica based fibers 6 at 10% by weight or less. For example, the firing temperature in the firing step is preferably set in a range of 1000 to 1300° C. The firing temperature of less than 1000° C. fails to completely dry and sinter the precursor fibers, with the result that it becomes difficult to securely provide excellent heat resistance and a high repulsive force at the time of application of a compressing load to the holding seal material 4. In contrast, in the case of a firing temperature exceeding 1300° C., the mullite crystallization in the alumina-silica based fiber 6 is allowed to easily progress. For this reason, it becomes difficult to reduce the mullite crystal content to 10% by weight or less, and consequently, it may not be able to securely provide excellent heat resistance and a high repulsive force at the time of application of a compressing load to the holding seal material 4.

Here, instead of the above-mentioned method in which the long fibers of the precursor fibers are chopped into short fibers, and then fired, the firing step may be preliminarily carried out before the chopping process of the long fibers into short fibers.

Further, the fiber aggregation is punched out into a predetermined shape to form a holding seal material 4. Then, after the holding seal material 4 has been impregnated with an organic binder, if necessary, the holding seal material 4 may be further compressed, and molded in the thickness direction. With respect to the organic binder used in this case, polyvinyl alcohol, acrylic resin and the like may be used, in addition to latex and the like such as acrylic rubber and nitrile rubber and the like.

Moreover, the holding seal material 4 is wrapped around the outer circumferential face of the catalyst carrier 2 and secured by the organic tape 13. Thereafter, this is subjected to a press-fitting, canning or wrap-tightening process to complete a desired catalyst converter 1.

Consequently, in accordance with the embodiment according to the fourth group of the present invention, the following effects can be obtained.

In the holding seal material 4 of the embodiment according to the fourth group of the present invention, the dispersion in the fiber diameter of the alumina-silica based fibers 6 is reduced within a range of ±3 μm with the dispersion in the fiber length thereof being reduced within a range of ±4 mm, and the content of shot is set to 3% by weight or less. Therefore, with these synergistic effects, it is possible to extremely reduce the positional dependence of the basis weight, and also to reduce dispersions in the face pressure effectively. Thus, it becomes possible to achieve a holding seal material 4 that is stable in quality.

In accordance with the holding seal material 4 according to the fourth group of the present invention, in addition to the effect that reduces the dispersion in the face pressure, it is also possible to improve the face pressure value; therefore, it becomes possible to reduce the quantity of the alumina-silica based fibers 6 required for manufacturing a sheet of holding seal material 4. Thus, it becomes possible to reduce the costs of the holding seal material 4.

In accordance with the manufacturing method of the embodiment according to the fourth group of the present invention, since the spinning process is carried out by using an inorganic salt method, it is possible to control the fiber diameter in a narrow range, and consequently to reduce dispersions in the fiber diameter. Moreover, this method chops long fibers to obtain short fibers; therefore, different from a method in which fibers are obtained through a blowing process, it is possible to control the fiber length in a narrow range. Thus, it becomes possible to reduce dispersions in the fiber length. In addition to these effects, it is also possible to avoid the generation of shot. Consequently, this manufacturing method makes it possible to obtain the above-mentioned holding seal material 4 securely with ease.

As clearly described above, the manufacturing method of the embodiment according to the fourth group of the present invention makes it possible to provide a desirable method to obtain the above-mentioned holding seal material 4.

The manufacturing method of the holding seal material according to the fourth group of the present invention may include a method for firing the produced ceramic short fibers as one of the inventions of the fourth group; that is, a ceramic short fiber producing method which includes a spinning process in which a spinning stock solution containing an aluminum salt aqueous solution, silica sol and an organic polymer is continuously discharged from a nozzle to obtain a long fiber of a precursor fiber, a cutting process for chopping the above-mentioned long fiber into a predetermined length to obtain short fibers, and a firing step for heating and sintering the above-mentioned short fibers. This method relates to a manufacturing method of ceramic short fibers which can reduce dispersions in the fiber length and fiber diameter.

Moreover, the embodiment according to the fourth group of the present invention has exemplified a case in which the holding seal material 4 according to the fourth group of the present invention is applied to a catalyst converter 1 used for an exhaust-gas-purifying device; however, the holding seal material 4 according to the fourth group of the present invention may of course be applied to devices other than the catalyst converter 1 used for an exhaust-gas-purifying device, such as a diesel particulate filter (DPF), a catalyst converter and the like used for a fuel cell modifier.

The following description will be given of embodiments according to a fifth group of the present invention.

First Embodiment

Referring to FIGS. 1 to 3, as well as FIG. 12, the following description will be given of a catalyst converter used for an automobile exhaust gas purifying device in accordance with the first embodiment according to the fifth group of the present invention in detail.

This catalyst converter 1 in accordance with the embodiment of the fifth group of the present invention, shown in FIG. 3, is virtually the same as the catalyst converter according to the first group of the present invention, and constituted by a catalyst carrier 2, a metal shell 3 covering the outer circumference of the catalyst carrier 2, and a holding seal material 4 that is placed in a gap between the two members 2 and 3.

Here, with respect to the catalyst carrier 2 and the metal shell 3, the same members that have been explained in the catalyst converter according to the first group of the present invention may be used; therefore, the description thereof is omitted.

Moreover, with respect to the catalyst carrier 2, in addition to a cordierite carrier molded into a honeycomb shape shown in the embodiment, for example, a honeycomb porous sintered body of, for example, silicon carbide or silicon nitride and the like, may be used.

Furthermore, as shown in the catalyst carrier 20 shown in FIG. 4, those having no sealing member may be used.

As shown in FIG. 1, the holding seal material 4 is a mat-shaped member having an elongated shape, and a convex fitting section 11 is placed on its one end, and a concave fitting section 12 is placed on the other end. As shown in FIG. 2, upon wrapping onto the catalyst carrier 2, the convex fitting section 11 is just engaged by the concave fitting section 12.

The holding seal material 4 in accordance with the embodiment according to the fifth group of the present invention is constituted by ceramic fibers aggregated into a mat shape (that is, a fiber aggregation) serving as a main element. With respect to the above-mentioned ceramic fibers, in the embodiment according to the fifth group of the present invention, alumina-silica based fibers 6 are used. In this case, the alumina-silica based fibers 6, which have a mullite crystal content in a range of 0% by weight or more to 10% by weight or less, are preferably used. The fibers having such a chemical composition make it possible to provide excellent heat resistance and a high repulsive force upon application of a compressing load, because the amorphous component thereof becomes smaller. Therefore, even when it is subjected to a high temperature while being placed in the gap, the possibility of reduction in the face pressure to be generated is comparatively lowered.

The chemical composition of the alumina-silica based fibers 6 is preferably set so that alumina is in a range of 68 to 83% by weight and silica is in a range of 32 to 17% by weight, more specifically, $Al_2O_3:SiO_2=72:28$.

If alumina is less than 68% by weight, or if silica exceeds 32% by weight, it might be difficult to improve the heat resistance and the repulsive force upon application of a compressing load sufficiently. In the case where alumina exceeds 83% by weight, or in the case where silica is less than 17% by weight also, it might be difficult to sufficiently improve the heat resistance and the repulsive force upon application of a compressing load.

Figure 12:
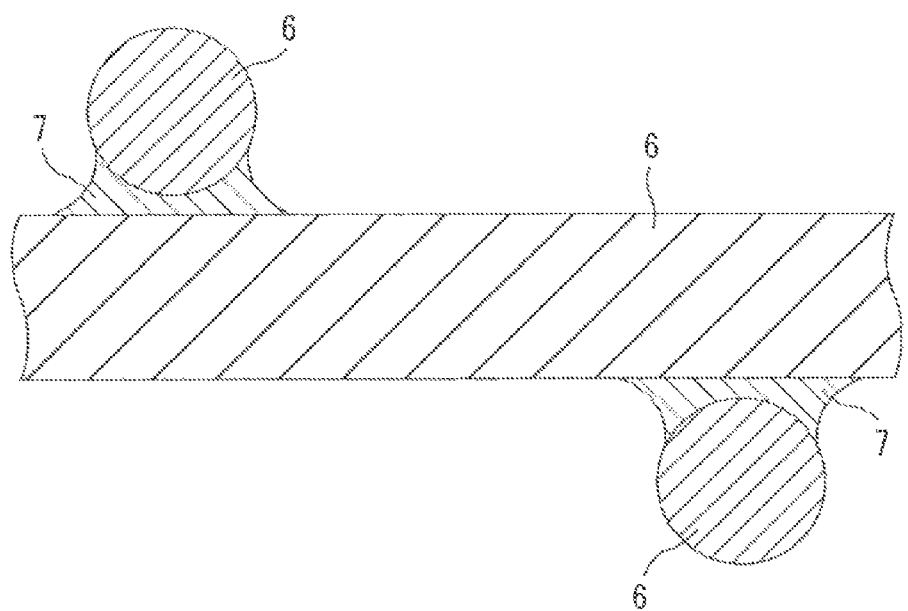
FIG. 12 is an enlarged cross-sectional view of a main part of a ceramic fiber of an embodiment according to a fifth group of the present invention.

As schematically shown in FIG. 12, in the case of the alumina-silica based fibers 6 constituting this holding seal material 4, the fibers are partially bonded to each other by a ceramic adhesive 7. Thus, it is possible to provide a structure wherein, so to speak, a cross-linking bridge is placed between portions at which ceramic fibers are adjacent to each other with overlapped parts. In other words, the holding seal material 4 is constituted by the alumina-silica based fibers 6 having a branched structure.

Here, there are voids inside the holding seal material 4.

Moreover, instead of the exemplified alumina-silica based fibers 6, for example, other ceramic fibers such as crystalline alumina fibers and silica fibers and the like may be used to form the holding seal material 4.

The ceramic adhesive 7 preferably comprises a substance that constitutes the ceramic fibers. The above-mentioned ceramic adhesive 7 of this characteristics has a high affinity to the fibers, and allows the bonded portions to have high strength; thus, it becomes possible to securely prevent degradation with time in the face pressure. For this reason, in the embodiment according to the fifth group of the present invention, the ceramic adhesive 7 mainly composed of alumina is adopted.

Moreover, with respect to the ceramic adhesive 7, a substance that does not constitute the ceramic fibers may be adopted. For example, in the case where the alumina-silica based fibers 6 are selected, a ceramic adhesive 7 made of zirconia, titania, yttria, ceria, calcia, or magnesia and the like may be used.

The lower limit of the content of the ceramic adhesive 7 is preferably set to 1% by weight with the upper limit thereof being set to 8% by weight, and the lower limit thereof is more preferably set to 3% by weight with the upper limit being set to 7% by weight.

When the above-mentioned content is less than 1% by weight, the fibers might not be bonded to one another with high strength. In contrast, in the case where the above-mentioned content exceeds 8% by weight, although the problem with the bonding strength is solved, the voids inside the holding seal material 4 tend to be filled, failing to provide desired physical properties, that is, elasticity and heat-insulating property, to the holding seal material 4.

With respect to the average fiber diameter and average fiber length of the alumina-silica based fibers 6, these factors are preferably set in the same manner as those explained in the catalyst converter according to the first group of the present invention; therefore, the description thereof is omitted.

Moreover, the tensile strength (relative strength) of each fiber of the alumina-silica based fibers 6 is preferably set to 0.1 GPa or more, more preferably 0.5 GPa or more. In addition to a complete round shape shown in FIG. 12, the cross-sectional shape of the alumina-silica based fibers 6 may be set to a deformed cross-sectional shape (such as an elliptical shape, an elongated circular shape and a generally-triangular shape).

With respect to the catalyst converter according to the fifth group of the present invention, the thickness of the holding seal material 4 prior to the assembling process, the GBD (bulk density) of the holding seal material 4 after the assembling process and the initial face pressure of the holding seal material 4 in the assembled state are preferably set in the same manner as those described in the catalyst converter according to the first group of the present invention; therefore, the description thereof is omitted.

Here, the holding seal material 4 may be subjected to a needle punching process, a resin impregnation process and the like, if necessary. The application of these processes makes it possible to compress the holding seal material 4 in the thickness direction and consequently to make it thinner.

Next, an explanation will be given on the sequence of processes for manufacturing a catalyst converter 1 according to the fifth group of the present invention.

First, a spinning stock solution is prepared in the same manner as explained in the catalyst converter manufacturing method according to the fourth group of the present invention, and long fibers of precursor fibers are formed.

Then, the precursor fibers are formed into ceramics (crystallized) by carrying out a first firing step to harden the precursor fibers; thus, alumina-silica based fibers 6 are obtained.

In the above-mentioned firing step, it is preferable to set the firing condition so as to make the mullite crystal content in the resulting alumina-silica based fibers 6 having 10% by weight or less. For example, the firing temperature in the firing step is preferably set in a range of 1000 to 1300° C. The firing temperature of less than 1000° C. fails to completely dry and sinter the precursor fibers, with the result that it may not be able to securely provide excellent heat resistance and a high repulsive force at the time of application of a compressing load to the holding seal material 4. In contrast, in the case of a firing temperature exceeding 1300° C., the mullite crystallization in the alumina-silica based fiber 6 is allowed to easily progress. For this reason, it becomes difficult to reduce the mullite crystal content to 10% by weight or less, and consequently, it becomes difficult to securely provide excellent heat resistance and a high repulsive force at the time of application of a compressing load to the holding seal material 4.

Successively, the long fibers of the alumina-silica based fibers 6, obtained through the above-mentioned processes, are chopped to a predetermined length by using, for example, guillotine cutter, to form shorter fibers in a certain extent. Thereafter, the short fibers are collected, untied and laminated, or a fiber-dispersed solution, obtained by dispersing the short fibers in water, is poured into a mold, and pressed and dried so that a mat-shaped fiber aggregation is obtained.

Further, this fiber aggregation is punched out into a predetermined shape to form a holding seal material 4.

After the above-mentioned molding process, a bonding process is carried out so that the above-mentioned short fibers constituting a fiber aggregation are mutually bonded by a ceramic adhesive 7. More specifically, the following processes are carried out.

First, a material solution of the ceramic adhesive 7 is prepared, and supplied between short fibers that constitute the aggregation. In other words, in the first step of the bonding processes, a liquid-state substance supplying process in which a liquid-state substance is supplied between the short fibers constituting the aggregation so that the liquid-state substance that is formed into a ceramic adhesive 7 later is allowed to adhere to portions at which the precursor fibers constituting the above-mentioned aggregation are adjacent to each other with overlapped parts, is carried out. In this case, with respect to the above-mentioned material solution, for example, a water-soluble metal solution such as a water solution of aluminum chloride is preferably used. Here, a water solution of aluminum salt other than chlorides, that is, a water solution other than a water solution of aluminum chloride containing aluminum ions, may be used. Additionally, a water solution containing metal cations other than aluminum ions, such as a water solution of zirconium chloride, a water solution of titanium chloride and a water solution of chromium chloride and the like may be selected.

Here, in place of a basic water solution of aluminum chloride, for example, the spinning stock solution of the alumina-silica based fibers may be commonly used so as to carry out the bonding process. In this case as well, the ceramic adhesive 7 made from the fiber-constituting substance may be prepared.

The above-mentioned water-soluble metal solution is preferably set to have a low viscosity, more specifically, approximately, 0.1 to 10 centipoise. The water-soluble metal solution having a low viscosity easily has a surface tension exerted thereon, with the result that it is possible to provide a better adhesive property to portions in which short fibers are adjacent with each other with overlapped parts. Moreover, when the viscosity is too high, it becomes difficult to allow the solution to securely enter the inside of the fiber aggregation evenly.

The lower limit of the quantity of supply of the water-soluble metal solution in the fiber aggregation is set to 1% by weight, with the upper limit thereof being set to 10% by weight, and more preferably, the lower limit thereof is set to 2% by weight with the upper limit thereof being set to approximately 8% by weight. The quantity of supply of less than 1% by weight causes an insufficient quantity of the solution to adhere to the portions at which the fibers are adjacent to each other with overlapped parts, sometimes failing to mutually bond the fibers strongly. In contrast, the quantity of supply exceeding 10% by weight causes the voids inside the holding seal material 4 to be easily filled with the excessive solution, sometimes impairing desired physical properties in the holding seal material 4.

Examples of the method for supplying a material solution to the fiber aggregation include a method in which the fiber aggregation is immersed into a solution so that the inside thereof is impregnated with the solution, a method in which a solution in a mist state is supplied into the fiber aggregation by using a spray atomizing process, a method in which a solution is dipped and supplied into the fiber aggregation and the like. Among these, the impregnation method is preferably used. The impregnation method makes it possible to allow the material solution to securely enter the inside of the fiber aggregation evenly.

After the impregnation process, it is preferable to heat and dry the fiber aggregation. The heating and drying processes make it possible to remove excessive moisture in the material solution to a certain degree, and consequently to carry out a firing step in the next process in a stable manner.

Next, the dried fiber aggregation is again fired at a high temperature, and the metal component in the material solution, adhered to the mutual adjacent portions of the short fibers, is sintered and formed into ceramics; thus, a cross-linking bridge made from the ceramic adhesive 7 is formed at the corresponding portion so that the short fibers are bonded to each other.

Thereafter, the holding seal material 4 is impregnated with an organic binder, if necessary, and the holding seal material 4 may be compressed and molded in a thickness direction. In this case, with respect to the organic binder, polyvinyl alcohol, acrylic resin and the like may be used, in addition to latexes such as acrylic rubber, nitrile rubber and the like.

Then, the holding seal material 4, obtained by punching out the above-mentioned fiber aggregation into a predetermined shape, is wound around the outer circumferential face of the catalyst carrier 2 and secured by the organic tape 13. Thereafter, this is subjected to a press-fitting, canning or wrap-tightening process to complete a desired catalyst converter 1.

Therefore, in accordance with the first embodiment according to the fifth group of the present invention, the following effects can be obtained.

In accordance with the first embodiment according to the fifth group of the present invention, the holding seal material 4 makes it possible to provide a structure wherein, so to speak, a cross-linking bridge is placed between portions at which ceramic fibers are adjacent to each other with overlapped parts by using the ceramic adhesive 7, and consequently to make the respective fibers less susceptible to sliding and deviation.

Therefore, even when an external load is imposed thereon in a manner so as to compress the holding seal material 4 for a long time, this structure is less susceptible to degradation in the face pressure. Moreover, in this holding seal material 4, since the short fibers are partially bonded to each other so that the voids inside the holding seal material 4 are not completely filled. Therefore, physical properties (elasticity, heat-insulating property, and the like), inherently required for the holding seal material 4, are maintained. Moreover, the ceramic adhesive 7, which is used as the crosslinking bridge, is excellent in heat resistance. Therefore, even when the holding seal material 4 is subjected to a high temperature of approximately 1000° C. during use, the bonding portions are less susceptible to degradation in strength, and this advantage also makes it possible to prevent a reduction in the face pressure.

In accordance with the first embodiment according to the fifth group of the present invention, the alumina-silica based fibers 6 are selected, and the ceramic adhesive 7 mainly composed of alumina is also selected. In other words, the ceramic adhesive 7 comprises a substance constituting the alumina-silica based fibers 6. For this reason, this adhesive provides very high affinity for the corresponding fibers, and consequently increases the strength of the bonded portions. Therefore, this combination makes it possible to securely prevent degradation with time in the face pressure. Further, the application of the alumina-silica based fibers 6 having excellent heat resistance makes it possible to reduce degradation with time in the face pressure at high temperatures.

In the first embodiment according to the fifth group of the present invention, the content of the ceramic adhesive 7 is set in the above-mentioned preferable range. Therefore, it becomes possible to provide high strength in the bonded portions while maintaining desired properties in the holding seal material 4.

In accordance with the first embodiment according to the fifth group of the present invention, upon manufacturing the holding seal material 4, the firing step and bonding process of the precursor fibers are carried out in a separated manner. More specifically, the bonding process is carried out after the firing step of the precursor fibers. For this reason, it is possible to securely provide alumina-silica based fibers 6 having a better shape in comparison with a case in which both of the processes are carried out simultaneously so that the above-mentioned alumina-silica based fibers 6 having a desired shape are securely bonded to each other. Therefore, it becomes possible to securely manufacture a holding seal material 4 that is less susceptible to degradation with time in the face pressure easily.

Second Embodiment

The following description will be given of a second embodiment according to the fifth group of the present invention. Here, explanations will be mainly given on points that are different from the first embodiment according to the fifth group of the present invention, and those same parts are indicated by the same reference numerals, and the description thereof is omitted.

In this case, a holding seal material 4 having the above-mentioned structure is manufactured in the following sequence. First, a spinning process is carried out in the same manner as the first embodiment according to the fifth group of the present invention to provide long fibers of precursor fibers by using a spinning stock solution of the alumina-silica based fibers 6 as a material. Next, a cutting process is carried out so that the long fibers are chopped by a guillotine cutter to form shorter fibers in a certain extent. Then, a molding process is carried out in such a manner that the short fibers are collected, untied and laminated; or a fiber-dispersed solution, obtained by dispersing the short fibers in water, is poured into a mold, and pressed and dried, so that a mat-shaped fiber aggregation is obtained. Next, a liquid-state substance supplying process is carried out in such a manner that the liquid-state substance, which forms ceramic adhesive 7 later, is allowed to adhere to portions at which the precursor fibers constituting the fiber aggregation are adjacent to each other with overlapped parts. Next, in a sintering step, the fiber aggregation is heated so that the precursor fibers and the liquid-state substance are simultaneously sintered. Lastly, the fiber aggregation is subjected to a punching process and the like to provide a holding seal material 4.

In other words, in contrast to the first embodiment according to the fifth group of the present invention in which the liquid-state-substance supplying process is carried out in a stage after the firing step (after the fibers have been formed into ceramics), the second embodiment according to the fifth group of the present invention carries out this process in a stage prior to the firing step (in a state of un-sintered precursor fibers), which forms a great difference from the first embodiment.

With respect to the specific example of the liquid-state substance supplying process, the following two methods are listed.

In the first method, a fiber aggregation, made from precursor fibers of the alumina-silica based fibers 6, is placed under a highly moistened environment with high moisture so that the liquid-state substance is supplied thereto. In this case, vapor, existing under the highly moistened environment, is allowed to securely enter the inside of the fiber aggregation, and then condensed into moisture. Moreover, the moisture is allowed to selectively adhere to the adjacent overlapped parts of the fibers by a function of surface tension. Here, the precursor fibers of the alumina-silica based fibers 6 are water-soluble. For this reason, the adhesion of moisture causes the surface of the precursor fibers at the adjacent overlapped parts to be dissolved to a certain extent. Since the liquid-state substance, generated by such dissolution, has virtually the same composition as the alumina-silica based fibers 6, it is actually allowed to form a ceramic adhesive 7 later. Therefore, when a firing step is carried out at a temperature in a range of 1000 to 1300° C., the precursor fibers and the liquid-state substance are simultaneously sintered to form ceramics, with the result that a cross-linking bridge made from the ceramic adhesive 7 is formed between the alumina-silica based fibers 6. Here, in this method, the conditions (for example, the quantity of vapor, processing temperature, processing time, etc.) need to be set to a level that does not cause over-dissolution of the precursor fibers. Therefore, in the case where moisture is directly supplied through an atomizing process and the like, it is necessary to take over-dissolution into consideration.

The second method is characterized in that a non-aqueous liquid-state substance containing the same inorganic element contained in the alumina-silica based fibers 6 is sprayed onto the fiber aggregation composed of the precursor fibers of the alumina-silica based fibers 6 so that the corresponding substance is supplied thereto. In this case, the sprayed non-aqueous liquid-state substance is allowed to securely enter the inside of the fiber aggregation, and also to selectively adhere to the adjacent overlapped portions between the fibers through a function of surface tension. With respect to the non-aqueous liquid-state substance, for example, commercially available non-aqueous silicone oils and the like are listed. Since the silicon oil contains silicon (Si) that is an inorganic element contained in the alumina-silica based fibers 6, this is allowed to actually form the ceramic adhesive 7 later.

Therefore, when a firing step is carried out at a temperature of 1000 to 1300° C., the precursor fibers and the non-aqueous liquid-state substance are simultaneously sintered to form ceramics, with the result that a cross-linking bridge made from the ceramic adhesive 7 is formed between the alumina-silica based fibers 6. In this case, the ceramic adhesive 7 is an oxide of silicon (silica: $SiO_2$). Here, in addition to the non-aqueous silicone oil, for example, a material, formed by dissolving, for example, TEOS (ethyl silicate) in oil, may be used.

In accordance with the second embodiment according to the fifth group of the present invention, the following effects can be obtained.

In the manufacturing method of the second embodiment according to the fifth group of the present invention, the firing step and bonding process of the precursor fibers are carried out simultaneously; therefore, in comparison with the manufacturing method of the first embodiment according to the fifth group of the present invention in which these processes are carried out simultaneously, it is possible to reduce the number of heating steps. Thus, it becomes possible to reduce thermal energy to be applied thereto, and consequently to reduce the manufacturing costs. Therefore, it becomes possible to manufacture a holding seal material 4 that is less susceptible to degradation with time in the face pressure efficiently at low costs.

In the case where the first method is adopted, the liquid-state substance to be formed into the ceramic adhesive 7 later is allowed to securely adhere to the adjacent overlapped portions. Moreover, basically, the above-mentioned liquid-state substance, which is a fiber-dissolved substance, has virtually the same composition as the alumina-silica based fibers 6.

For this reason, the above-mentioned liquid-state substance has a high affinity for the precursor fibers, and makes it possible to securely bond the fibers to each other with high strength. Therefore, it is possible to securely prevent degradation with time in the face pressure.

The application of the second method also allows the liquid-state substance that forms the ceramic adhesive 7 later to securely adhere to portions at which the fibers are adjacent to each other with overlapped parts. Further, in this case, a non-aqueous liquid-state substance is used. For this reason, even when this adheres to the precursor fibers of the alumina-silica based fibers 6 having a water-soluble property, the precursor fibers are not dissolved. Therefore, it is not necessary to worry about degradation in the strength of the alumina-silica based fibers 6 itself due to too much dissolution of the precursor fibers, and it is not particularly necessary to set specific conditions carefully for preventing over-dissolution. Consequently, it is possible to manufacture a holding seal material 4 comparatively easily. Moreover, since the above-mentioned liquid-state substance contains the inorganic element contained in the alumina-silica based fibers 6, it has a high affinity for the precursor fibers so that the fibers are securely bonded to each other with high strength. Thus, it becomes possible to securely prevent degradation with time in the face pressure.

In the manufacturing method of the second embodiment according to the fifth group of the present invention, a cutting process is carried out between the spinning process and the molding process so that the long fibers of the precursor fibers are mechanically cut into a predetermined length so as to obtain short fibers. In other words, the manufacturing method of the second embodiment according to the fifth group of the present invention is different from the manufacturing method of the first embodiment according to the fifth group of the present invention which carries out a cutting process after the firing step in that the cutting process is carried out prior to the firing step.

In the case where the cutting process is carried out after the sintering step of the precursor fibers as in the case of the manufacturing method of the first embodiment according to the fifth group of the present invention, the alumina-silica based fibers 6 tend to have cracks and splinters on the cut portion of the alumina-silica based fibers 6 due to an impact at the time of the cutting process. This is because, in general, when precursor fibers are sintered to form ceramics, the fibers become brittle although they become hard. Consequently, the alumina-silica based fibers 6 come to have unstable end shapes, and the mechanical strength of the fibers is lowered.

In contrast, since the precursor fibers are unsintered and comparatively soft, they are less susceptible to cracks and the like on the cut portion even when they are subjected to a mechanical impact at the time of the cutting process. Therefore, the alumina-silica based fibers 6, obtained by sintering these, have stable end shapes, and are excellent in mechanical strength. Consequently, in accordance with the second embodiment according to the fifth group of the present invention, it is possible to improve the initial face pressure. The resulting property for preventing the generation of cracks and the like is considered to give effects also on prevention of degradation with time in the face pressure to a certain degree.

Moreover, in accordance with the manufacturing method of the second embodiment according to the fifth group of the present invention, since the cutting subject is each of the precursor fibers that are not so hard, the blades of a guillotine cutter serving as a mechanical cutting device are less susceptible to damages and abrasion. Therefore, it becomes possible to eliminate the necessity of frequently exchanging deteriorated blades, and consequently to prevent an increase in the running costs. Moreover, since it is not necessary to make the blades so hard, generally-used blades can be applied; thus, it becomes possible to prevent an increase in the facility costs.

Additionally, in the case where the second method is adopted in the second embodiment according to the fifth group of the present invention, a method which can replace the atomizing method upon supplying the non-aqueous liquid-state substance, for example, a dipping method, may be adopted. It is of course possible to vaporize and supply the non-aqueous liquid-state substance.

Moreover, in the manufacturing method of the holding seal material according to the fifth group of the present invention, the water solution containing aluminum ions may be supplied as a basic water solution of aluminum chloride or as the above-mentioned spinning stock solution of the alumina-silica based fibers.

Furthermore, in the manufacturing method of the holding seal material according to the fifth group of the present invention, the water-soluble metal solution may be prepared as a water solution containing at least one material selected from the group consisting of aluminum chloride, zirconium chloride, titanium chloride and chromium chloride.

Here, the embodiment according to the fifth group of the present invention has exemplified a case in which the holding seal material 4 according to the fifth group of the present invention is applied to a catalyst converter used for an exhaust-gas-purifying device; however, the holding seal material 4 according to the fifth group of the present invention may of course be applied to devices other than the catalyst converter 1 used for an exhaust-gas-purifying device, such as a diesel particulate filter (DPF) and a catalyst converter used for a fuel cell modifier.

The following description will be given of an embodiment according to a sixth group of the present invention.

The manufacturing method of an alumina fiber aggregation according to the sixth group of the present invention comprises: a spinning step of obtaining a continuous long-fiber precursor by using an alumina fiber stock solution used in an inorganic salt method as a material; a chopping step of cutting the continuous long-fiber precursor into short-fiber precursors; a mat preparing step of preparing a mat-shaped short fiber precursor by using thus obtained said short-fiber precursor; and a firing step of firing the mat-shaped short fiber precursor to manufacture an alumina fiber aggregation.

In the manufacturing method of an alumina fiber aggregation according to the sixth group of the present invention, the firing step is carried out after the spinning process, the chopping process and the mat-forming process so that it becomes possible to sufficiently increase the mechanical strength of the alumina short fibers that are used in the alumina fiber aggregation to be manufactured, and also to manufacture an alumina fiber aggregation that has a high initial face pressure, and is less susceptible to degradation with time in the face pressure.

The reason for this is explained as follows.

Figure 15:
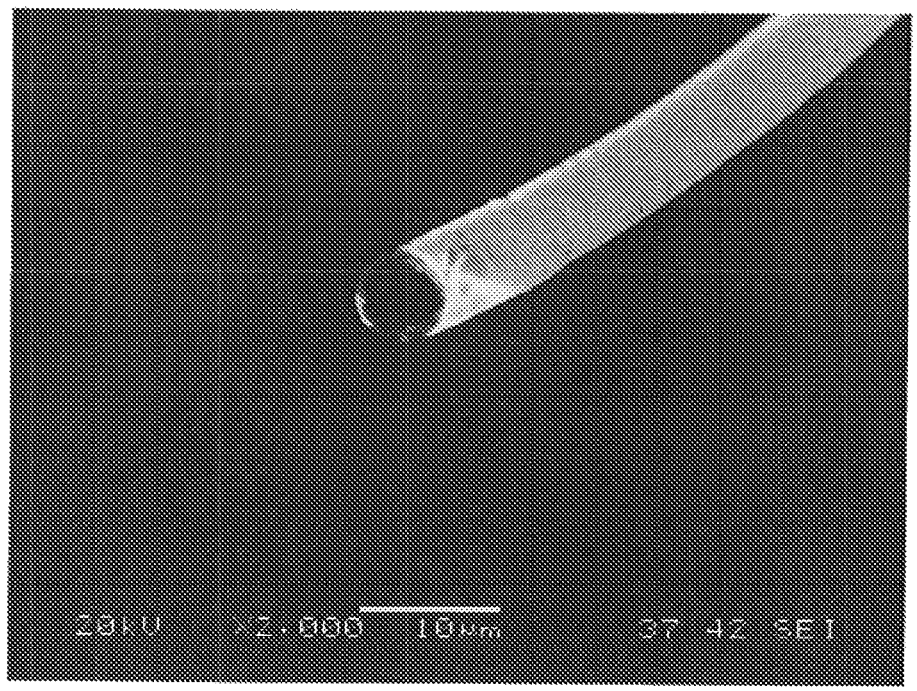
FIG. 15(a) is an SEM photograph showing a cut face of an alumina short fiber which is used in an alumina fiber aggregation manufactured through a manufacturing method of alumina fiber aggregation according to a sixth group of the present invention.
FIG. 15(b) is an SEM photograph showing a cut face of an alumina short fiber which is used in an alumina fiber aggregation manufactured through a conventional method.
Figure 15:
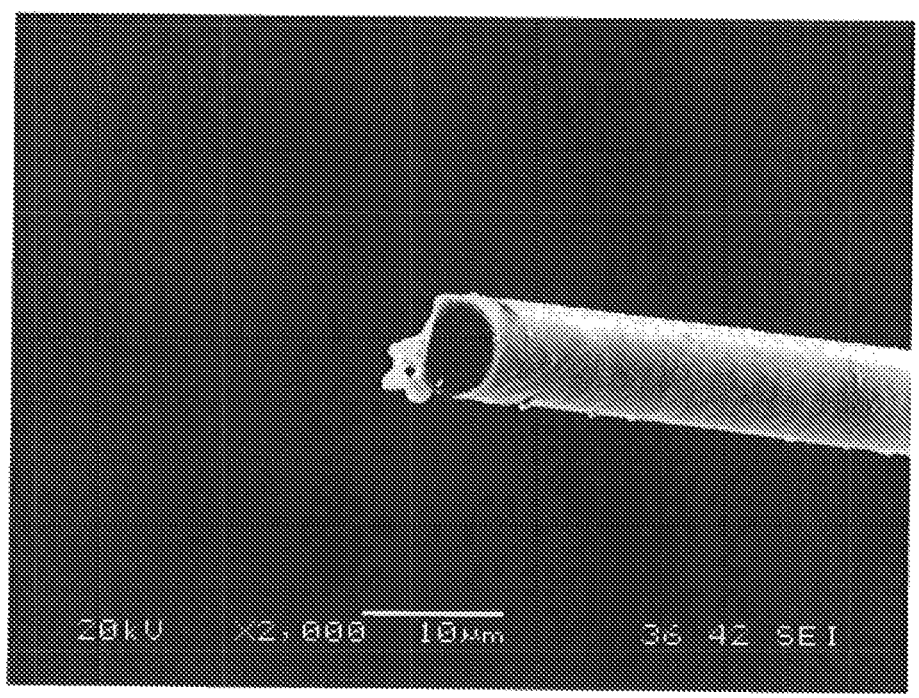

In other words, in the case where alumina short fibers to be used in an alumina fiber aggregation are manufactured by using a conventional method, a continuous long fiber precursor, obtained by carrying out a spinning process on an alumina-fiber stock solution, is fired to form an alumina long fiber, and this alumina long fiber is then cut by using a mechanical means such as a cutter to provide the alumina short fibers; however, the alumina short fibers thus manufactured tend to have burs on the cut face thereof (see FIG. 15(b)).

Here, FIG. 15(a) shows an SEM photograph of a cross-sectional face of one of the alumina short fibers used in an alumina fiber aggregation that has been manufactured by a manufacturing method of an alumina fiber aggregation of the present invention, and FIG. 15(b) shows an SEM photograph of a cross-sectional face of one of the alumina short fibers used in an alumina fiber aggregation that has been manufactured by a conventional method.

Upon cutting an alumina long fiber, one portion of the alumina long fiber tends to chip in the vicinity of the cut face, before the above-mentioned cutter or the like has completely cut the alumina long fiber, and resulting chips adhere to the cut face to cause burs on the cut face of the alumina short fiber, as shown in FIG. 15(b).

When the alumina long fiber is cut by a mechanical means such as a cutter, a great shearing stress is exerted on the cut face. However, since the above-mentioned alumina long fiber is made of hard, brittle ceramics having a certain degree of strength, and the shearing stress, exerted on the cut face, causes chips on one portion of the alumina long fiber, and it is considered that the chips adhere to the cut face, with the result that burs, shown in FIG. 15(b), are generated.

Moreover, a number of alumina short fibers to be used in an alumina fiber aggregation are entangled with one another in a complex manner; and when burs are generated on the cut face of each alumina short fiber, the burs cause damages to other alumina short fibers when they are entangled with one another in a complex manner.

When the above-mentioned alumina short fiber is observed in detail, there are portions on which micro-cracks are generated due to the above-mentioned chips and burs, and there are other portions on which micro-cracks are generated due to forces that are imposed on the fiber at the time of the cutting process.

Therefore, these chips, burs, micro-cracks and the like cause a failure to provide sufficient mechanical strength in the alumina short fibers, and make the dispersions greater.

Here, the degradation with time in the initial face pressure and the face pressure of the alumina fiber aggregation is caused depending on the mechanical strength of the alumina short fibers used in the alumina fiber aggregation, and when each alumina short fiber has excellent mechanical strength, the initial face pressure of the alumina fiber aggregation is maintained sufficiently high with the degradation with time in the face pressure being reduced.

However, as described earlier, in the conventional alumina fiber aggregation, the mechanical strength of the alumina short fibers used in the alumina fiber aggregation is not sufficiently high with high dispersions thereof; therefore, it is not possible to obtain sufficiently high initial face pressure in the alumina fiber aggregation, and it is considered that the degradation with time in the face pressure becomes comparatively greater.

In the manufacturing method of the alumina fiber aggregation according to the sixth group of the present invention, the continuous long fiber precursor obtained from the spinning process is cut by a cutter or the like without being subjected to a firing step so that a short fiber precursor is formed. In other words, since the above-mentioned continuous long fiber precursor is only subjected to an extending process after having been subjected to a spinning process, it is soft, and even when the continuous long fiber precursor is cut by a cutter or the like, no chips are generated in the vicinity of the cut face due to a shearing stress exerted on the cut face (see FIG. 15(a)). Moreover, the cut face is less susceptible to micro-cracks.

Therefore, the alumina short fibers to be used in the alumina fiber aggregation which is manufactured later are allowed to have sufficiently high mechanical strength with smaller dispersions thereof, in comparison with those alumina short fibers to be used in alumina fiber aggregation manufactured in a conventional method. For this reason, the alumina fiber aggregation, manufactured through the manufacturing method of the alumina fiber aggregation in the present invention, is allowed to have a high initial face pressure, and less susceptible to degradation with time.

The following description will be given of the manufacturing method of an alumina fiber aggregation according to the sixth group of the present invention in detail.

In the manufacturing method of an alumina fiber aggregation according to the sixth group of the present invention, first, a spinning process is carried out to obtain a continuous long fiber precursor by using an alumina-fiber stock solution to be used in an inorganic salt method as a material.

In the spinning process, first, the above-mentioned alumina-fiber stock solution to be used in the inorganic salt method is prepared.

The above-mentioned alumina-fiber stock solution is prepared by using the inorganic salt method. More specifically, it is preferably prepared by mixing silica sol in a water solution of aluminum salt, since this method makes it possible to provide alumina fibers having high strength.

With respect to the above-mentioned water solution of aluminum salt, for example, a water solution of basic aluminum salt may be selected. Here, the aluminum salt water solution serving as an alumina source is a component used for applying viscosity to the above-mentioned alumina-fiber stock solution.

Here, in this alumina-fiber stock solution, the ratio of mixing of the aluminum salt water solution and silica sol is preferably set to 40 to 100% by weight of alumina and 0 to 60% by weight of silica in terms of alumina and silica equivalent amount.

Moreover, an organic polymer may be added to such alumina fiber stock solution, if necessary. Thus, it becomes possible to apply a fiber-drawing property to the alumina-fiber stock solution.

With respect to the organic polymer, a straight-chain polymer containing carbon, such as PVA (polyvinyl alcohol) and the like, may be used; however, in addition to this, any compound having a comparatively low molecular weight without a straight-chain structure (which is not a polymer) may be selected as long as it contains carbon.

Next, by condensing under vacuum the resulting spinning stock solution, the alumina-fiber stock solution is prepared so as to have a concentration, temperature and viscosity suitable for the spinning process. In this case, the alumina-fiber stock solution, which has been normally set to approximately a concentration of 20% by weight, is preferably condensed to approximately 30 to 40% by weight. Moreover, the viscosity of the alumina-fiber stock solution after concentration under vacuum is preferably set to 1 to 200 Pa·s (10 to 2000 P).

Further, by discharging the alumina-fiber stock solution thus prepared into a high-speed gas flow through a nozzle of a spinning device by using a dry-type pressurizing spinning method and the like, a material fiber, which has a cross-sectional shape that is analogous to the nozzle metal mouth shape, is continuously obtained. The material fiber, thus subjected to the spinning process, is successively wound up while being extended so that a continuous long-fiber precursor is obtained.

With respect to the shape of the opening of the nozzle, it is not particularly limited, and any desired shape, such as a complete round shape, a triangular shape, a Y-letter shape and a star shape, may be selected.

Moreover, the above-mentioned material fiber in the state of being spun out is preferably extended approximately 100 to 200 times to be formed into a continuous long-fiber precursor. Thus, this is set to a range in which an alumina fiber having preferable strength can be manufactured. In the case where the cross-sectional shape of the continuous long-fiber precursor is set to a complete round shape, the lower limit of the average fiber diameter is preferably set to 3 μm with the upper limit being set to 25 μm, and the lower limit of the average fiber diameter is more preferably set to 5 μm with the upper limit being set to 15 μm.

Furthermore, it is preferable to carry out a crimping process for applying a crimp to the above-mentioned continuous long-fiber precursor. This arrangement allows the alumina short fibers to be preferably entangled with one another, when the alumina short fibers are formed into a mat shape in the succeeding mat-forming process.

Next, a chopping process is carried out so as to cut the above-mentioned continuous long-fiber precursor into a short fiber precursor.

In this chopping process, the above-mentioned continuous long-fiber precursor is cut in a manner so as to preferably set its lower limit to 0.1 mm, more preferably 2 mm, with its upper limit being set to 100 mm, more preferably 50 mm.

More specifically, a plurality of the continuous long-fiber precursors are aligned side by side, and cut by a rectangular cutter or the like, and in this case, the cutting process is preferably carried out so that the cut faces become flat. If the cut face of each short fiber precursor has an aspire shape, the cut face of the alumina short fiber to be formed later also has an aspire shape, and if these short fiber precursor and alumina short fibers are inhaled, serious damages might be caused in the human body.

Next, a mat-forming process is carried out so that a mat-shaped short-fiber precursor is produced by using the resulting short-fiber precursor.

In this mat-forming process, after the resulting precursor short fibers have been collected, untied and laminated, these are pressed to form a mat-shaped short-fiber precursor.

In this mat-shaped short-fiber precursor, the above-mentioned short-fiber precursor is in an entangled state to a certain degree.

Not particularly limited, the shape of the above-mentioned mat-shaped short-fiber precursor is normally set to a rectangular shape.

Moreover, the size thereof is appropriately determined in accordance with the purpose of use of the alumina fiber aggregation.

Next, this mat-shaped short-fiber precursor is preferably subjected to a needle punch process. In this needle punch process, by sticking a needle into the above-mentioned mat-shaped short-fiber precursor, the upper and lower short-fiber precursors are preferably entangled so that it is possible to provide a mat-shaped short-fiber precursor having high bulkiness and elasticity.

Then, the above-mentioned mat-shaped short-fiber precursor is fired in a firing step to manufacture an alumina fiber aggregation, thereby completing the manufacturing method of the alumina fiber aggregation according to the sixth group of the present invention.

In this firing step, first, the above-mentioned mat-shaped short-fiber precursor is preferably heated (pre-processing) under conditions of 400 to 600° C. for 10 to 60 minutes in an oxygen-containing atmosphere. This process is applied so as to fire and eliminate organic components contained in the short fiber precursor used in the mat-shaped short-fiber precursor.

Next, the mat-shaped short-fiber precursor, which has been subjected to the above-mentioned pre-processing, is heated to a temperature in the atmosphere, with the lower limit being set to 1000° C., preferably, 1050° C., and the upper limit being set to 1300° C., preferably, 1250° C. so that the short-fiber precursor is sintered. The heating temperature of less than 1000° C. tends to make the sintering step of the short fiber precursor insufficient, making it difficult to obtain an alumina fiber aggregation with high strength. In contrast, the heating temperature exceeding 1300° C. fails to provide high strength of the alumina fiber aggregation, resulting in disadvantages in the productivity and economical efficiency.

In this firing step, the short fiber precursor used in the mat-shaped short-fiber precursor is sintered to be formed into alumina short fibers, and the above-mentioned precursor short fibers are entangled in a complex manner through the above-mentioned needle punch process and the like, and then these entangled precursor short fibers are fired so as to be mutually bonded. Thus, the manufactured alumina fiber aggregation is allowed to have excellent mechanical strength.

Moreover, the mat-shaped short-fiber precursor, fired in the above-mentioned conditions, has its organic components fired and eliminated so that its volume is reduced.

Normally, the above-mentioned alumina short fibers are mainly composed of alumina and silica, and the alumina short fibers are preferably set to have a mullite crystal content of 0 to 10% by weight or less. Since the alumina short fibers having such a chemical composition has a small amorphous component so that it has excellent heat resistance and high repulsive force upon application of compressing load. Therefore, in the case where the alumina fiber aggregation according to the sixth group of the present invention is used as a holding seal material such as a honeycomb filter 10 as described in the prior art section, even when this is subjected to a high temperature in a state placed in a gap between the metal shell and the honeycomb filter 10, it is possible to reduce the possibility of reduction in the face pressure to be generated.

Moreover, the fiber tensile strength of the above-mentioned alumina short fiber is preferably set to 1.2 GPa or more, more preferably 1.5 Gpa or more. Further, the fiber bending strength of the alumina short fibers is preferably set to 1.0 GPa or more, more preferably 1.5 GPa or more. Moreover, the fracture toughness value of the alumina short fibers is preferably set to 0.8 $MN/m^{3/2}$ or more, more preferably 1.3 $MN/m^{3/2}$ or more. This is because as the fiber tensile strength, the fiber bending strength and the fracture toughness value increase, the alumina short fibers become very strong against the tension and bending, thereby forming flexible alumina short fibers that are less susceptible to damage.

Figure 18:
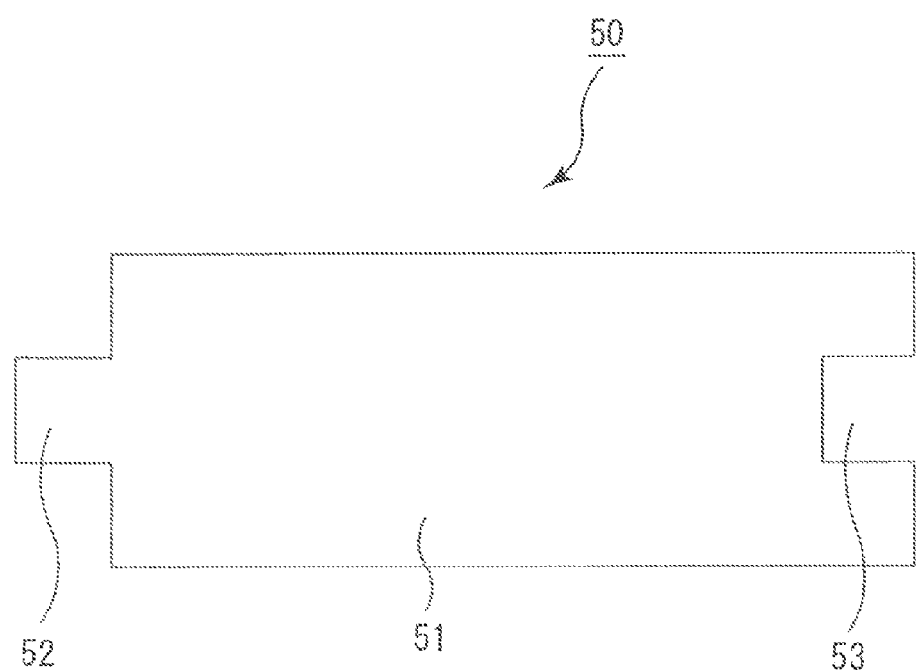
FIG. 18 is a plan view schematically showing one example of a holding seal material.

Thereafter, the above-mentioned alumina fiber aggregation is formed into a holding seal material having virtually the same shape as the holding seal material 30 shown in FIG. 18 by a punching process and the like.

Figure 16:
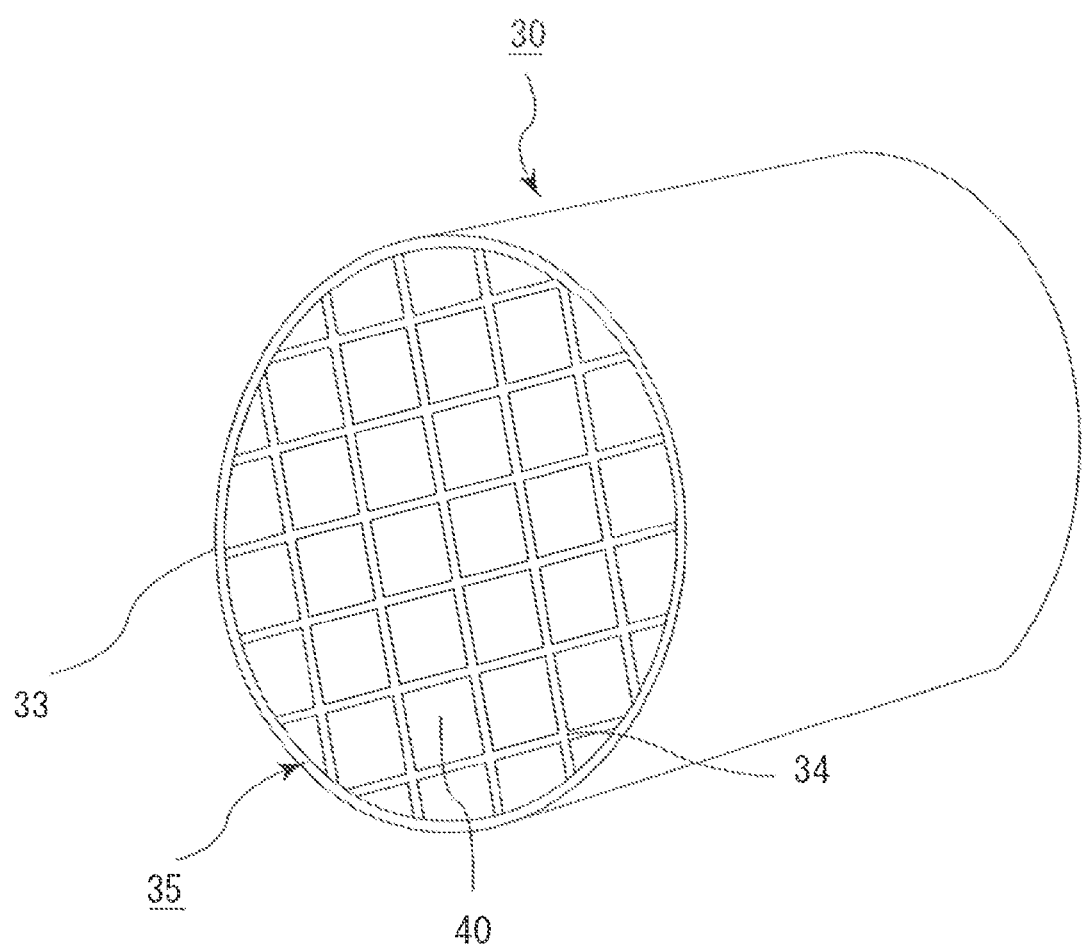
FIG. 16 is a perspective view schematically showing one example of a honeycomb filter.
Figure 17:
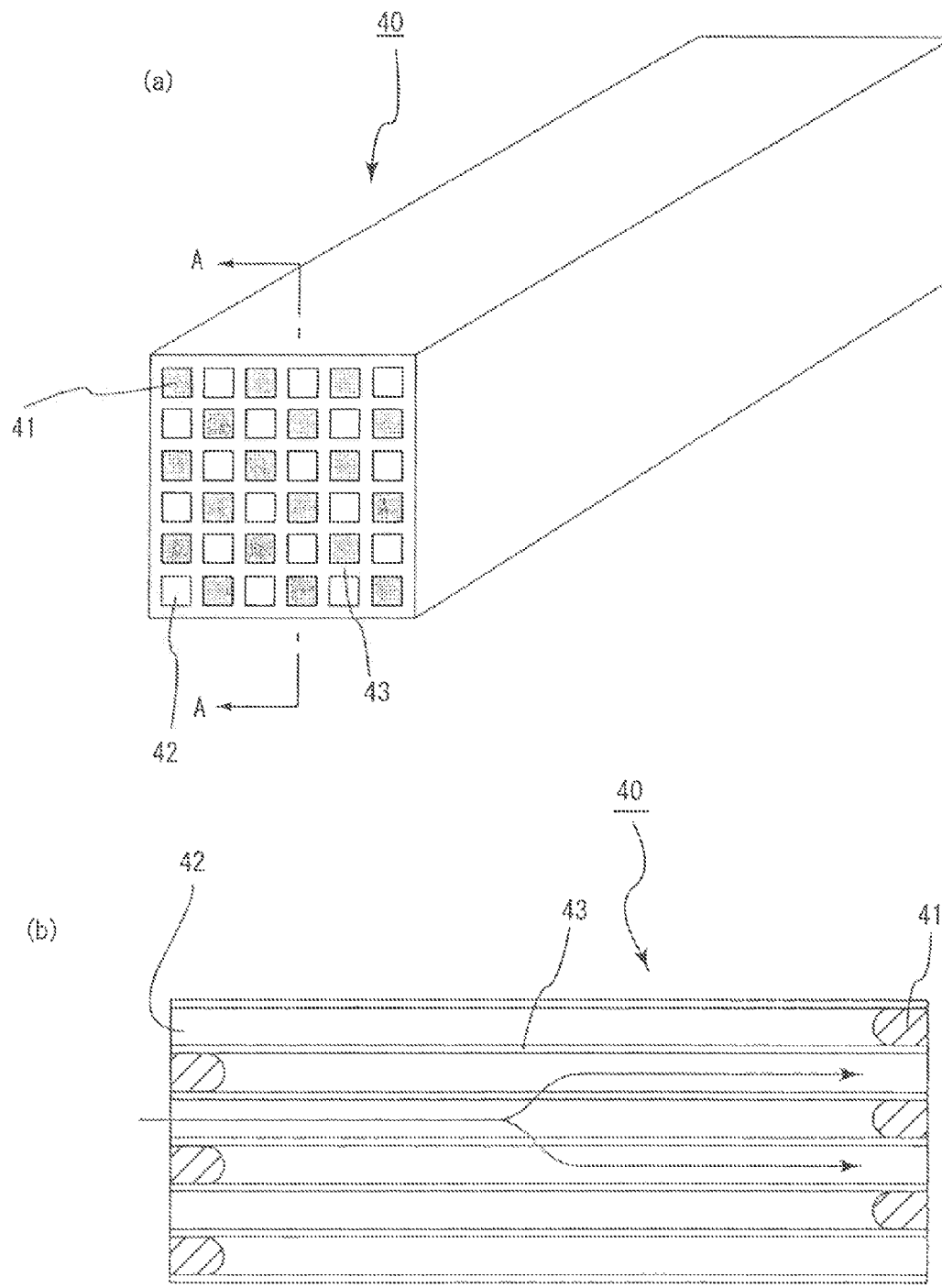
FIG. 17(a) is a perspective view schematically showing one example of a porous ceramic member forming the honeycomb filter shown in FIG. 16.
FIG. 17(b) is a cross-sectional view taken along line A-A thereof.

The size of the holding seal material is properly determined in accordance with the purpose of use, and when used as a holding seal material to be wound around the outer circumference of the honeycomb filter 10, for example, shown in FIG. 16, the thickness of the holding seal material is set to approximately 1.1 to 4 times the gap between the outer diameter of the honeycomb filter 10 and the inner diameter of the metal shell housing the honeycomb filter 10, more preferably approximately 1.5 to 3 times the gap.

The thickness of the holding seal material of less than 1.1 times the above-mentioned gap fails to provide a high holding property in the honeycomb filter 10 when the honeycomb filter 10 is housed in the metal shell, resulting in the possibility of deviation and backlash of the honeycomb filter 10 against the metal shell. Since this case of course fails to provide a high sealing property, leakage of exhaust gas tends to occur from the gap portion, causing an insufficient purifying property for exhaust gas. In contrast, if the thickness of the holding seal material exceeding four times the above-mentioned gap, it becomes difficult to place the honeycomb filter 10 in the metal shell, in particular, when a press-fitting system is adopted so as to place the honeycomb filter 10 in the metal shell.

Moreover, after the holding seal material has been housed in the metal shell, the lower limit of the bulk density thereof is preferably set to 0.1 g/cm$^3$, with the upper limit thereof being set to 0.3 g/cm$^3$, and the lower limit of the bulk density of the holding seal material is more preferably set to 0.1 g/cm$^3$, with the upper limit being set to 0.25 g/cm$^3$. The bulk density of less than 0.1 g/cm$^3$ fails to provide a sufficiently high initial face pressure of the holding seal material; in contrast, the bulk density exceeding 0.3 g/cm$^3$ increases the quantity of alumina short fibers to be used as a material, resulting in high manufacturing costs.

Furthermore, the aforementioned holding seal material may be subjected to the needle punching process, if necessary, and after the holding seal material has been subjected to an impregnation process in an organic binder, this may be further compressed and molded in the thickness direction of the holding seal material. The application of these processes makes it possible to compress the holding seal material in the thickness direction and consequently to make it thinner.

With respect to the above-mentioned organic binder, PVA and acrylic resins may be used, in addition to latexes and the like such as acrylic rubber and nitrile rubber and the like.

As described above, in the manufacturing method of the alumina fiber aggregation according to the sixth group of the present invention, the alumina-fiber stock solution is subjected to a spinning process, and extended to form a continuous long-fiber precursor, and the resulting continuous long-fiber precursor is then cut to form short-fiber precursors; then, these are formed into a mat precursor so that an alumina fiber aggregation is manufactured by sintering this mat precursor.

In accordance with the manufacturing method of the alumina fiber aggregation according to the sixth group of the present invention, the cut surface of the above-mentioned short-fiber precursor is free from the generation of chips, burrs and micro-cracks, and this is then subjected to a sintering step so that it is possible to manufacture alumina short fibers that are excellent in the mechanical strength.

In other words, since the alumina short fibers to be used in the alumina fiber aggregation are allowed to have excellent mechanical strength, it becomes possible to provide an alumina fiber aggregation that has a sufficiently high initial face pressure, and is less susceptible to degradation with time in the face pressure.

The following description will be given of more specific examples of the above-mentioned embodiments, and comparative examples thereof; however, the present invention is not intended to be limited by these examples.

BEST MODE FOR CARRYING OUT THE PRESENT INVENTION

The following description will be given of examples and comparative examples according to the first group of the present invention.

Example 1

In example 1, first, a basic water solution of aluminum chloride (23.5% by weight), silica sol (20% by weight, silica particle size 15 nm) and polyvinyl alcohol (10% by weight) that is a fiber-drawing property applying agent were mixed to prepare a spinning stock solution. Next, the resulting spinning stock solution was condensed under vacuum at 50° C. by using an evaporator to prepare a spinning stock solution having a concentration of 38% by weight with a viscosity of 1500 Poise.

After preparation, the spinning stock solution was continuously discharged into the air through a nozzle (having a complete round shape in its cross-section) of the spinning device, and the precursor fibers thus formed were wound up while being extended.

Next, after the above-mentioned precursor fibers had been subjected to a heating step (pre-processing) at 250° C. for 30 minutes in an electric furnace that is maintained at normal pressure in a nitrogen atmosphere, these were sintered at 1250° C. for 10 minutes in an electric furnace that is maintained at normal pressure in a nitrogen atmosphere in the same manner.

As a result, a complete-round-shaped alumina-silica based fiber 6 which had an alumina-silica weight ratio of 72:28, an average-fiber-size of 10.5 μm and a quantity of residual carbon of 5% by weight (see Table 1) was obtained. When the mechanical strengths of this alumina-silica based fiber 6 were measured by publicly known methods, the fiber tensile strength was 2.0 GPa, the fiber bending strength was 1.8 GPa, and the fracture toughness was 1.5 MN/m$^{3/2}$. In other words, the alumina-silica based fibers 6 of embodiment 1 had excellent mechanical strengths.

When the resulting alumina-silica based fibers 6 were visually observed, the diameter and cross-sectional shape thereof were evenly set and could be referred to have excellent stability in quality. Moreover, the alumina-silica based fiber 6 had a black color (so-called carbon black color), which was a novel feature that had not been provided.

Next, the long fiber of the alumina-silica based fiber 6 was chopped into a length of 5 mm to provide short fibers. Thereafter, these short fibers were dispersed in water, and the resulting fiber dispersion solution was poured into a mold, and pressed and dried so that a mat-shaped fiber aggregation was obtained. Then, samples were formed from this fiber aggregation, and with respect to the face pressure, measuring tests were carried out in the following manner.

First, the fiber aggregation was punched out to a square shape with 25 mm in each side to prepare a face-pressure measuring-use sample, and this was sandwiched by special jigs, and adjusted to have a bulk density (GBD) of 0.30 g/cm$^3$. The face-pressure measuring-use sample in this state was held in the atmosphere at 1000° C., and the face pressure was measured 1 hour later, 10 hours later, and 100 hours later. Here, the face pressure which had been measured without heating in a non-sandwiched state was defined as "initial face pressure", and the face pressure 100 hours later was defined as "face pressure after endurance tests". Moreover, the expression, (face pressure after endurance tests/initial face pressure)×100(%) was calculated, and defined as the degradation with time rate of face pressure. Table 1 shows the results of these tests.

In accordance with the results of the tests, in the sample of example 1, both of the initial face pressure and the face pressure after endurance tests exceeded 100 kPa, and the degradation with time rate of face pressure was maintained within 50%, which was a comparatively low level. Here, when the sample obtained 100 hours later was observed, it was found that the properties of the alumina-silica based fiber 6 were not particularly changed, and still had a black color. The quantity of residual carbon was also maintained at 5% by weight.

Moreover, after the above-mentioned mat-shaped fiber aggregation had been punched out to a predetermined shape, and actually formed into a holding seal material 4, this was wound around a catalyst carrier 2, and the resulting member 2 was press-fitted into a metal shell 3.

With respect to the catalyst carrier 2, a cordierite monolith having an outer diameter of 130 mmφ and a length of 100 mm was used. With respect to the metal shell 3, a cylinder member, which was made of SUS304 having an O-letter shape in its cross-section with 1.5 mm in thickness and 140 mmφ in inner diameter, was used. A catalyst converter 1, assembled in this manner, was actually loaded into a gasoline engine of 3 liters, and this was subjected to a continuous driving test. As a result, upon traveling, neither noise nor backlash of the catalyst carrier 2 was generated so that it was confirmed that the initial face pressure was improved, with the degradation with time in the face pressure being securely prevented. Moreover, it was possible to provide an excellent anti-wind erosion property.

Examples 2, 3

In examples 2, 3, alumina-silica based fibers 6 were respectively prepared basically in the same sequence as example 1 except that the firing temperature and the firing time were changed as shown in Table 1. As a result, it was possible to obtain alumina-silica based fibers 6 that were excellent in mechanical strengths.

Moreover, when face-pressure measuring-use samples were formed, and the initial face pressure, the face pressure after endurance tests and the degradation with time rate of face pressure were measured on these, preferable results were obtained in the same manner as example 1 (see Table 1).

Of course, no changes were observed with respect to the color and quantity of residual carbon.

Furthermore, a holding seal material 4 was formed so as to prepare a catalyst converter 1, and a continuous driving test was carried out by loading this. As a result, upon traveling, neither noise nor backlash of the catalyst carrier 2 was generated so that it was confirmed that the initial face pressure was improved, with the degradation with time in the face pressure being securely prevented.

Comparative Example 1

In comparative example 1, a spinning process was carried out by using a spinning stock solution having the same composition as example 1 so that precursor fibers were formed. Next, after the above-mentioned precursor fibers had been subjected to a heating step (pre-processing) at 250° C. for 30 minutes in an electric furnace that is maintained at normal pressure in an active atmosphere containing oxygen (the atmosphere), these were sintered at 1250° C. for 10 minutes in an electric furnace that is maintained at normal pressure in the same active atmosphere (the atmosphere) in the same manner.

As a result, a complete-round-shaped alumina-silica based fiber 6 with a transparent white color, which had an alumina-silica weight ratio of 72:28, an average-fiber-diameter of 10.2 µm and a quantity of residual carbon of 0% by weight (see Table 1), was obtained. The mechanical strengths of this alumina-silica based fiber 6 were shown in Table 1, which indicated approximately half of the values of examples 1 to 3. In other words, the alumina-silica based fiber 6 of comparative example 1 was clearly inferior to those obtained in examples 1 to 3.

Moreover, face-pressure measuring-use samples were prepared so that the initial face pressure, the face pressure after endurance tests and the degradation with time rate of face pressure were measured, and it was confirmed that these values were clearly inferior to those of examples 1 to 3 (see Table 1).

TABLE 1

| | Example 1 | Example 2 | Example 3 | Comparative Example 1 |
|---|---|---|---|---|
| Firing atmosphere | Nitrogen | Nitrogen | Nitrogen | Atmosphere |
| Firing temperature | 1250° C. | 1290° C. | 1150° C. | 1250° C. |
| Firing time | 10 minutes | 5 minutes | 20 minutes | 10 minutes |
| Color of fiber (Brightness) | Black (5) | Black (6) | Black (8) | White (9) |
| Quantity of residual carbon | 3% by weight | 5% by weight | 1% by weight | 0% by weight |
| Average fiber diameter | 10.5 µm | 10.5 µm | 10.5 µm | 10.2 µm |
| Fiber tensile strength | 2.0 Gpa | 1.8 Gpa | 2.3 Gpa | 1.1 Gpa |
| Fiber bending strength | 1.8 Gpa | 1.6 Gpa | 2.0 Gpa | 0.9 Gpa |
| Fracture toughness | 1.5 MN/m$^{3/2}$ | 1.6 MN/m$^{3/2}$ | 1.5 MN/m$^{3/2}$ | 0.7 MN/m$^{3/2}$ |
| Bulk density | 0.10 g/cm$^3$ | 0.10 g/cm$^3$ | 0.10 g/cm$^3$ | 0.10 g/cm$^3$ |
| Initial face pressure | 185 kPa | 180 kPa | 192 kPa | 144 kPa |
| Face pressure after endurance tests | 107 kPa | 105 kPa | 105 kPa | 35 kPa |
| Degradation with time rate of face pressure | 42.2% | 41.7% | 45.3% | 75.7% |

Next, the following description will be given of examples and comparative examples according to the second group of the present invention.

Example 4

In example 4, first, long fibers of precursor fibers were prepared in the same manner as example 1.

Next, the long fiber of precursor fiber was chopped to a length of 5 mm so that short fibers were prepared. Thereafter, these short fibers were dispersed in water, and the resulting fiber dispersion solution was poured into a mold, and pressed and dried so that a mat-shaped fiber aggregation M1 was obtained.

In a firing step following the above-mentioned laminating process, after the above-mentioned fiber aggregation M1 had been subjected to a heating step (pre-processing) at 250° C. for 30 minutes in an electric furnace 21 that is maintained at normal pressure in the atmosphere, these were sintered in the electric furnace 21 that is maintained at normal pressure in the atmosphere in the same manner.

In example 4, the temperature of an upper electric heater 24 was set higher so that the surface temperature on the first face side S1 was set to 1250° C. at the firing time, while the temperature of a lower electric heater 25 was set lower so that the surface temperature on the second face side S2 was set to 1000° C. In other words, a firing temperature difference of 250° C. was prepared. The firing time was set to 30 minutes.

The alumina-silica based fibers 6 on the surface layer portion of the first face side S1 and the surface layer portion of the second face side S2 of the fiber aggregation M1 thus obtained were respectively sampled, and these fibers were examined with respect to several points. Table 2 shows the test results.

With respect to the crystallization rate of the alumina-silica based fibers 6, the rate on the surface layer portion of the first face side S1 was clearly smaller than that on the surface layer portion of the second face side S2.

In contrast, with respect to the fiber tensile strength, fiber bending strength, elastic modulus and extension rate of the alumina-silica based fibers 6, those factors on the surface layer portion of the first face side S1 were clearly greater than those on the surface layer portion of the second face side S2.

Here, the weight ratio of alumina-silica was 72:28, the average fiber diameter was 10.5 μm, and the cross-sectional shape of the fiber had a complete round shape.

The mat-shaped fiber aggregation M1 was punched out to a square shape with 25 mm in each side to prepare a face-pressure measuring-use sample, and this was sandwiched by special jigs, and adjusted to have a bulk density (GBD) of 0.30 g/cm$^3$. The face-pressure measuring-use sample in this state was held in the atmosphere at 1000° C., and the face pressure was measured 1 hour later, 10 hours later, and 100 hours later, respectively. Here, the face pressure which had been obtained 1 hour later was defined as "initial face pressure", and the face pressure 100 hours later was defined as "face pressure after endurance tests". Moreover, the expression, (face pressure after endurance tests/initial face pressure)×100(%) was calculated, and defined as the degradation with time rate of face pressure. The results of these tests are shown in a graph of FIG. 6.

In accordance with the results of the tests, in the sample of example 4, both of the initial face pressure and the face pressure after endurance tests exceeded 100 kPa, and the degradation with time rate of face pressure was maintained at a comparatively low level.

A catalyst converter 1 was assembled in the same as example 1 by using the mat-shaped fiber aggregation M1, and this was loaded into a gasoline engine of 3 liters, and subjected to a continuous driving test. As a result, upon traveling, neither noise nor backlash of the catalyst carrier 2 was generated so that it was confirmed that the initial face pressure was improved, with the degradation with time in the face pressure being securely prevented. Moreover, no leakage of exhaust gas was found so that an excellent sealing property was obtained together with an excellent anti-wind erosion property.

Comparative Example 2

In comparative example 2, a firing step was carried out at 1250° C. for 30 minutes in an even manner without setting any difference in the firing temperature. Except for this point, a fiber aggregation M1 was formed basically under the same conditions as the examples.

In comparative example 2, the physical properties of the alumina-silica based fiber 6 (the crystallization rate, the fiber tensile strength, fiber bending strength, elastic modulus and extension rate) were virtually the same as those of the alumina-silica based fibers 6 located on the surface layer portion on the second face side S2 of the example. In other words, there was no specific difference in the crystallization rate, etc. depending on portions.

Moreover, face-pressure measuring-use samples were prepared in the same manner as the examples, and measurements were carried out on these with respect to the initial face pressure, face pressure after endurance tests and degradation with time rate of face pressure. As shown in a graph of FIG. 6, the samples of comparative example 2 were clearly inferior to those of example 4.

TABLE 2

|  | First face side | Second face side |
| --- | --- | --- |
| Firing temperature | 1000° C. | 1250° C. |
| Firing time | 30 minutes | 30 minutes |
| Crystallization rate | 0.0% by weight | 8.3% by weight |
| Fiber tensile strength | 2.3 GPa | 1.1 Gpa |
| Fiber bending strength | 2.0 GPa | 0.9 GPa |
| Elastic modulus | $11.3 \times 10^{10}$ N/m$^2$ | $9.8 \times 10^{10}$ N/m$^2$ |
| Extension rate | 2.3% | 1.0% |

The following description will be given of examples and comparative examples according to the third group of the present invention.

Example 5

In example 5, face-pressure-evaluation-use samples of a holding seal material 4 were formed in the following manner.

First, a basic water solution of aluminum chloride (23.5% by weight), silica sol (20% by weight, silica particle size 15 nm), polyvinyl alcohol (10% by weight) and tetraethylene glycol monobutylether (1% by weight) were mixed to prepare a spinning stock solution 18. Next, the resulting spinning stock solution 18 was condensed under vacuum at 50° C. by using an evaporator to prepare a spinning stock solution 18 having a concentration of 38% by weight with a viscosity of 1000 Poise.

After preparation, the spinning stock solution 18 was supplied to a spinning device 20 of FIG. 8. The shape of a metal mouth 19a of the nozzle 19 was set to a rectangular shape (longer side: 500 μm, shorter side: 50 μm), as shown on the 1$^{st}$ row in the left column of the table of FIG. 9. During the spinning process, dry hot air of 10 m/s at 50° C. was continuously discharged from a dry-air discharging port.

Thus, the spinning stock solution 18 was continuously discharged into the air through the metal mouth 19a so that a precursor fiber 6A was formed, and the precursor fiber 6A thus formed was wound up while being extended. At this time, dry hot air was blown to the precursor fibers 6 in the forward direction of the discharging direction thereof so that the drying process and extending process were carried out simultaneously.

Next, after the above-mentioned precursor fibers 6A had been subjected to a heating step (pre-processing) at 250° C. for 30 minutes in an electric furnace that is maintained in the air atmosphere, these were sintered at 1200° C. for 10 minutes in an electric furnace in the same manner.

Figure 10:
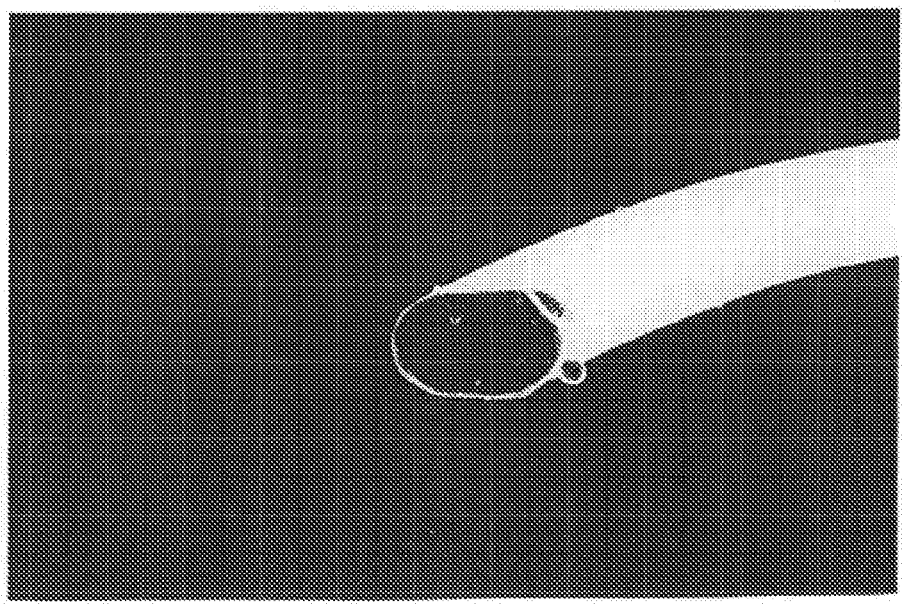
FIG. 10 is an SEM photograph showing a cross-section of an alumina-silica based fiber 6 of example 5 according to the third group of the present invention.

As a result, as shown on the 1$^{st}$ row in the right column of the table of FIG. 9 and FIG. 10, an alumina-silica based fiber 6 (average major axis: 15 μm, average minor axis: 10 μm) which had an elliptical cross-section according to example 5, was obtained. This alumina-silica based fiber 6 had a mullite crystal content of approximately 8% by weight and an alumina-silica weight ratio of 72:28. Here, hardly any organic substances were contained in the components of the alumina-silica based fiber 6. Moreover, FIG. 10 shows an SEM photograph that indicates a cross-section of the alumina-silica based fiber 6 according to example 5.

Next, the long fiber of the alumina-silica based fiber 6 was chopped into a length of 5 mm to provide short fibers. Thereafter, these short fibers were dispersed in water, and the resulting fiber dispersion solution was poured into a mold, and pressed and dried so that a mat-shaped fiber aggregation having a thickness of 20 mm was obtained. This was then punched out to a square shape with 25 mm in each side to prepare a face-pressure evaluation sample of example 5.

In the face-pressure evaluation test, the above-mentioned sample was compressed to a thickness of 3 mm by using a compressing jig, and this process was repeated five times. In this case, the face pressure value at the time of the first compression and the face pressure value at the time of the fifth compression were measured, and based upon the results of the measurements, the rate of residual face pressure (%), which forms an index of the degree of degradation with time in face pressure, was found. The result of this was 95.0% as shown in Table 3.

After this fiber aggregation had been punched out to a predetermined shape and formed into a holding seal material 4, this was wound around a catalyst carrier 2, and the resulting member 2 was press-fitted into a metal shell 3. With respect to the catalyst carrier 2, a cordierite monolith having an outer diameter of 130 mmφ and a length of 100 mm was used. With respect to the metal shell 3, a cylinder member, which was made of SUS304 having an O-letter shape in its cross-section with 1.5 mm in thickness and 140 mmφ in inner diameter, was used. A catalyst converter 1, assembled in this manner, was actually loaded into a gasoline engine of 3 liters, and this was subjected to a continuous driving test. As a result, upon traveling, neither noise nor backlash of the catalyst carrier 2 was generated even after a lapse of considerably long time so that it was confirmed that the degree of degradation with time in the face pressure was reduced.

Example 6

In example 6, the same sequence as example 5 was basically carried out except that the shape of the metal mouth 19a was changed. As a result, an alumina-silica based fiber 6 (average major axis: 30 μm, average minor axis: 10 μm) which had an elliptical cross-section according to example 6, was obtained. This alumina-silica based fiber 6 had a mullite crystal content of approximately 8% by weight and an alumina-silica weight ratio of 72:28. Here, hardly any organic substances were contained in the components of the alumina-silica based fiber 6.

Next, the mat-shaped fiber aggregation was punched out to a square shape with 25 mm in each side to prepare a face-pressure evaluation sample of example 6, and this was subjected to a face-pressure evaluation test in the same manner as example 1. As a result, in Example 6, the residual rate of 94.0% was obtained (see FIG. 3).

Moreover, a holding seal material 4 was prepared, and a catalyst converter 1 was assembled, and this was then actually loaded into a gasoline engine of 3 liters, and subjected to a continuous driving test. As a result, upon traveling, neither noise nor backlash of the catalyst carrier 2 was generated even after a lapse of considerably long time so that it was confirmed that the degree of degradation with time in the face pressure was reduced.

Example 7

Figure 11:
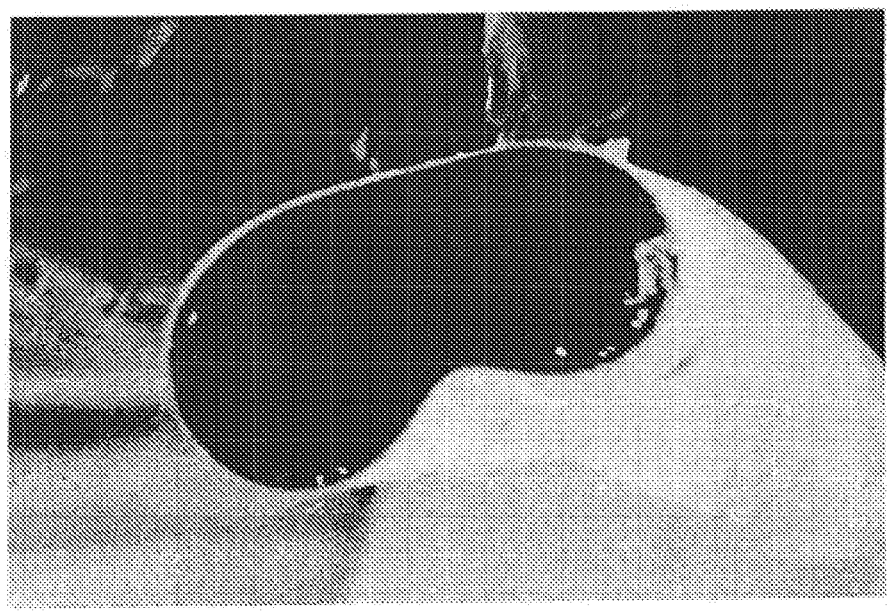
FIG. 11 is an SEM photograph showing a cross-section of an alumina-silica based fiber 6 of example 7 according to the third group of the present invention.

In example 7, the same sequence as example 5 was basically carried out except that the shape of the metal mouth 19a was formed into a virtually dumbbell shape having a size as shown on the second row in the left column of the table of FIG. 9. As a result, as shown on the second row in the right column of FIG. 9 and FIG. 11, an alumina-silica based fiber 6 (average width: 20 μm, average center thickness: 5 μm, average edge portion thickness: 10 μm) which had a cocoon shaped cross-section or a virtually peanut-shaped cross-section according to example 7 was obtained. This alumina-silica based fiber 6 had a mullite crystal content of approximately 8% by weight and an alumina-silica weight ratio of 72:28. Here, hardly any organic substances were contained in the components of the alumina-silica based fiber 6. Further, FIG. 11 is an SEM photograph that shows a cross-section of the alumina-silica based fiber according to example 7.

Next, the mat-shaped fiber aggregation was punched out to a square shape with 25 mm in each side to prepare a face-pressure evaluation sample of example 2, and this was subjected to a face-pressure evaluation test in the same manner as example 5. As a result, in example 7, the residual rate of 89.9% was obtained (see FIG. 3).

Moreover, a holding seal material 4 was prepared, and a catalyst converter 1 was assembled, and this was then actually loaded into a gasoline engine of 3 liters, and subjected to a continuous driving test. As a result, upon traveling, neither noise nor backlash of the catalyst carrier 2 was generated even after a lapse of considerably long time so that it was confirmed that the degree of degradation with time in the face pressure was reduced.

Example 8

In example 8, the same sequence as example 5 was basically carried out except that the shape of the metal mouth 19a was formed into a virtually C-letter shape having a size as shown on the third row in the left column of the table of FIG. 9. As a result, as shown on the third row in the right column of FIG. 9, an alumina-silica based fiber 6 having a hollow cross-sectional shape (outer diameter: 20 μm, inner diameter: 10 μm) according to example 8 was obtained. This alumina-silica based fiber 6 had a mullite crystal content of approximately 8% by weight and an alumina-silica weight ratio of 72:28. Here, hardly any organic substances were contained in the components of the alumina-silica based fiber 6.

Next, the mat-shaped fiber aggregation was punched out to a square shape with 25 mm in each side to prepare a face-pressure evaluation sample of example 8, and this was subjected to a face-pressure evaluation test in the same manner as example 1. As a result, in example 8, the residual rate of 94.6% was obtained (see FIG. 3).

Moreover, a holding seal material 4 was prepared, and a catalyst converter 1 was assembled, and this was then actually loaded into a gasoline engine of 3 liters, and subjected to a continuous driving test. As a result, upon traveling, neither noise nor backlash of the catalyst carrier 2 was generated even after a lapse of considerably long time so that it was confirmed that the degree of degradation with time in the face pressure was reduced.

Test Example 1

In test example 8, the same sequence as example 5 was basically carried out except that the shape of the metal mouth 19a was changed. As a result, an alumina-silica based fiber 6 having an elliptical cross-sectional shape (average major axis: 35 μm, average minor axis: 10 μm) according to test example 1 was obtained. This alumina-silica based fiber 6 had a mullite crystal content of approximately 8% by weight and an alumina-silica weight ratio of 72:28. Here, hardly any organic substances were contained in the components of the alumina-silica based fiber 6.

Next, the mat-shaped fiber aggregation was punched out to a square shape with 25 mm in each side to prepare a face-pressure evaluation sample of test example 1, and this was subjected to a face-pressure evaluation test in the same manner as example 1. As a result, in test example 1, the residual rate of 92.0% was obtained (see FIG. 3).

However, it was found that its initial face pressure was lower in comparison with the respective examples.

Comparative Example 3

In comparative example 3, the same sequence as example 5 was basically carried out except that the shape of the metal mouth 19a was formed into a complete round shape having a diameter of 0.2 mm as shown on the fourth row in the left column of the table of FIG. 9. As a result, as shown on the fourth row in the right column of FIG. 9, an alumina-silica based fiber 6 having a complete round cross-sectional shape (outer diameter: 10 μm) according to comparative example 3 was obtained. This alumina-silica based fiber 6 having a complete round cross-sectional shape of comparative example 3 had a mullite crystal content of approximately 8% by weight and an alumina-silica weight ratio of 72:28. Here, hardly any organic substances were contained in the components of the alumina-silica based fiber 6.

Next, the mat-shaped fiber aggregation was punched out to a square shape with 25 mm in each side to prepare a face-pressure evaluation sample of comparative example 3, and this was subjected to a face-pressure evaluation test in the same manner as example 5. As a result, in comparative example 3, the residual rate was 85.0%, which was clearly inferior to the respective examples (see FIG. 3).

Therefore, it was found that the degree of degradation with time in face pressure would be greater in comparison with the respective examples.

TABLE 3

| | Fiber sectional shape | Face pressure value in the first time | Face pressure value in the fifth time | Residual rate |
|---|---|---|---|---|
| Example 5 | Elliptical shape | 202 kPa | 192 kPa | 95.0% |
| Example 6 | Elliptical shape | 200 kPa | 188 kPa | 94.0% |
| Example 7 | Cocoon shape | 208 kPa | 187 kPa | 89.9% |
| Example 8 | Hollow shape | 205 kPa | 194 kPa | 94.6% |
| Comparative Example 3 | Complete round shape | 213 kPa | 181 kPa | 85.0% |

The following description will be given of examples and comparative examples according to the fourth group of the present invention.

Example 9

In example 9, face-pressure-evaluation-use samples of a holding seal material 4 were formed in the following manner.

First, a basic water solution of aluminum chloride (23.5% by weight), silica sol (20% by weight, silica particle size 15 nm), polyvinyl alcohol (10% by weight) and an antifoamer (n-octanol) were mixed to prepare a spinning stock solution. Next, the resulting spinning stock solution was condensed under vacuum at 50° C. by using an evaporator to prepare a spinning stock solution having a concentration of 38% by weight with a viscosity of 1000 to 2000 Poise.

The spinning stock solution, thus prepared, was continuously discharged into the air through the nozzle of a spinning device, and the precursor fiber thus formed was wound up while being extended.

At this time, in order to control the fiber diameter, the following conditions were set. In other words, the diameter of the nozzle discharging port was set to 0.1 to 0.2 mm, the length was set to 0.3 to 2.0 mm, and the discharging rate was set to 1.5 to 2.0 cm/s; thus, the spinning stock solution was discharged. After the precursor fiber derived from the spinning stock solution had been extended at a rate 100 to 200 times the above-mentioned discharging rate, the fiber was wound around a winder having a diameter of approximately 12 cm. A cylinder having a length of 2 to 4 m was placed between the nozzle discharging port and the winder, and the precursor fiber was allowed to pass through the cylinder. The upper half of the inside of the cylinder was set to a temperature of 35 to 40° C., and the lower half of the inside of the cylinder was set to a temperature of 25 to 30° C.

Successively, the long fiber of the precursor fiber was chopped to a length of 10 mm by using a guillotine cutter so that short fibers were prepared. Thereafter, these short fibers (approximately 1.0 g) were dispersed in water, and the resulting fiber dispersion solution was poured into a mold, and pressed and dried so that a mat-shaped fiber aggregation having a square shape with 25 mm in the longitudinal and lateral sides was obtained.

Next, after the above-mentioned mat-shaped fiber aggregation had been subjected to a heating step (pre-processing) at 250° C. for 30 minutes in an electric furnace that is maintained in the air atmosphere, this was sintered at 1250° C. for 10 minutes in an electric furnace in the same manner.

As a result, a sample of the holding seal material 4, made from the complete-round-shaped alumina-silica based fiber 6 that had a mullite crystal content of approximately 8% by weight and an alumina-silica weight ratio of 72:28, was obtained.

Alumina-silica based fibers 6 were taken from a plurality of portions of the sample of example 9 thus obtained, and the average fiber diameter (μm) and the minimum, maximum and average fiber length (mm) thereof as well as the minimum value, maximum value and shot content (%) were examined. Table 4 shows the results of the measurements. In accordance with these values, in example 9, dispersions in the fiber diameter and dispersions in the fiber length were extremely small so that it was confirmed that these values are maintained within the above-mentioned preferable ranges. Moreover, no shot was contained in the sample.

Next, a plurality of samples having a square shape with 25 mm in each side were punched out from a large one sheet of mat-shaped fiber aggregation, and the basis weight was examined from each of these based upon the area and weight thereof, and the face pressure thereof was measured by using an autograph. Table 4 also shows the results of these. Here, the measured face pressure values were based upon the data obtained when GBD was set to 0.30 g/cm³. These values showed that in example 9, dispersions in the basis weight and dispersions in the face pressure were small, indicating stability in quality. Moreover, it was also found that the average face pressure value became higher.

Comparative Example 4

In comparative example 4, the same spinning stock solution as example 9 was condensed under vacuum at 50° C. by using an evaporator to prepare a spinning stock solution having a concentration of 38% by weight with a viscosity of 10 to 100 Poise.

With respect to the spinning device, a disc-shaped centrifugal nozzle, which has a diameter of 50 to 100 mm with discharging holes of 0.2 to 0.8 mm being placed at 16 positions with equal intervals, was used. Then, by using a centrifugal force exerted when this nozzle was rotated at the number of revolutions of 1000 to 2000 rpm, the spinning stock solution was discharged, and formed into fibers. Moreover, the resulting precursor fibers were blown by air in 0.5 to 1.0 kPa at 30° C., collected, and laminated to form a mat-shaped fiber aggregation. This was molded into a square shape with 25 mm in the longitudinal and lateral sides, and subjected to the same pre-processing and firing step in the same conditions as example 9 to be formed into ceramics.

Alumina-silica based fibers 6 were taken from a plurality of portions of the sample of comparative example obtained by such a blowing method, and the average fiber diameter (μm) and the minimum, maximum and average fiber length (mm) thereof as well as the minimum value, maximum value and shot content (%) were examined. Table 4 shows the results of the measurements. In accordance with these values, with respect to comparative example 4, it was confirmed that dispersions in the fiber diameter and dispersions in the fiber length became considerably greater in comparison with the examples. Moreover, the shots of 3% by weight or more were contained in the sample.

Next, a plurality of samples having a square shape with 25 mm in each side were punched out from a large one sheet of mat-shaped fiber aggregation, and the basis weight was examined from each of these based upon the area and weight thereof, and the face pressure thereof was measured by using an autograph. Table 1 also shows the results of these. Here, the face pressure measured values were based upon the data obtained when GBD was set to 0.30 g/cm³. These values showed that in comparative example 4, dispersions in the basis weight and dispersions in the face pressure were greater in comparison with example 9, indicating instability in quality. Moreover, it was also found that the average face pressure value was considerably lower than that of example 9.

TABLE 4

| | Example 8 | Comparative Example 4 |
|---|---|---|
| Average fiber diameter | 7.1 μm | 6.8 μm |
| Lower limit value of fiber diameter | 4.8 μm (−2.3 μm) | 1.1 μm (−5.7 μm) |
| Upper limit value of fiber diameter | 9.2 μm (+2.1 μm) | 22.3 μm (+15.5 μm) |
| Average fiber length | 10 mm | 26 mm |
| Lower limit value of fiber length | 9 mm (−1 mm) | 2 mm (−24 mm) |
| Upper limit value of fiber length | 11 mm (+1 mm) | 60 mm (+34 mm) |
| Shot content | 0.0% by weight | 3.8% by weight |
| Average basis weight | 1152 g/m² | 1147 g/m² |
| Lower limit value of basis weight | 1093 g/m² (−59 g/m²) | 1012 g/m² (−135 g/m²) |
| Upper limit value of basis weight | 1183 g/m² (+31 g/m²) | 1251 g/m² (+104 g/m²) |
| Average face pressure | 212 kPa | 154 kPa |
| Lower limit value of face pressure | 201 kPa (−11 kPa) | 123 kPa (−31 kPa) |
| Upper limit value of face pressure | 218 kPa (+6 kPa) | 178 kPa (+24 kPa) |

*Values inside parentheses indicate a difference from the average value.

The following description will be given of examples and comparative examples according to the fifth group of the present invention.

Example 10

In example 10, samples for face pressure evaluation of a holding seal material 4 were formed in the following manner.

First, a basic water solution of aluminum chloride (23.5% by weight), silica sol (20% by weight, silica particle size 15 nm), polyvinyl alcohol (10% by weight) and an antifoamer (n-octanol) were mixed to prepare a spinning stock solution. Next, the resulting spinning stock solution was condensed under vacuum at 50° C. by using an evaporator to prepare a spinning stock solution having a concentration of 38% by weight with a viscosity of 1000 Poise.

The spinning stock solution, thus prepared, was continuously discharged into the air through a nozzle of a spinning device, and the precursor fiber thus formed was wound up while being extended.

After the above-mentioned precursor fiber had been subjected to a heating step (pre-processing) at 250° C. for 30 minutes in an electric furnace that is maintained in the air atmosphere, this was sintered at 1250° C. for 10 minutes in an electric furnace in the same manner.

As a result, complete-round-shaped alumina-silica based fibers 6 having an average fiber diameter of 9 μm, which had a mullite crystal content of approximately 8% by weight and an alumina-silica weight ratio of 72:28, were obtained.

Successively, the long fiber of the precursor fiber 6 was chopped to a length of 5 mm by using a guillotine cutter so that short fibers were prepared. Thereafter, these short fibers (approximately 1.0 g) were dispersed in water, and the resulting fiber dispersion solution was poured into a mold, and pressed and dried so that a mat-shaped fiber aggregation having a square shape with 25 mm in the longitudinal and lateral sides was obtained.

Figure 14:
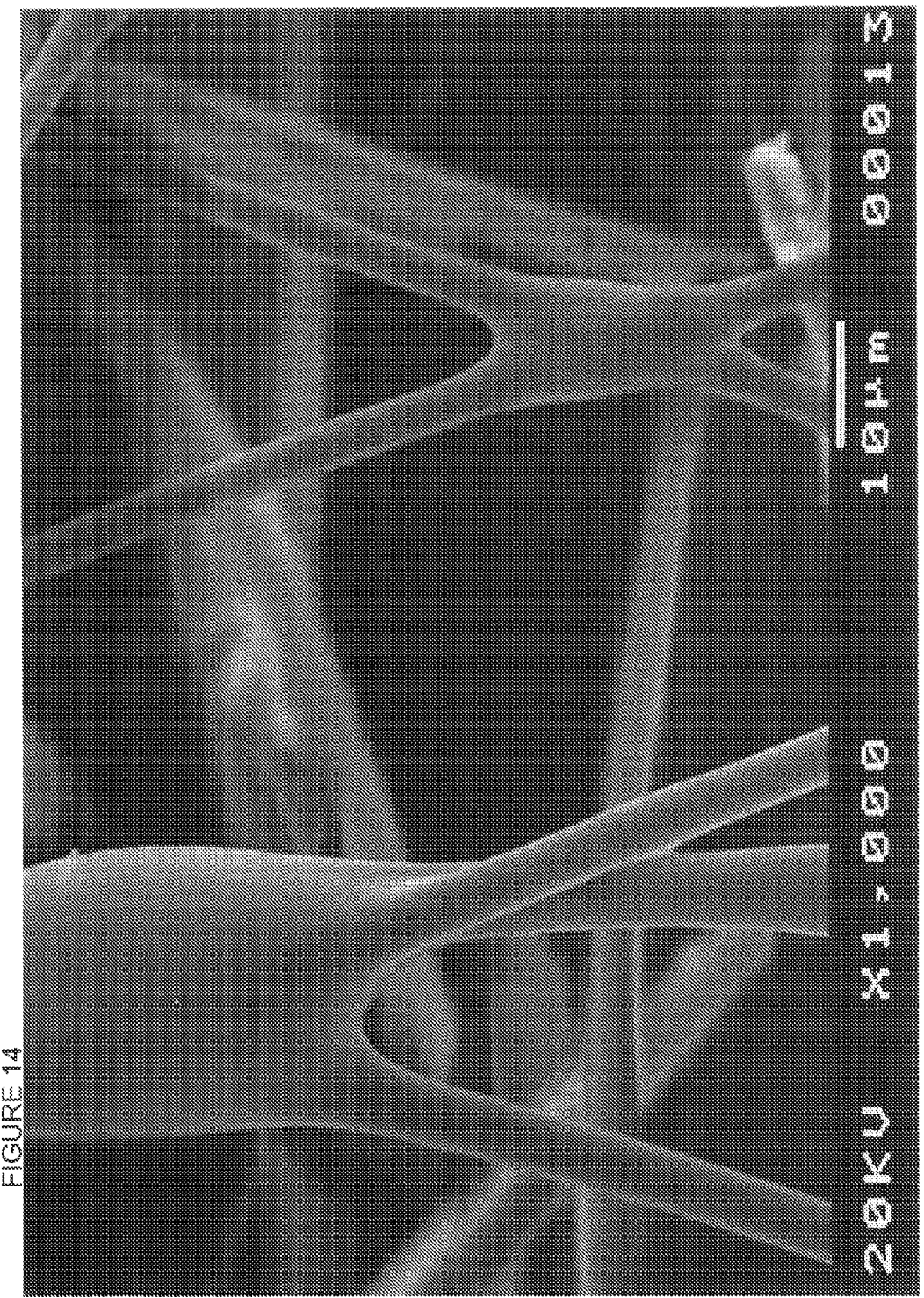
FIG. 14 is an SEM photograph showing ceramic fibers forming a holding seal material according to the fifth group of the present invention.

Then, after this fiber aggregation had been impregnated with a 5% by weight low-viscosity water solution (1 Centipoise) of aluminum chloride for approximately 1 to 60 seconds, the resulting fiber aggregation was heated and dried at 100° C. for 10 minutes or more. Further, the dried fiber aggregation was sintered at a temperature of 1200° C. or more for 10 minutes so that across-linking bridge formed by a ceramic adhesive 7 mainly made from alumina was formed at adjacent portions of the short fibers. FIG. 14 shows an SEM photograph that indicates alumina-silica based fibers 6 of the present example 10 which were bonded to each other by the ceramic adhesive 7.

This fiber aggregation was used as a face-pressure-evaluation sample, and the sample was housed inside compressing jig of an autograph. Then, a pressing force was applied to the sample in the thickness direction, and when this had been pressed to 3 mm in thickness, the face pressure (MPa) was measured 1 hour later, 10 hours later and 100 hours later. The results are shown in a graph of FIG. 13.

Comparative Example 5

In comparative example 5, a face-pressure-evaluation sample was prepared basically in the same manner as example 10, except that no bonding process was carried out. Then, face-pressure-evaluation tests were carried out in the same manner as example 10 by using an autograph. The results are shown in a graph of FIG. 13.
(Results of Tests)

Figure 13:
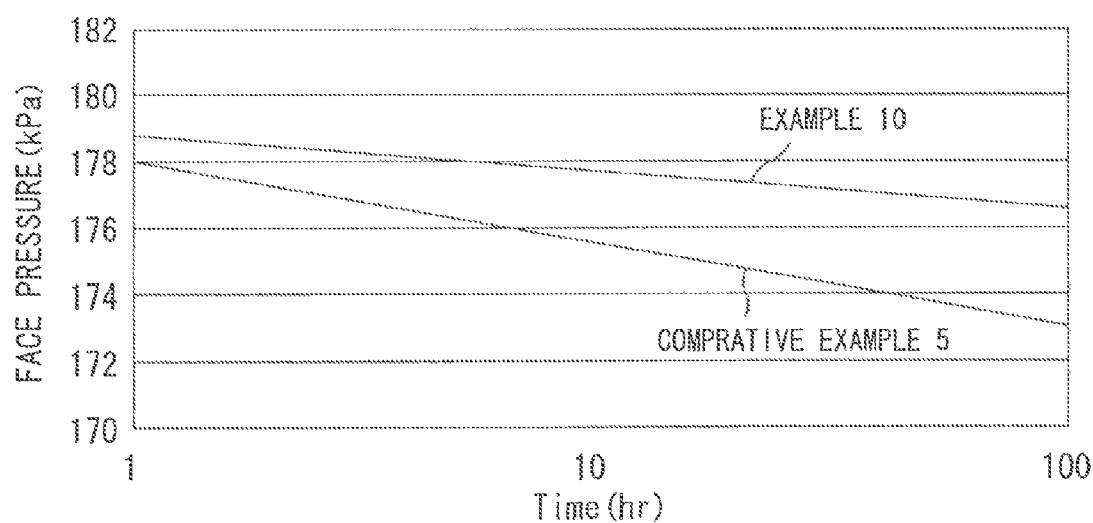
FIG. 13 is a graph showing the results of comparison tests carried out on examples and comparative examples according to the fifth group of the present invention.

In accordance with the graphs in FIG. 13, with respect to the initial face pressure, example 10 had a higher value than comparative example 5. Further, with respect to the degree of degradation in face pressure after a lapse of 100 hours, example 10 was clearly smaller than comparative example 5.

Moreover, in example 10, after the above-mentioned fiber aggregation had been punched out to a predetermined shape and formed into a holding seal material 4, this was wound around a catalyst carrier 2, and the resulting member 2 was press-fitted into a metal shell 3. With respect to the catalyst carrier 2, a cordierite monolith having an outer diameter of 130 mmϕ and a length of 100 mm was used. With respect to the metal shell 3, a cylinder member, which was made of SUS304 having an O-letter shape in its cross-section with 1.5 mm in thickness and 140 mmϕ in inner diameter, was used. A catalyst converter 1, assembled in this manner, was actually loaded into a gasoline engine of 3 liters, and this was subjected to a continuous driving test. As a result, upon traveling, neither noise nor backlash of the catalyst carrier 2 was generated.

Here, tests were carried out, in which the alumina-silica based fibers 6 obtained from the manufacturing method of the second embodiment according to the fifth group of the present invention and the alumina-silica based fibers 6 obtained from the manufacturing method of the first embodiment according to the fifth group of the present invention were compared with each other, with respect to the fiber diameter and mechanical strength thereof. The specific testing method thereof is shown below.

In the former case, 10 fibers were arbitrarily sampled from the short fibers cut to a predetermined length, and these were sintered to form alumina-silica based fibers 6. Then, the average value of the fiber diameter and the standard deviation of the 10 alumina-silica based fibers 6 were examined. As a result, the average value was 7.1 μm and the standard deviation was 0.74 μm. Moreover, 10 alumina-silica based fibers 6 were subjected to a publicly known tensile strength test so that the average value and the standard deviation of the absolute strength were examined. As a result, the average value was 6.19 gf, and the standard deviation was 1.88 gf. Furthermore, the average value and the standard deviation of the relative strength were examined from the data of the above-mentioned tensile strength test. As a result, the average value was 1.40 GPa, and the standard deviation was 0.45 GPa.

In the latter case, a long fiber of the sintered alumina-silica based fiber 6 was cut to a predetermined length to obtain short fibers, and 10 fibers were arbitrarily sampled from these. Then, the average value of the fiber diameter and the standard deviation of the 10 alumina-silica based fibers 6 were examined. As a result, the average value was 7.2 μm and the standard deviation was 0.52 μm. Moreover, 10 alumina-silica based fibers 6 were subjected to a publicly known tensile strength test so that the average value and the standard deviation of the absolute strength were examined. As a result, the average value was 4.86 gf, and the standard deviation was 2.16 gf. Furthermore, the average value and the standard deviation of the relative strength were examined from the data of the above-mentioned tensile strength test. As a result, the average value was 1.22 GPa, and the standard deviation was 0.61 GPa.

The above-mentioned results show that the alumina-silica based fibers 6 of the second embodiment according to the fifth group of the present invention are not only excellent in mechanical strength, but also smaller in mechanical dispersions, in comparison with the example of the first embodiment according to the fifth group of the present invention. Therefore, the application of the alumina-silica based fibers 6 obtained as described above makes it possible to provide a holding seal material 4 having even quality.

The following description will be given of examples and comparative examples according to the sixth group of the present invention.

Example 11

First, a basic water solution of aluminum chloride (23.5% by weight), silica sol (20% by weight, silica particle size 15 nm) and polyvinyl alcohol (10% by weight) that serves as a fiber-drawing property applying agent were mixed to prepare a spinning stock solution. Next, the resulting spinning stock solution condensed under vacuum at 50° C. by using an evaporator to prepare a spinning stock solution having a concentration of 38% by weight with a viscosity of 150 Pa·s (1500 P).

The alumina fiber spinning stock solution, thus prepared, was continuously discharged into the air through a nozzle (having a complete round cross-sectional shape) of a spinning device, and wound up while being extended so that a continuous long fiber precursor was formed.

Next, the continuous long precursor fiber was cut to a length of 7.5 mm by using a rectangular-shaped cutter so that short fibers were prepared, and after having been untied, collected and laminated, these short fibers were pressed so that a mat-shaped fiber aggregation was obtained.

Next, after the above-mentioned mat-shaped fiber aggregation had been subjected to a heating step (pre-processing) at 500° C. for 30 minutes in an electric furnace that is maintained at normal pressure in the air so that organic components were burnt and eliminated, this was sintered at 1250° C. for 10 minutes in an electric furnace that was maintained at normal pressure in the atmosphere to prepare an alumina fiber aggregation.

The above-mentioned alumina fiber aggregation had an alumina-silica weight ratio of 72:28, was obtained, and the average fiber diameter of the alumina short fibers was 7.3 μm with a complete round cross-sectional shape.

Comparative Example 6

After a continuous long-fiber precursor had been prepared in the same manner as example 11, the continuous long-fiber precursor was subjected to a sintering step in the same firing conditions as example 11 so that an alumina long fiber was prepared. The average fiber diameter of the alumina long fiber was 7.2 μm.

Next, the continuous long precursor fiber was cut to a length of 5 mm by using a rectangular-shaped cutter so that alumina short fibers were prepared, and after having been untied, collected and laminated, these short fibers were pressed so that a mat-shaped fiber aggregation was obtained.

The respective physical properties of the alumina fiber aggregations in accordance with example 11 and comparative example 6 were evaluated by using the following methods, and the results are shown in the following Table 5.

(1) Strength of Alumina Short Fibers

The tensile strength of the alumina short fibers used in each of the alumina fiber aggregations in example 11 and comparative example 6 was measured by a tensile tester. The measurements were carried out on ten alumina short fibers that had been arbitrarily sampled, and the average value was determined as the strength of each of the alumina short fibers according to example 11 and comparative example 6, and the dispersions thereof were evaluated based upon the standard deviation.

(2) Measurements on Face Pressure

Each of the fiber aggregations according to example 11 and comparative example 6 was punched out to a square shape with 25 mm in each side to prepare a face-pressure measuring-use sample, and the face pressure of the face-pressure measuring-use sample in a non-sandwiched state without a heating step was measured as "initial face pressure", and the above-mentioned face-pressure measuring-use sample was sandwiched by special jigs, and adjusted to have a bulk density of 0.30 g/cm$^3$, and then held in the atmosphere at 1000° C.; thus, the face pressure measured 100 hours later was defined as "face pressure after endurance tests".

Moreover, the expression, [100−(face pressure after endurance tests/initial face pressure)×100] (%), was calculated to find the degradation with time rate of face pressure.

(3) Observation on Cut Face

States of the cut face of the alumina short fibers according to example 11 and comparative example 6 were observed by using a scanning electron microscope (SEM) so as to examine any chips, burs, micro-cracks and the like.

TABLE 5

| | Average fiber diameter (μm) | Strength of alumina short fiber | |
| --- | --- | --- | --- |
| | | Average strength (N) | Dispersion |
| Example 10 | 7.3 | $6.3 \times 10^{-4}$ | 1.88 |
| Comparative Example 6 | 7.2 | $5.0 \times 10^{-4}$ | 2.16 |

| | Face pressure (kPa) | | |
| --- | --- | --- | --- |
| | Initial face pressure | Face pressure after endurance tests | Degradation with time test (%) |
| Example 10 | 145 | 102 | 29.7 |
| Comparative Example 6 | 140 | 91 | 35 |

| | Presence or absence of chips, burs and micro-cracks |
| --- | --- |
| Example 10 | Absence |
| Comparative Example 6 | Presence |

As clearly shown by the results in Table 5, the average fiber strength of the alumina short fibers according to example 11 was $6.3 \times 10^{-4}$ N with its standard deviation being set to 1.88, while the average fiber strength of the alumina short fibers according to comparative example 6 was $5.0 \times 10^{-4}$ N with its standard deviation being set to 2.16. The alumina short fibers according to example 11 was superior to the alumina short fibers according to comparative example 6 in the average strength and dispersion thereof.

The initial face pressure of the face-pressure measuring-use sample according to example 11 was 145 kPa with the face pressure after endurance tests being set to 102 kPa, while the initial face pressure of the face-pressure measuring-use sample according to comparative example 6 was 140 kPa with the face pressure after endurance tests being set to 91 kPa; thus, in both of the face pressures, the sample according to example 11 had better results.

Moreover, with respect to the degradation with time rate of the face-pressure measuring-use sample also, the sample according to example 11 had better results.

Furthermore, none of chips, burs and micro-cracks were found on the cut face of the alumina short fiber according to example 11; however, a number of chips, burs and micro-cracks were observed on the cut face of the alumina short fiber according to comparative example 6.

INDUSTRIAL APPLICABILITY

As described above in detail, according to the first group of the present invention, since it is possible to achieve excellent mechanical strength, it becomes possible to provide alumina-silica based fibers that are suitable for obtaining a holding seal material which has a high initial face pressure, and is less susceptible to degradation with time in the face pressure.

In accordance with the invention according to the first group of the present invention, it is possible to provide a manufacturing method which can securely provide alumina-silica based fibers that are excellent in mechanical strength easily.

In accordance with the invention according to the first group of the present invention, it is possible to obtain the above-mentioned fibers at low costs in a stable manner.

In accordance with the invention according to the first group of the present invention, it is possible to maintain basic physical properties of the fibers while reducing costs.

In accordance with the invention according to the first group of the present invention, it is possible to provide a holding seal material which has a high initial face pressure, and is less susceptible to degradation with time in the face pressure.

In accordance with the invention according to the first group of the present invention, it is possible to provide a catalyst-converter-use holding seal material which has a high initial face pressure, and is less susceptible to degradation with time in the face pressure.

In accordance with the invention according to the second group of the present invention, it is possible to provide a holding seal material which has a high initial face pressure, is less susceptible to degradation with time in the face pressure, and is also excellent in the sealing property.

In accordance with the invention according to the second group of the present invention, it is possible to provide a manufacturing method that is suitable for obtaining a holding seal material according to the second group of the present invention.

In accordance with the invention according to the second group of the present invention, it is possible to provide a catalyst converter which has a high initial face pressure, is less susceptible to degradation with time in the face pressure, and is also excellent in the sealing property.

In accordance with the inventions according to the third group of the present invention, it is possible to provide a holding seal material that is less susceptible to degradation with time in the face pressure.

In accordance with the invention according to the third group of the present invention, it is possible to provide a manufacturing method that is suitable for obtaining a holding seal material according to the third group of the present invention.

In accordance with the invention according to the fourth group of the present invention, it is possible to provide a holding seal material that is excellent in quality stability.

In accordance with the invention according to the fourth group of the present invention, it is possible to provide a manufacturing method that is suitable for obtaining a holding seal material according to the fourth group of the present invention.

In accordance with the inventions according to the fifth group of the present invention, it is possible to provide a holding seal material that is less susceptible to degradation with time in the face pressure.

In accordance with the invention according to the fifth group of the present invention, it is possible to provide a manufacturing method that is suitable for obtaining a holding seal material according to the fifth group of the present invention.

In accordance with the invention according to the fifth group of the present invention, it is possible to provide a ceramic fiber aggregation that is suitable for the above-mentioned excellent holding seal material, etc. according to the fifth group of the present invention.

In accordance with the invention according to the fifth group of the present invention, it is possible to provide a ceramic fiber aggregation that is suitable for the above-mentioned excellent holding seal material, etc. according to the fifth group of the present invention.

In accordance with a manufacturing method of an alumina fiber aggregation according to the sixth group of the present invention, it is possible to make the strength of alumina short fibers used in the alumina fiber aggregation superior, and also to reduce the dispersions thereof. Therefore, it is possible to manufacture an alumina fiber aggregation which has a high initial face pressure, and is less susceptible to the degradation with time.

The invention claimed is:

1. A holding seal material comprising:
   a sintered body comprising a fiber aggregation comprising alumina-silica based ceramic fibers aggregated into a mat shape, the sintered body being configured to be placed in a gap between a ceramic body capable of allowing a fluid to flow through the inside thereof and a metal shell covering the outer circumference of the ceramic body,
   wherein the sintered body comprises a sintered cross-linking bridge comprising a ceramic adhesive locally provided at an overlapping area of the alumina-silica based fibers and connecting adjacent ones of the alumina-silica based fibers together in the overlapping area of the alumina-silica based fibers.

2. The holding seal material according to claim 1, wherein said ceramic adhesive comprises a substance included in said ceramic fiber.

3. The holding seal material according to claim 1, wherein said ceramic fibers are alumina-silica based fibers, and said ceramic adhesive comprises alumina as a main component.

4. The holding seal material according to claim 1, wherein the sintered body comprises the ceramic adhesive in an amount of 1 to 8% by weight.

5. The holding seal material according to claim 1, wherein said ceramic body includes a catalyst carrier, and the sintered body is configured to be wound around the catalyst converter and fitted to the metal shell.

6. The holding seal material according to claim 1, wherein the sintered body placed in the gap between the ceramic body and the metal shell has a reduction in face pressure of less than 2% over a 100 hour period.

7. A holding seal material comprising:
   a sintered body comprising a fiber aggregation comprising alumina-silica based ceramic fibers aggregated into a mat shape, the sintered body being configured to be placed in a gap between a ceramic body capable of allowing a fluid to flow through the inside thereof and a metal shell covering the outer circumference of the ceramic body,
   wherein the sintered body comprises a sintered cross-linking bridge comprising a ceramic adhesive locally provided at an overlapping area of the alumina-silica based fibers which partially bonds said alumina-silica based ceramic fibers to each other and connects adjacent ones of the alumina-silica based ceramic fibers together in the overlapping area of the alumina-silica based ceramic fibers.

8. The holding seal material according to claim 7, wherein the ceramic adhesive comprises a substance included in the ceramic fibers.

9. The holding seal material according to claim 7, wherein the ceramic fibers are alumina-silica based fibers, and the ceramic adhesive comprises alumina as a main component.

10. The holding seal material according to claim 7, wherein the sintered body comprises the ceramic adhesive in an amount of 1 to 8% by weight.

11. The holding seal material according to claim 7, wherein said ceramic body includes a catalyst carrier, and the sintered body is configured to be wound around the catalyst converter and fitted to the metal shell.

12. The holding seal material according to claim 7, wherein the sintered body placed in the gap between the ceramic body and the metal shell has a reduction in face pressure of less than 2% over a 100 hour period.

13. A holding seal material which comprises alumina-silica based ceramic fibers aggregated into a mat shape as a constituent element, and is placed in a gap between a ceramic body capable of allowing a fluid to flow through the inside thereof and a metal shell covering the outer circumference of the ceramic body,
   wherein, after the alumina-silica based ceramic fibers are obtained through a first sintering process to sinter precursor fibers, a second sintering process is performed to fire the ceramic fibers and a ceramic adhesive and the alumina-silica based ceramic fibers are partially bonded to each other by the sintered ceramic adhesive comprising a ceramic adhesive locally provided at an overlapping area of the alumina-silica based fibers and connecting adjacent ones of the alumina-silica based ceramic fibers together in the overlapping area of the alumina-silica based ceramic fibers.

14. The holding seal material according to claim 13, wherein the sintered body placed in the gap between the ceramic body and the metal shell has a reduction in face pressure of less than 2% over a 100 hour period.

* * * * *